United States Patent
Terahara et al.

(10) Patent No.: US 6,647,211 B2
(45) Date of Patent: Nov. 11, 2003

(54) REMOTE CONTROL DEVICE OF ACOUSTO-OPTIC TUNABLE FILTER AND OPTICAL TRANSMISSION SYSTEM CONTAINING EQUALIZER USING ACOUSTO-OPTIC TUNABLE FILTER AND OPTICAL TRANSMISSION SYSTEM CONTAINING OPTICAL ADD/DROP MULTIPLEXER USING ACOUSTO-OPTIC TUNABLE FILTER

(75) Inventors: Takafumi Terahara, Kawasaki (JP); Terumi Chikama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 66 days.

(21) Appl. No.: 10/067,302

(22) Filed: Feb. 7, 2002

(65) Prior Publication Data

US 2002/0097467 A1 Jul. 25, 2002

Related U.S. Application Data

(62) Division of application No. 09/087,497, filed on May 29, 1998, now Pat. No. 6,366,379.

(30) Foreign Application Priority Data

Jan. 30, 1998 (JP) ............................................ 10-020065

(51) Int. Cl.[7] ............................ H04B 10/00; H04J 14/02
(52) U.S. Cl. ............................ 398/106; 398/85; 398/79; 359/308
(58) Field of Search ............................ 398/83, 85, 79, 398/106, 110; 359/308; 367/117, 903

(56) References Cited

U.S. PATENT DOCUMENTS

| 4,602,342 A | * | 7/1986 | Gottlieb et al. ................ 702/31 |
| 5,276,543 A | | 1/1994 | Olshansky .................... 359/124 |
| 5,973,822 A | | 10/1999 | Xu et al. ...................... 359/308 |
| 6,366,379 B1 | * | 4/2002 | Terahara et al. ............. 398/213 |

FOREIGN PATENT DOCUMENTS

| JP | 5-347601 | 12/1993 |
| JP | 8-331047 | 12/1996 |

* cited by examiner

Primary Examiner—Kinfe-Michael Negash
(74) Attorney, Agent, or Firm—Staas & Halsey LLP

(57) ABSTRACT

The invention provides a remote control device of an acousto-optic tunable filter, which comprises an acousto-optic tunable filter interpolated in an optical transmission line, capable of controlling an output state of an input light signal by being supplied with a surface acoustic wave control signal through a control port; a surface acoustic wave control signal source to generate the surface acoustic wave control signal, which is provided at a remote place from the acousto-optic tunable filter; and a control unit that receives an information of the surface acoustic wave control signal from the surface acoustic wave control signal source through remote transmission means, and supplies the surface acoustic wave control signal to the control port of the acousto-optic tunable filter. According to this invention, the scale of the device using the acousto-optic tunable filter becomes enlarged, the power consumption is increased; and the man power required for the maintenance of the devices can be reduced, and the remote control of the acousto-optic tunable filter can be achieved.

14 Claims, 28 Drawing Sheets

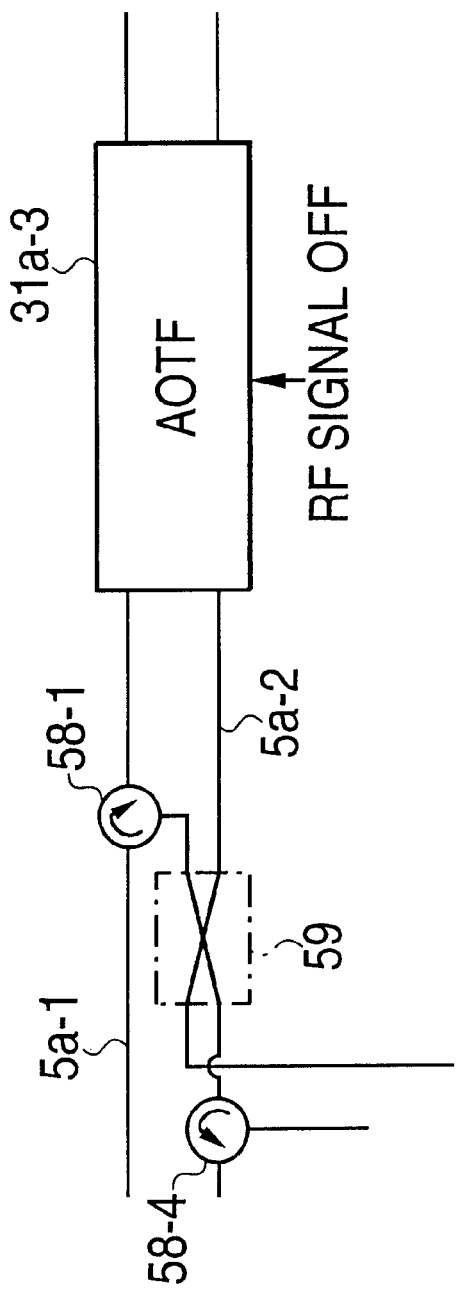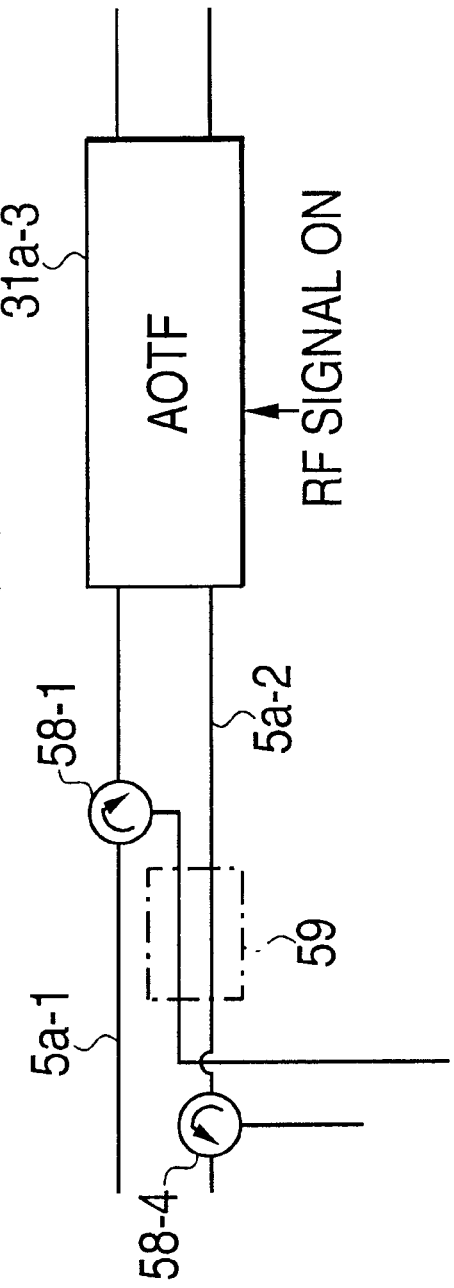

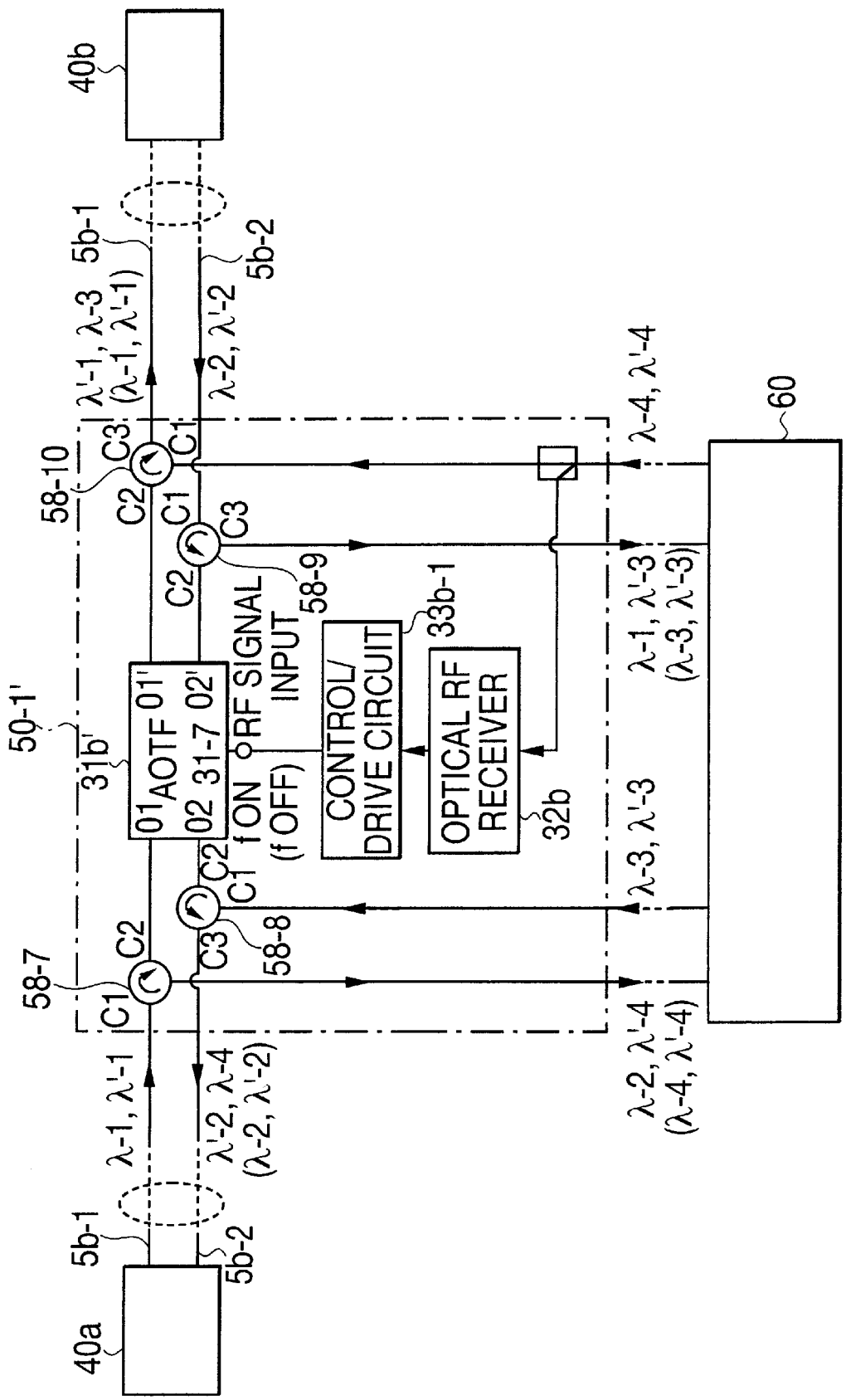

REMOTE CONTROL DEVICE OF ACOUSTO-OPTIC TUNABLE FILTER AND OPTICAL TRANSMISSION SYSTEM CONTAINING EQUALIZER USING ACOUSTO-OPTIC TUNABLE FILTER AND OPTICAL TRANSMISSION SYSTEM CONTAINING OPTICAL ADD/DROP MULTIPLEXER USING ACOUSTO-OPTIC TUNABLE FILTER

This is a Divisional of Ser. No. 09/087,497 filed on May 29, 1998 now U.S. Pat. No. 6,366,379.

BACKGROUND OF THE INVENTION

1. Field of the Invention

The present invention relates to a remote control device of an acousto-optic tunable filter used in the wavelength division multiplexed transmission system, an optical transmission system containing an equalizer using the acousto-optic tunable filter, and an optical transmission system containing a optical add/drop multiplexer using the acousto-optic tunable filter.

2. Description of the Related Art

The acousto-optic tunable filter (hereunder, referred to as "AOTF") has been used for a device to build a wavelength division multiplexed transmission system. A gain equalizer, power equalizer, optical add-drop multiplexer (hereunder referred to as "OADM") which utilize the transmittance characteristic of the AOTF have been proposed as devices to build a wavelength division multiplexed transmission system (hereunder, "wavelength division multiplexed" is abbreviated by "WDM").

The AOTF is a device in which the acousto-optical effect is applied; and there have been proposed several constructions of the AOTF, however the basic principle of operation is the same.

Let us take an AOTF 30' shown in FIG. 25 as an example of the construction.

As shown in FIG. 25, the AOTF 30' is constructed to comprise two input ports (PI) 01, 02 and two output ports (PO) 01', 02', a transducer 30'-1 placed on a flat substrate, an absorber 30'-2, a highly concentrated Ti diffusion region 30'-3, and an optical waveguide 30'-4 and the like.

In the construction shown in FIG. 25, giving an RF (radio frequency) signal to the transducer 30'-1 through a control port 30'-7 excites the transducer 30'-1 to generate a surface acoustic wave (hereunder, "surface acoustic wave" is simply referred to as "SAW"). This SAW propagates through the SAW cladding layer to be absorbed by the SAW absorber 30'-2.

On the other hand, a light signal comes in through the optical input port (PI) 01 to be polarized by a PBS (polarized beam splitter) 30'-5 and split into two optical waveguides. The SAW and the light signal are superposed to interfere with each other, and only a light signal of a part of wavelength is polarized selectively.

The light signal of the wavelength polarized is polarized and separated by a PBS 30'-6 on the output. The light signal split by the PBS 30'-6 goes out from the optical output port (PO) 02', and the rest goes out from the optical output port (PO) 01'. The wavelength of the light signal polarized is in one-to-one correspondence with the frequency of the RF signal, namely, the SAW frequency, under a constant temperature. That is, varying the frequency of the RF signal makes it possible to select a wavelength of a light signal going out through the output ports (PO) 01', 02'.

Utilizing this property, if an RF signal of a specific frequency is inputted through the control port 30'-7 where a WDM signal containing light signals having different wavelengths to each other comes in through the input port (PI) 01, the AOTF 30' will output a light signal of a desired wavelength through the output port (PO) 02. Serving the outputted light signal as a split light signal of the OADM, the AOTF 30' can be used as an OADM.

Concretely, when using the AOTF 30' as an OADM, for example, the input port (PI) 01 is used as the main input port, the input port (PI) 02 as the input port for adding a light signal, the output port (PO) 01' as the main output port (PO), and the output port (PO) 02' as the output port for splitting a light signal.

Inputting an RF signal through the control port will simultaneously adds/splits a light signal of the wavelength corresponding to the frequency of the inputted RF signal. And, to simultaneously input a plurality of RF signals having different frequencies will select the light signals of a plurality of wavelengths corresponding to these RF signals. That is, the AOTF 30' is very effective as an OADM filter that is able to simultaneously select light signals of plural and arbitrary wavelengths.

And, the AOTF 30' is also effective as an optical power equalizer or an optical gain equalizer. When the AOTF 30' is used as the foregoing application, either one of the two output ports (PO) 01', 02' is only needed to be used.

Further, the AOTF 30' will achieve a variable optical filter that is able to freely vary the transmittance characteristic (transmitted quantity/stopped quantity) of a light signal by varying the power of an inputted RF signal.

In comparison to an optical filter of the fixed wavelength type, the AOTF 30' is flexible in the choice of wavelengths, and the transmittance characteristic can be made variable as mentioned above.

Accordingly, a WDM transmission system 100' using the AOTF 30' can be made up, as shown in FIG. 26. In the WDM transmission system 100' shown here, the AOTF 30' is placed on the transmission line through which a WDM light signal propagates between an optical main signal transmitter 11 and an optical main signal receiver 21. And, a device 30'A containing the AOTF 30' is comprised of an RF signal source 31' and a control/drive circuit 32'. The device 30'A containing the AOTF 30' can be used as an optical equalizing device, an OADM, or the like.

In the device 30'A containing the AOTF 30' having such a construction, the AOTF 30' operates on the basis of the RF signal outputted by the RF signal source 31' that is equipped in the same place as the AOTF 30'.

However, if the RF signal source 31' is installed in the same place as the AOTF 30' so as to output a desired RF signal to the AOTF 30' which is used for an optical equalizing device or the like, it will enlarge the scale of the device; and if the AOTF 30' is used in the transmission line in such a condition, it will increase the power consumption, which is a problem.

Further, if a plurality of the devices 30'A using the AOTFs 30' are installed in the transmission line, the scale of the devices and the power consumption are further increased, and the maintenance of these devices require more manpower, which is also a problem.

Further, to install the RF signal source 31' and the control/drive circuit 32' in the same place as the AOTF 30' will invite a possibility of disturbances in the electronic circuit of the control/drive circuit 32' to cause crosstalks, which is another problem.

SUMMARY OF THE INVENTION

The present invention has been made in view of the foregoing problems, and an object of the present invention is to provide a remote control device of an AOTF, whereby an RF signal source for controlling the AOTF can be installed separately from the AOTF and a device containing the AOTF can be controlled from a remote place, and a WDM transmission system that contains such a device.

In order to accomplish the foregoing object, the remote control device of the acousto-optic tunable filter according to the invention is characterized by comprising: an acousto-optic tunable filter interpolated in an optical transmission line, capable of controlling an output state of an input light signal by being supplied with a surface acoustic wave control signal through a control port; a surface acoustic wave control signal source to generate the surface acoustic wave control signal, which is provided at a remote place from the acousto-optic tunable filter; and a control unit that receives an information of the surface acoustic wave control signal from the surface acoustic wave control signal source through remote transmission means, and supplies the surface acoustic wave control signal to the control port of the acousto-optic tunable filter.

Therefore, according to the remote control device of the acousto-optic tunable filter relating to the invention, it is possible to remotely control the acousto-optic tunable filter by the surface acoustic wave control signal generated by the surface acoustic wave control signal source which is remotely located from the acousto-optic tunable filter, whereby the scale of the peripheral equipment of the acousto-optic tunable filter disposed in the optical transmission line, and the power consumption thereof can be reduced, which is advantageous. Further, the surface acoustic wave control signal source is electrically separated from the control unit, which makes it possible to reduce crosstalks to cause disturbances in electronic circuits, which is also advantageous.

Further, the remote control device of the acousto-optic tunable filter according to the invention is characterized by comprising: a first acousto-optic tunable filter interpolated in an upward optical transmission line, capable of controlling an output state of an upward input light signal by being supplied with a first surface acoustic wave control signal through a first control port; a second acousto-optic tunable filter interpolated in a downward optical transmission line, capable of controlling an output state of a downward input light signal by being supplied with a second surface acoustic wave control signal through a second control port; surface acoustic wave control signal sources to generate the first and second surface acoustic wave control signals, which are provided at a remote place from the first and second acousto-optic tunable filters; and control units that receive information of the first and second surface acoustic wave control signals from the surface acoustic wave control signal sources through remote transmission means, and supply the first and the second surface acoustic wave control signal to the first and the second control port, respectively, of the first and second acousto-optic tunable filters.

Therefore, according to the remote control device of the acousto-optic tunable filter relating to the invention, it is possible to remotely control the acousto-optic tunable filter by the surface acoustic wave control signal generated by the surface acoustic wave control signal source which is remotely located from the acousto-optic tunable filter, whereby the scale of the peripheral equipment of the acousto-optic tunable filter disposed in the optical transmission line, and the power consumption thereof can be reduced, which is advantageous. Further, the surface acoustic wave control signal source is electrically separated from the control unit, which makes it possible to reduce crosstalks to cause disturbances in electronic circuits, which is also advantageous.

Further, the remote control device of the acousto-optic tunable filter according to the invention is characterized by comprising: a first acousto-optic tunable filter interpolated in an upward optical transmission line, capable of controlling an output state of an upward input light signal by being supplied with a surface acoustic wave control signal through a first control port; a second acousto-optic tunable filter interpolated in a downward optical transmission line, capable of controlling an output state of a downward input light signal by being supplied with the surface acoustic wave control signal through a second control port; a third acousto-optic tunable filter interpolated in the downstream of the second acousto-optic tunable filter in the downward optical transmission line, capable of controlling an output state of the downward input light signal outputted from the second acousto-optic tunable filter by being supplied with the surface acoustic wave control signal through a third control port; a surface acoustic wave control signal source to generate the surface acoustic wave control signal, which is provided at a remote place from the first, second, and third acousto-optic tunable filters; and a control unit that receives an information of the surface acoustic wave control signal from the surface acoustic wave control signal source through remote transmission means, and supplies the surface acoustic wave control signal to the first, second, and third control ports of the first, second, and third acousto-optic tunable filters.

Therefore, according to the remote control device of the acousto-optic tunable filter relating to the invention, it is possible to remotely control the first, second, and third acousto-optic tunable filters by the surface acoustic wave control signal generated by the surface acoustic wave control signal source which is remotely located from the first, second, and third acousto-optic tunable filters, whereby the scale of the peripheral equipment of the first, second, and third acousto-optic tunable filters disposed in the optical transmission line, and the power consumption thereof can be reduced, which is advantageous. Further, the surface acoustic wave control signal source is electrically separated from the control unit, which makes it possible to reduce crosstalks to cause disturbances in electronic circuits, which is also advantageous.

Further, the optical transmission system containing equalizers using acousto-optic tunable filters according to the invention is characterized in that: a plurality of equalizers are cascaded in the optical transmission line installed between a light signal transmit terminal and a light signal receive terminal, and the equalizers are comprised of the acousto-optic tunable filters capable of controlling output states of input light signals by being supplied with surface acoustic wave control signals through control ports; the optical transmission system contains, at remote places from the acousto-optic tunable filters, surface acoustic wave control signal sources to generate the surface acoustic wave control signals and surface acoustic wave light control signal transmitting units that output to convert the surface acoustic wave control signals from the surface acoustic wave control signal sources into surface acoustic wave light control signals; and each of the equalizers is provided with a control unit including a receiving unit that receives the surface acoustic wave light control signal from the surface acoustic wave light control signal transmitting unit through the optical transmission line and converts the surface acoustic wave light control signal into the surface acoustic wave control signal, and a driving unit that supplies the surface acoustic wave control signal received by the receiving unit to the control port of the acousto-optic tunable filter.

Therefore, according to the optical transmission system containing equalizers using acousto-optic tunable filters relating to the invention, it is possible to build an optical transmission system capable of maintaining the transmission characteristic of the wavelength division multiplexed signal in a good condition, which is advantageous. And in addition, it is possible to remotely control the acousto-optic tunable filter by the surface acoustic wave control signal generated by the surface acoustic wave control signal source which is remotely located from the acousto-optic tunable filter, whereby the scale of the peripheral equipment of the acousto-optic tunable filter disposed in the optical transmission line, and the power consumption thereof can be reduced, which is advantageous. Further, the surface acoustic wave control signal source is electrically separated from the control unit, which makes it possible to reduce crosstalks to cause disturbances in electronic circuits, which is also advantageous.

Further, the optical transmission system containing a optical add/drop multiplexer using an acousto-optic tunable filter according to the invention is characterized in that: the optical add/drop multiplexer is connected through optical transmission lines between a light signal transmit terminal, a light signal receive terminal, and a branch terminal, and is comprised of the acousto-optic tunable filter capable of controlling an output state of an input light signal by being supplied with a surface acoustic wave control signal through a control port; the optical transmission system contains, at a remote place from the acousto-optic tunable filter, a surface acoustic wave control signal source to generate the surface acoustic wave control signal and a surface acoustic wave light control signal transmitting unit that outputs to convert the surface acoustic wave control signal from the surface acoustic wave control signal source into a surface acoustic wave light control signal; and the optical add/drop multiplexer is provided with a control unit including a receiving unit that receives the surface acoustic wave light control signal from the surface acoustic wave light control signal transmitting unit through the optical transmission line and converts the surface acoustic wave light control signal into the surface acoustic wave control signal, and a driving unit that supplies the surface acoustic wave control signal received by the receiving unit to the control port of the acousto-optic tunable filter.

Therefore, according to the optical transmission system containing a optical add/drop multiplexer using an acousto-optic tunable filter relating to the invention, it is possible to remotely control the acousto-optic tunable filter by the surface acoustic wave control signal generated by the surface acoustic wave control signal source which is remotely located from the acousto-optic tunable filter, whereby the scale of the peripheral equipment of the acousto-optic tunable filter disposed in the optical transmission line, and the power consumption thereof can be reduced, which is advantageous. Further, the surface acoustic wave control signal source is electrically separated from the control unit, which makes it possible to reduce crosstalks to cause disturbances in electronic circuits, which is also advantageous. And in addition, it is also possible to achieve a universal OADM-Branching Unit by using the acousto-optic tunable filter, which in consequence makes it possible to build a wavelength division multiplexed transmission network system having a higher flexibility.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 28(a), (b) are block diagrams, each of which explains the operation of an optical switch relating to the applied example of the second modified example of the second embodiment of the present invention;

FIG. 29 is a block diagram to illustrate a wavelength multiplexing demultiplexing device relating to an applied example of the third embodiment of the present invention;

DESCRIPTION OF THE PREFERRED EMBODIMENTS

Preferred embodiments of the present invention will hereafter be described in detail with reference to the accompanying drawings.

(a) Description of a First Embodiment

Figure 1:
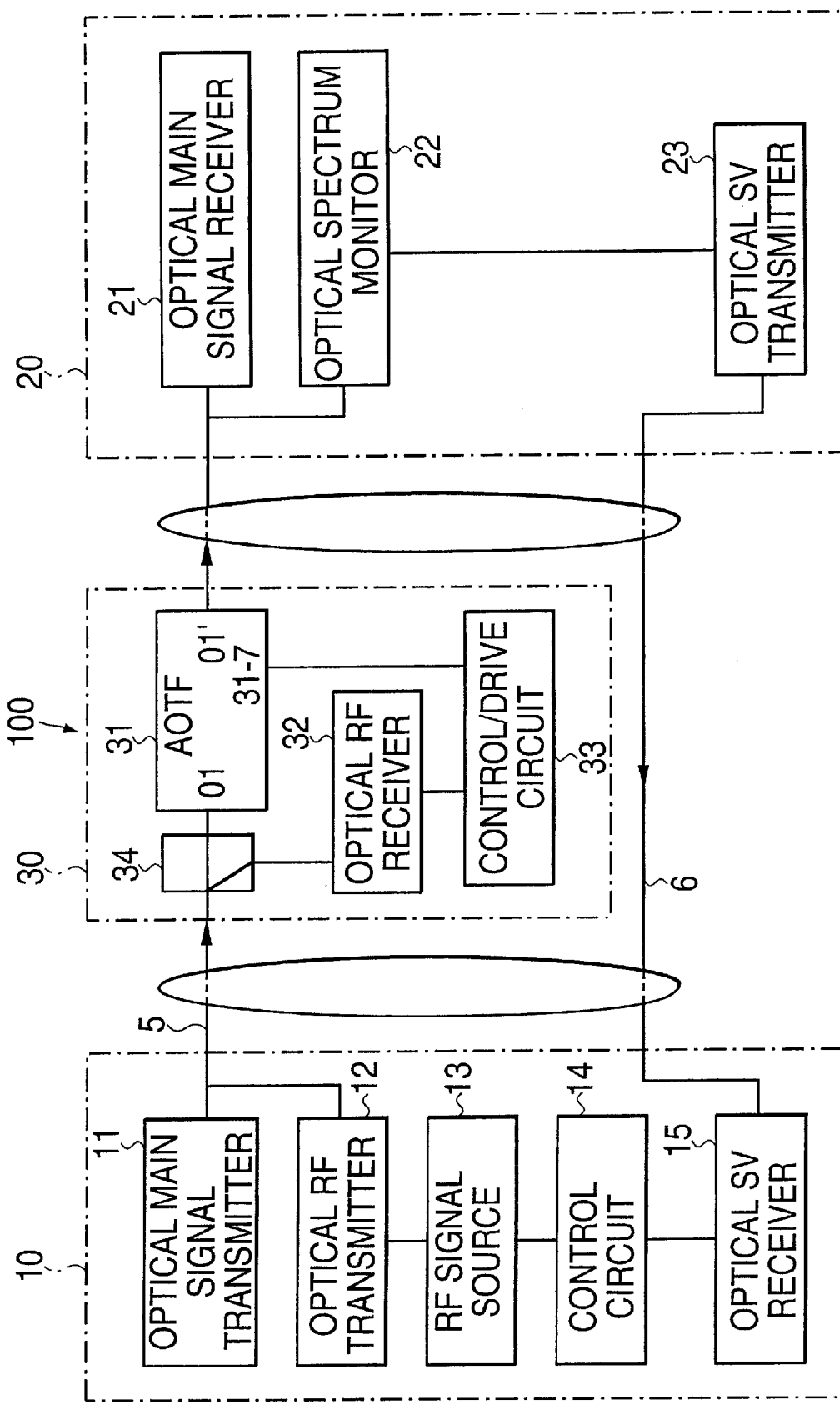
FIG. 1 is a block diagram that illustrates a WDM transmission system using a remote control device of an AOTF relating to a first embodiment of the present invention.

FIG. 1 is a block diagram that illustrates a WDM transmission system using a remote control device of an AOTF relating to the first embodiment of the present invention. The symbol 100 in FIG. 1 indicates the WDM transmission system, in which an optical transmit terminal 10 as a first light signal transmit/receive terminal and an optical receive terminal 20 as a second light signal transmit/receive terminal are connected through optical fibers 5, 6, and an active equalizer 30 is further interpolated between the optical transmit terminal 10 and the optical receive terminal 20.

Here, the optical transmit terminal 10 is configured with an optical main signal transmitter 11, an optical RF transmitter 12, an RF signal source 13, a control circuit 14, and an optical SV receiver 15.

The optical SV receiver 15 as a monitor information receiving unit receives an SV light signal from an optical SV transmitter 23, which contains a monitor information detected by an optical spectrum monitor 22, through the optical fiber 6 as the downward transmission line. And, the optical SV receiver 15 outputs the received monitor information to the control circuit 14.

The control circuit 14 as a unit for controlling a SAW control signal controls the state of an RF signal generated by the RF signal source 13 on the basis of the monitor information detected by the optical spectrum monitor 22. Here, the control circuit 14 is designed to vary, for example, the frequency and power of the RF signal generated by the RF signal source 13 on the basis of the monitor information that is contained in the SV light signal from the optical SV transmitter 23.

The RF (radio frequency) signal source 13 as a source to generate a SAW control signal generates an RF signal to control an AOTF 31. And, if there lies a distortion in a light signal inputted into the AOTF 31, for example, the RF signal source 13 is made to generate a control signal for an equalization processing that eliminates the distortion from a light signal outputted from the AOTF 31. Further, the RF signal source 13 is installed in the optical transmit terminal 10 that is separately located from the AOTF 31.

The optical RF transmitter 12 as a unit to transmit a light signal for controlling a SAW converts an RF signal from the RF signal source 13 into an RF light signal (RF optical signal), and outputs the RF light signal.

And, the RF light signal from the optical RF transmitter 12 is multiplexed in a wavelength division with a main light signal from the optical main signal transmitter 11 in a wavelength multiplexer (not illustrated) as the wavelength division multiplexing means, and the multiplexed light signal is transmitted to the active equalizer 30. Further, the wavelength of the RF light signal is set to a different value from that of the main light signal.

Figure 2A:
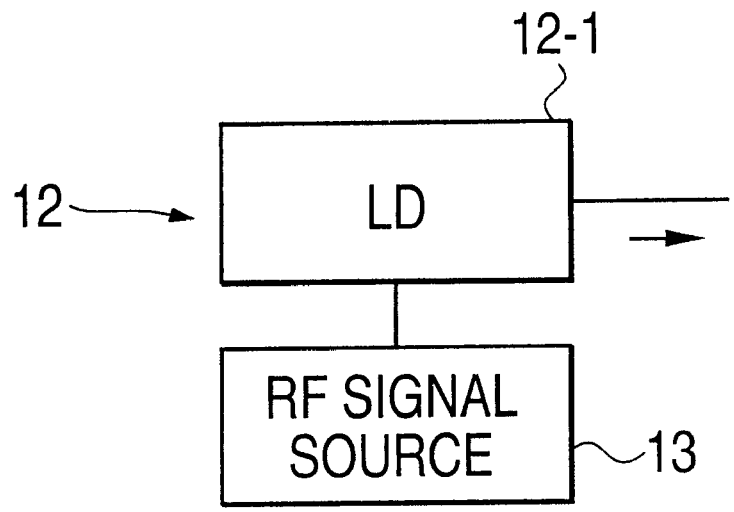
FIGS. 2(a), (b) are block diagrams, each of which illustrates an optical RF transmitter and an RF signal source relating to the first embodiment of the present invention.

FIG. 2(a) is a chart to explain a technique for transmitting an RF light signal. An LD (laser diode, hereunder referred to as LD) 12-1 as the RF optical transmitter 12 shown in FIG. 2(a) emits an LD light signal in accordance with an RF signal from the RF signal source 13.

Figure 3:
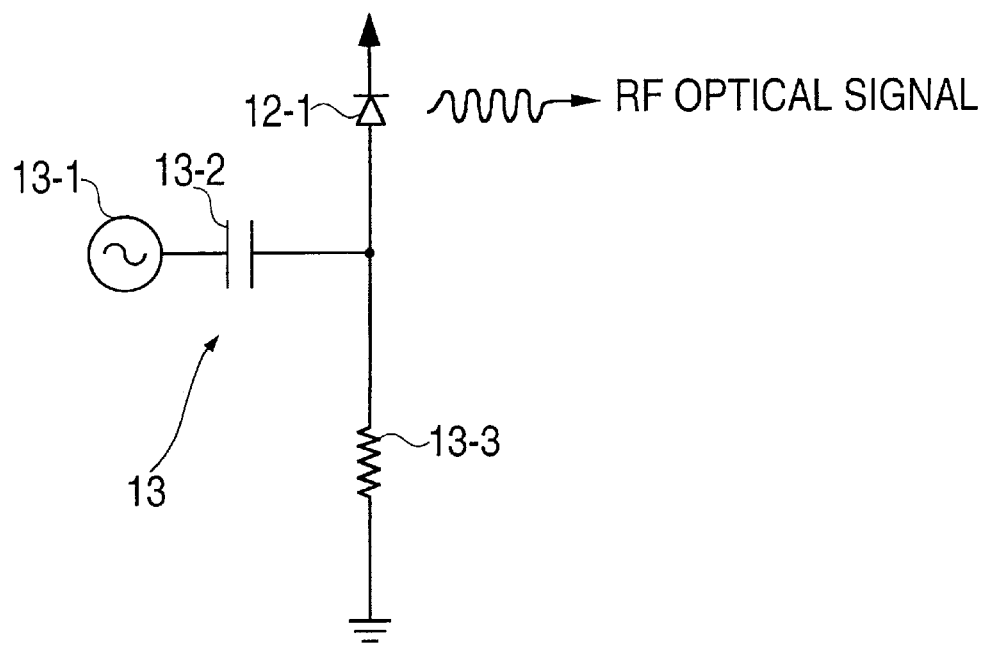
FIG. 3 illustrates an RF light signal (RF optical signal) source relating to the first embodiment of the present invention.

FIG. 3 is a chart to explain a concrete technique for transmitting an RF light signal. Here, the RF signal source 13 can be configured with a VCO 13-1, capacitor 13-2, and a resistor 13-3.

On the other hand, the active equalizer 30 is configured with an optical RF receiver 32, a control/drive circuit 33, the AOTF 31, and an optical splitter 34.

The AOTF 31 is able to control the output state and the like of an input light signal by an RF signal being a SAW control signal supplied to a control port. Concretely, the AOTF 31 compensates the difference in attenuation against frequencies and the difference in delay of transmission, in a transmission band of light signals propagating through the optical fiber 5.

Figure 25:
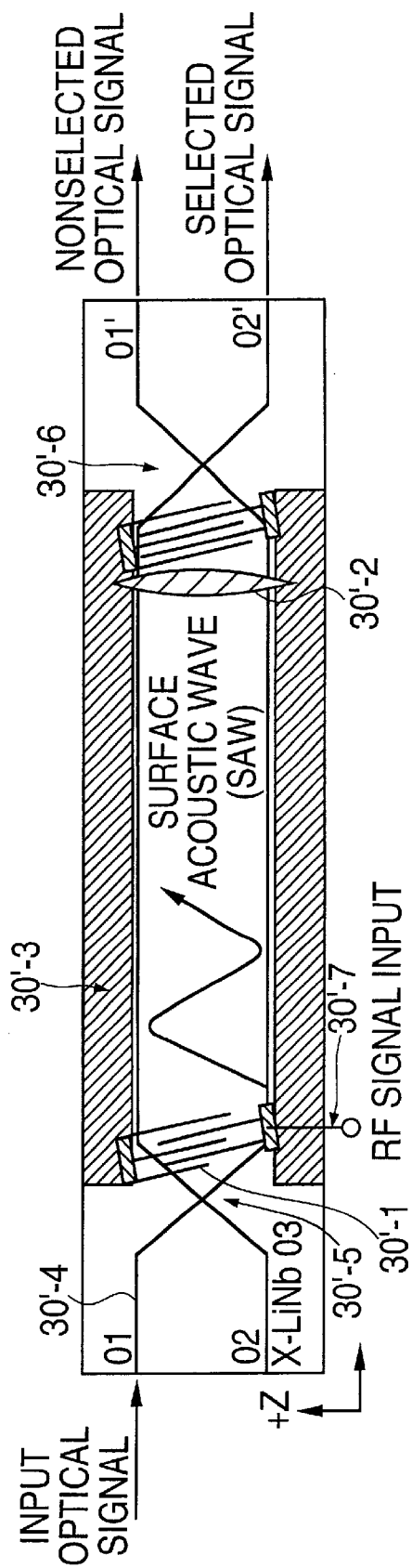
FIG. 25 illustrates an AOTF conventionally proposed.
Figure 26:
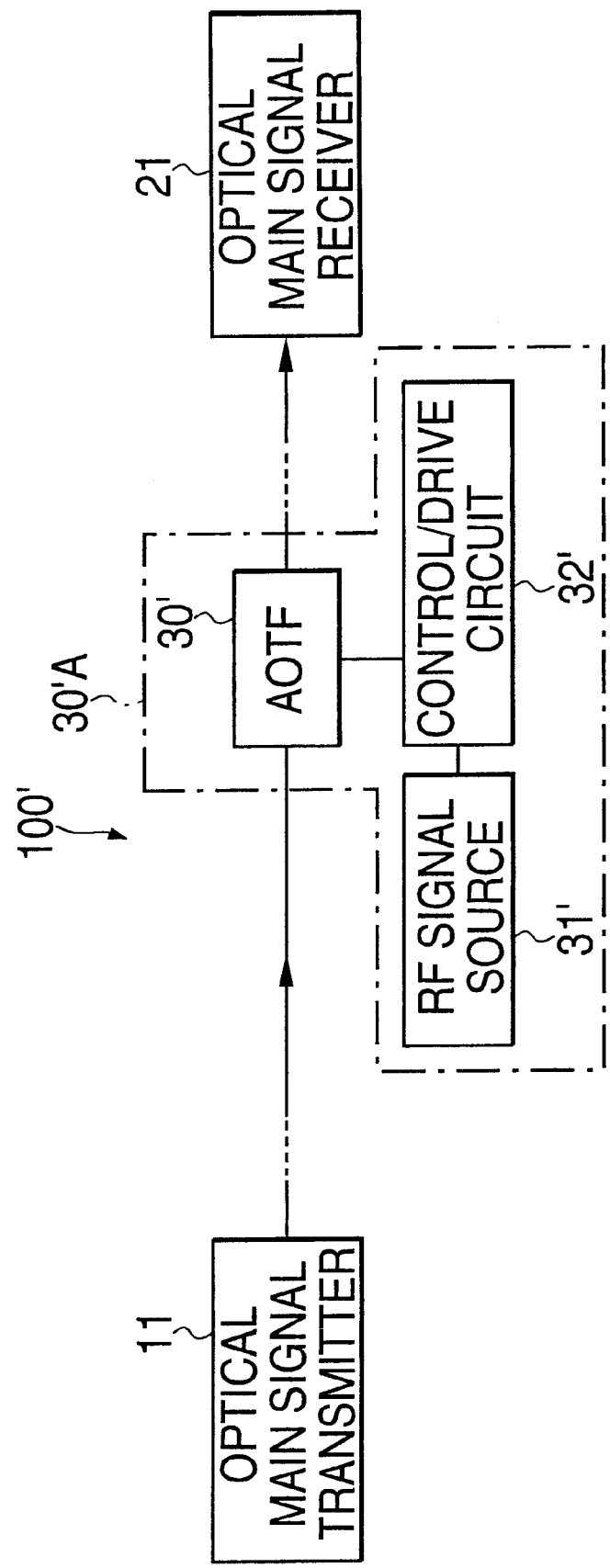
FIG. 26 is a block diagram to illustrate a WDM transmission system using the AOTF conventionally proposed.

The AOTF 31 corresponds to the AOTF 30' shown in the aforementioned FIG. 25.

Further, the AOTF 31 is provided with two input ports (PI) 01, 02 and two output ports (PO) 01', 02', forming a two-input/two-output configuration.

The AOTF 31 is able to freely vary the transmittance characteristic such as the transmitted quantity/stopped quantity of a light signal inputted through the input port by varying the frequency and power of an RF signal inputted through a control port 31-7 (corresponding to the control port 30'-7 of the AOTF 30').

The AOTF 31 will hereunder be described on the assumption that a light signal comes in through the input port (PI) 01 and goes out through the output port (PO) 01'. However, if a light signal is inputted to the input port (PI) 02, the AOTF 31 has the same operation and function.

Figure 4:
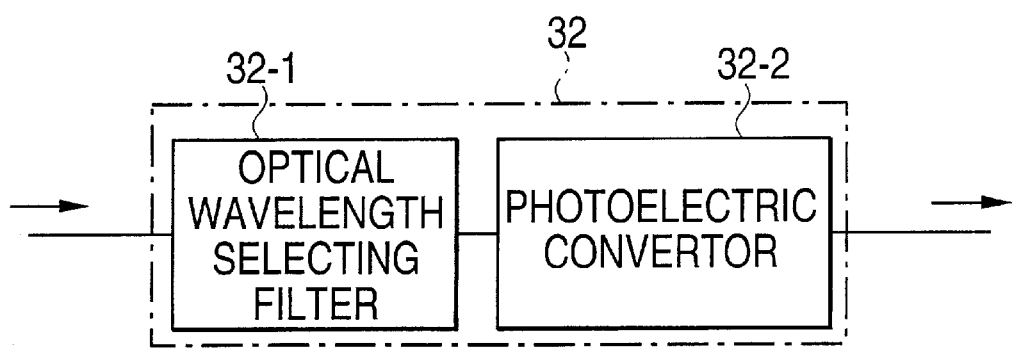
FIG. 4 is a block diagram to illustrate an optical RF receiver relating to the first embodiment of the present invention.

The optical RF receiver 32 as a receiving unit receives an RF light signal from the optical RF transmitter 12 and converts it into an electric signal. As shown in FIG. 4, the optical RF receiver 32 contains an optical wavelength selecting filter 32-1 and a photoelectric convertor 32-2.

The optical wavelength selecting filter 32-1 selectively receives an RF light signal out of a WDM signal transmitted through the optical fiber 5, into which the RF light signal is multiplexed with a light signal transmitted by the optical main signal transmitter 11.

The photoelectric convertor 32-2 converts the RF light signal selected by the optical wavelength selecting filter 32-1 into an electric signal.

That is, in the optical RF receiver 32, the optical wavelength selecting filter 32-1 passes through the RF light signal contained in the WDM signal, and thereafter, the photoelectric convertor 32-2 converts the RF light signal into the electric signal.

Further, a dielectric multilayer film filter, etalon filter, Mach-Zehnder filter, fiber grating filter, etc., can be applied to the optical wavelength selecting filter 32-1. And, a photodiode can be applied to the photoelectric convertor 32-2.

The control/drive circuit 33 as a drive unit supplies the RF signal converted by the optical RF receiver 32 to the AOTF 31. Concretely, the control/drive circuit 33 regulates the electric signal converted by the photoelectric convertor 32-2 of the optical RF receiver 32 into a desired RF signal, whereby the AOTF 31 is controlled and driven. The control/drive circuit 33 supplies the RF signal to the AOTF 31 through the control port 31-7.

Figure 5:
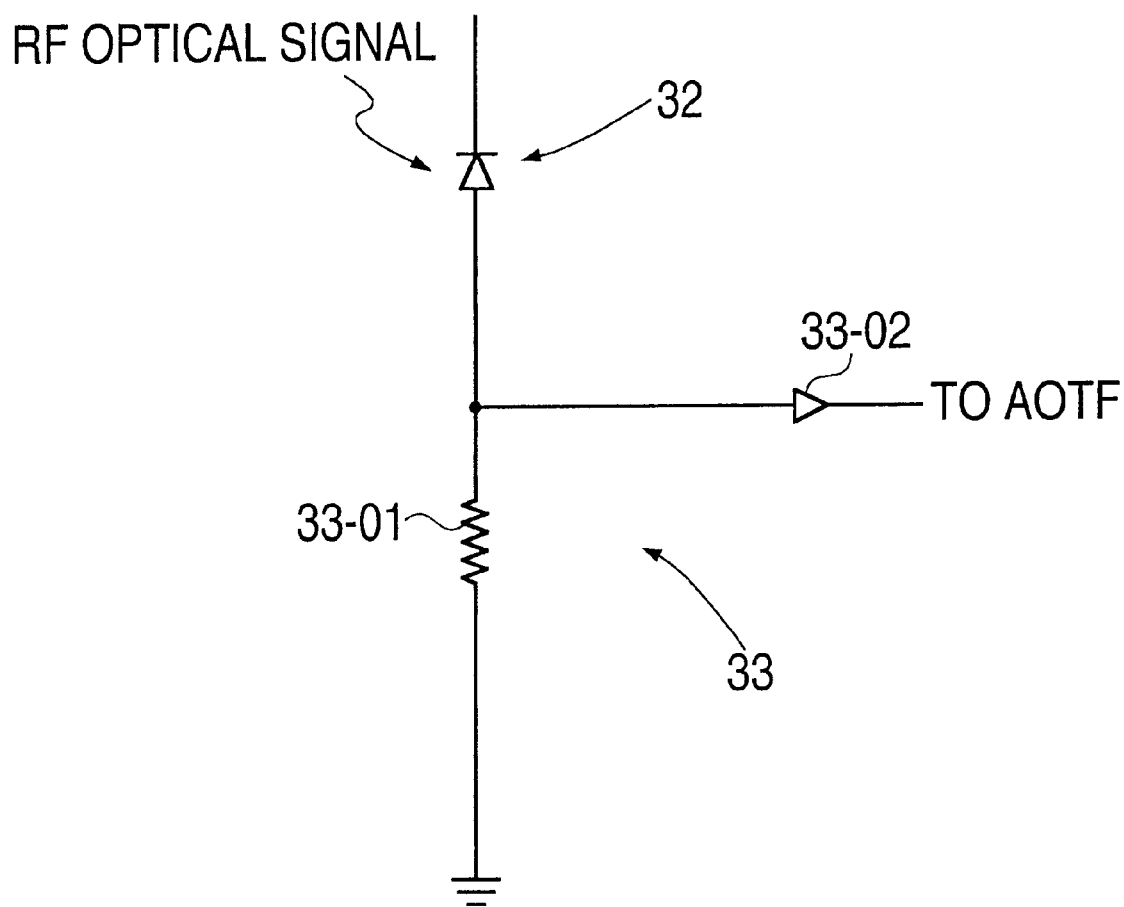
FIG. 5 illustrates a control/drive circuit relating to the first embodiment of the present invention.

The control/drive circuit 33 is made up with an amplifier and a resistor, etc., so as to supply an RF signal suitable for controlling the AOTF 31 to the control port 31-7. FIG. 5 illustrates one example of this circuit. Namely, the control/drive circuit 33 shown in FIG. 5 is configured with a resistor 33-01 and an amplifier 33-02, which supplies the RF signal suitable for controlling the AOTF 31 to the control port 31-7.

Further, the control/drive circuit 33 inputs an RF signal to the RF input port (control port) 31-7 that connects to the transducer (corresponding to the transducer 30'-1 shown in FIG. 25), and drives the transducer to generate a SAW.

Therefore, the active equalizer 30 is provided with the optical RF receiver 32 and the control/drive circuit 33, and thereby the optical RF receiver 32 and the control/drive circuit 33 exhibit a function as a control unit to supply the RF signal suitable for controlling the AOTF 31 to the control port 31-7. In other words, the optical RF receiver 32 and the control/drive circuit 33 receives an information relating to an RF signal from the RF signal source 13 through the optical fiber 5 as remote transmission means, and thereby exhibit a function as a control unit to supply the RF signal to the control port 31-7 of the AOTF 31.

On the other hand, the optical receive terminal 20 is configured with an optical main signal receiver 21, the optical spectrum monitor 22, the optical SV transmitter 23.

The optical spectrum monitor 22 as a monitor unit monitors a light signal information on the output of the AOTF 31 at a remote location through the optical fiber 5. Concretely, the optical spectrum monitor 22 monitors the frequency characteristic of a light signal outputted from the AOTF 31.

The optical SV transmitter 23 transfers a monitor signal, namely, a light signal outputted from the AOTF 31, monitored by the optical spectrum monitor 22 to the optical transmit terminal 10 by using an SV light signal on the reverse line 6 (an optical main signal transmitter in the optical receive terminal 20 and an optical main signal receiver in the optical transmit terminal 10 are not illustrated).

Further, the SV light signal is used for monitoring the state of the light signal that transmits through the optical fiber 5. The SV light signal is transmitted toward the optical transmit terminal 10 by the optical SV transmitter 23, which does not intend that the SV light signal controls the control circuit 14 in the optical transmit terminal 10.

In the remote control device of the AOTF having the foregoing construction, relating to the first embodiment of the present invention, the RF signal source 13 is remotely located from the AOTF 31 of the active equalizer 30, and it outputs an RF signal for driving the AOTF 31 to perform a desired operation.

The optical RF transmitter 12 transmits an RF light signal on the basis of the RF signal from the RF signal source 13. Concretely, the LD 12-1 as the optical RF transmitter 12 transmits a desired light signal on the basis of the RF signal generated by the VCO 13-1, inputted through the capacitor 13-2 and the like.

The RF light signal transmitted by the optical RF transmitter 12 is multiplexed with a main light signal from the optical main signal transmitter 11 in the wavelength multiplexer (not illustrated) as the wavelength division multiplexing means, and the multiplexed light signal is transmitted to the active equalizer 30 through the optical fiber 5.

On the other hand, the optical receiver 32 of the active equalizer 30 receives the WDM signal from the optical transmit terminal 10 through the optical splitter 34.

The optical wavelength selecting filter 32-1 selectively receives an RF light signal out of the WDM signal transmitted through the optical fiber 5, into which the RF light signal is multiplexed with a light signal transmitted by the optical main signal transmitter 11.

The photoelectric convertor 32-2 converts the RF light signal selected by the optical wavelength selecting filter 32-1 into an electric signal. In other words, the photoelectric convertor 32-2 converts the RF light signal passed through the optical wavelength selecting filter 32-1 into the electric signal.

The control/drive circuit 33 supplies an RF signal converted by the optical RF receiver 32 to the control port 31-7 of the AOTF 31. Concretely, the control/drive circuit 33 shown in FIG. 5 supplies to the control port 31-7 the RF signal suitable for controlling the AOTF 31 by means of the resistor 33-01 and the amplifier 33-02.

The AOTF 31 controls the transmittance characteristic such as the transmitted quantity/stopped quantity of a light signal inputted through the input port (PI) 01, outputted by the optical main signal transmitter 11, by receiving the RF signal through the control port 31-7.

Concretely, the AOTF 31 generates a SAW in the transducer, corresponding to the RF signal inputted through the control port 31-7, and compensates, by the acousto-optic effect, the difference in attenuations depending on frequencies and the difference in the transmission delays of the light signals inputted through the input port (PI) 01.

On the other hand, the optical spectrum monitor 22 of the optical receive terminal 20 analyzes the frequency characteristic of a light signal outputted from the AOTF 31, and thereafter, the optical SV transmitter 23 transmits an information analyzed by the optical spectrum monitor 22 to the optical SV receiver 15 of the optical transmit terminal 10, by using an SV light signal.

And, the control circuit 14 of the optical transmit terminal 10 varies the frequency and power of the RF signal from the RF signal source 13 on the basis of the information analyzed in spectrum by the optical spectrum monitor 22 of the optical receive terminal 20.

Therefore, the RF signal source 13 remotely located from the AOTF 31 outputs a suitable RF signal and remotely controls the AOTF 31 under the control of the control circuit 14, through the optical RF transmitter 12, optical RF receiver 32, and control/drive circuit 33.

Thus, according to the remote control device of the AOTF 31 relating to the first embodiment of the present invention, the RF signal source 13 is installed at a remote place from the AOTF 31, and after receiving an RF light signal through the optical fiber 5 as the remote transmission means, the optical RF receiver 32 and the control/drive circuit 33 as the control unit supply an RF signal to the control port 31-7 of the AOTF 31. That is, the RF signal source 13 and the AOTF 31 are not disposed at the same place, which makes it possible to reduce the scale of the device and to suppress the increase of the power consumption, and to prevent the generation of crosstalks based on electronic circuit disturbances in the control/drive circuit 33.

Further, according to the remote control device of the AOTF 31 relating to the first embodiment of the present invention, the device is configured with the optical RF transmitter 12, the optical RF receiver 32, and the control/drive circuit 33; and therefore, a high speed control of the AOTF 31 can be performed by the optical communication between the optical RF transmitter 12 and the optical RF receiver 32.

On the other hand, according to the remote control device of the AOTF 31 relating to the first embodiment of the present invention, the device is configured with the wavelength multiplexer as the wavelength multiplexing means, the optical wavelength selecting filter 32-1, and the photoelectric convertor 32-2. Therefore, the optical fiber to transmit the RF light signal and the one to transmit the main light signal can be shared by each other, which simplifies the construction of the device.

Further, according to the remote control device of the AOTF 31 relating to the first embodiment of the present invention, the device is configured with the optical spectrum monitor 22 as the monitor unit, the optical SV receiver 15 as the monitor information receiving unit, and the control circuit 14 as the control unit for a SAW control signal; and the RF signal source 13 outputs a desired RF signal toward the AOTF 31 on the basis of the frequency characteristic information of light signals received by the optical receive terminal 20. Therefore, it is possible to cope immediately with a situation such that the AOTF 31 does not output a desired light signal.

Figure 2B:
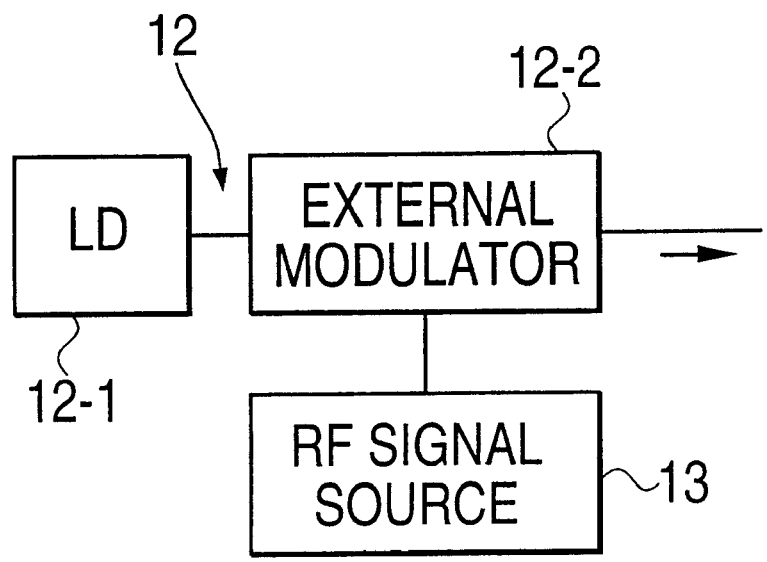

Further, FIG. 2(b) is a chart to explain another technique to transmit an RF light signal, and an optical RF transmitter 12 shown in FIG. 2(b) is configured with the LD 12-1 and an external modulator 12-2. The external modulator 12-2 modulates a light signal from the LD 12-1 on the basis of an RF signal from the RF signal source 13. This type of optical RF transmitter 12 may be applied to the system.

And, the SV light signal used for monitoring the state of light signals transmitted from the AOTF 31 may be a main light signal, or a maintenance light signal for monitor/control, etc.

(a1) Description of a First Modified Example of the First Embodiment

Figure 6:
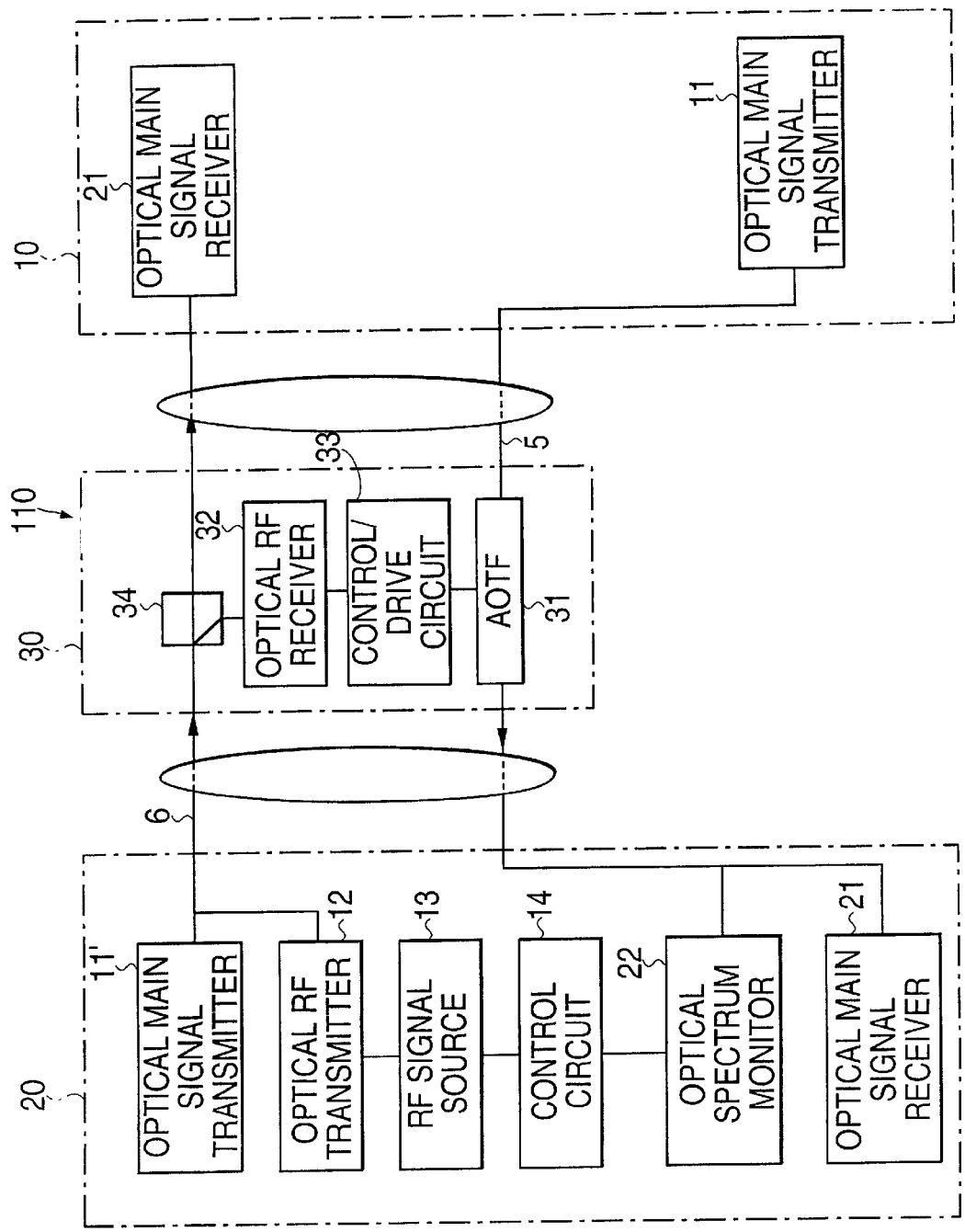
FIG. 6 is a block diagram that illustrates a WDM transmission system using a remote control device of an AOTF relating to a first modified example of the first embodiment of the present invention.

FIG. 6 is a block diagram that illustrates a WDM transmission system using a remote control device of an AOTF relating to a first modified example of the first embodiment. When compared to the WDM transmission system 100 using the remote control device of the AOTF 31 relating to the aforementioned first embodiment, a WDM transmission system 110 using a remote control device of an AOTF 31 relating to the first modified example shown in FIG. 6 is characterized in that the optical RF transmitter 12, the RF signal source 13, and the control circuit 14 are installed in the optical receive terminal 20 on the output of the AOTF 31.

The same numeral symbols as those used in the aforementioned first embodiment represent that the components of the same symbols have the same functions, and the description of those will be omitted.

In order to send an information of an RF signal for controlling the AOTF 31 to the active equalizer 30 from the optical receive terminal 20, the optical RF transmitter 12 transmits an RF light signal to the optical fiber 6 different from the optical fiber 5 in which the AOTF 31 is interpolated.

To achieve the foregoing, the optical splitter 34 is interpolated in the optical fiber 6. A WDM signal split by the optical splitter 34 is guided into the optical RF receiver 32.

In the remote control device of the AOTF 31 with the foregoing construction, relating to the first modified example of the first embodiment of the present invention, the RF signal source 13 is remotely located from the AOTF 31 of the active equalizer 30, and it outputs an RF signal for driving the AOTF 31 to perform a desired operation.

The optical RF transmitter 12 transmits an RF light signal on the basis of the RF signal from the RF signal source 13. Concretely, the LD 12-1 as the optical RF transmitter 12 transmits a desired light signal on the basis of the RF signal generated by the VCO 13-1, inputted through the capacitor 13-2 and the like.

The RF light signal transmitted by the optical RF transmitter 12 is multiplexed with a main light signal from the optical main signal transmitter 11' in the wavelength multiplexer (not illustrated) as the wavelength division multiplexing means, and the multiplexed light signal is transmitted to the active equalizer 30 through the optical fiber 5.

On the other hand, the optical receiver 32 of the active equalizer 30 receives the WDM signal from the optical transmit terminal 20 through the optical splitter 34.

The optical wavelength selecting filter 32-1 selectively receives the RF light signal out of the WDM signal transmitted through the optical fiber 6, into which the RF light signal is multiplexed with a light signal transmitted by the optical main signal transmitter 11'.

The photoelectric convertor 32-2 converts the RF light signal selected by the optical wavelength selecting filter 32-1 into an electric signal. In other words, the photoelectric convertor 32-2 converts the RF light signal passed through the optical wavelength selecting filter 32-1 into the electric signal.

The control/drive circuit 33 supplies an RF signal converted by the optical RF receiver 32 to the control port 31-7 of the AOTF 31. Concretely, the control/drive circuit 33 shown in FIG. 5 supplies to the control port 31-7 the RF signal suitable for controlling the AOTF 31 by means of the resistor 33-01 and the amplifier 33-02.

The AOTF 31 controls the transmittance characteristic such as the transmitted quantity/stopped quantity of a light signal inputted through the input port (PI), outputted by the optical main signal transmitter 11, by receiving an RF signal through the control port 31-7.

Concretely, the AOTF 31 generates a SAW in the transducer, corresponding to the RF signal inputted through the control port 31-7, and compensates, by the acousto-optic effect, the difference in the attenuations depending on frequencies and the difference in the transmission delays of the light signals inputted through the input port (PI).

The optical spectrum monitor 22 analyzes the frequency characteristic of a light signal outputted from the AOTF 31, and then transmits the analyzed information of the light signal to the control circuit 14.

And, the control circuit 14 varies the frequency and power of an RF signal from the RF signal source 13 on the basis of the information analyzed in spectrum by the optical spectrum monitor 22.

Therefore, the RF signal source 13 remotely located from the AOTF 31 outputs a suitable RF signal and remotely controls the AOTF 31 under the control of the control circuit 14, through the optical RF transmitter 12, optical RF receiver 32, and control/drive circuit 33.

Thus, according to the remote control device of the AOTF 31 relating to the first modified example of the first embodiment of the present invention, the device is constructed such that the RF signal source 13 is installed at a remote place from the AOTF 31, and after receiving an RF light signal through the optical fiber 6 as the remote transmission means, the optical RF receiver 32 and the control/drive circuit 33 as the control unit supply an RF signal to the control port 31-7 of the AOTF 31. That is, the RF signal source 13 and the AOTF 31 are not disposed at the same place, which makes it possible to reduce the scale of the device and to suppress the increase of the power consumption, and to prevent the generation of crosstalks based on electronic circuit disturbances in the control/drive circuit 33.

Further, according to the remote control device of the AOTF 31 relating to the first modified example of the first embodiment of the present invention, the device is configured with the optical RF transmitter 12, the optical RF receiver 32, and the control/drive circuit 33; and therefore, a high speed control of the AOTF 31 can be performed by the optical communication between the optical RF transmitter 12 and the optical RF receiver 32.

On the other hand, according to the remote control device of the AOTF 31 relating to the first modified example of the first embodiment of the present invention, the device is configured with the wavelength multiplexer as the wavelength multiplexing means, the optical wavelength selecting filter 32-1, and the photoelectric convertor 32-2. Therefore, the optical fiber to transmit the RF light signal and the one to transmit the main light signal can be shared by each other, which simplifies the construction of the device.

Further, according to the remote control device of the AOTF 31 relating to the first modified example of the first embodiment of the present invention, the device is constructed such that the optical spectrum monitor 22 as the monitor unit and the control circuit 14 as the control unit for a SAW control signal are installed in the same place as the RF signal source 13. Therefore, it is possible to simplify the construction of the device. Since the RF signal source 13 outputs a desired RF signal toward the AOTF 31 on the basis of the frequency characteristic information of light signals received by the optical receive terminal 20, it is also possible to cope immediately with a situation such that the AOTF 31 does not output a desired light signal.

(a2) Description of a Second Modified Example of the First Embodiment

Figure 7:
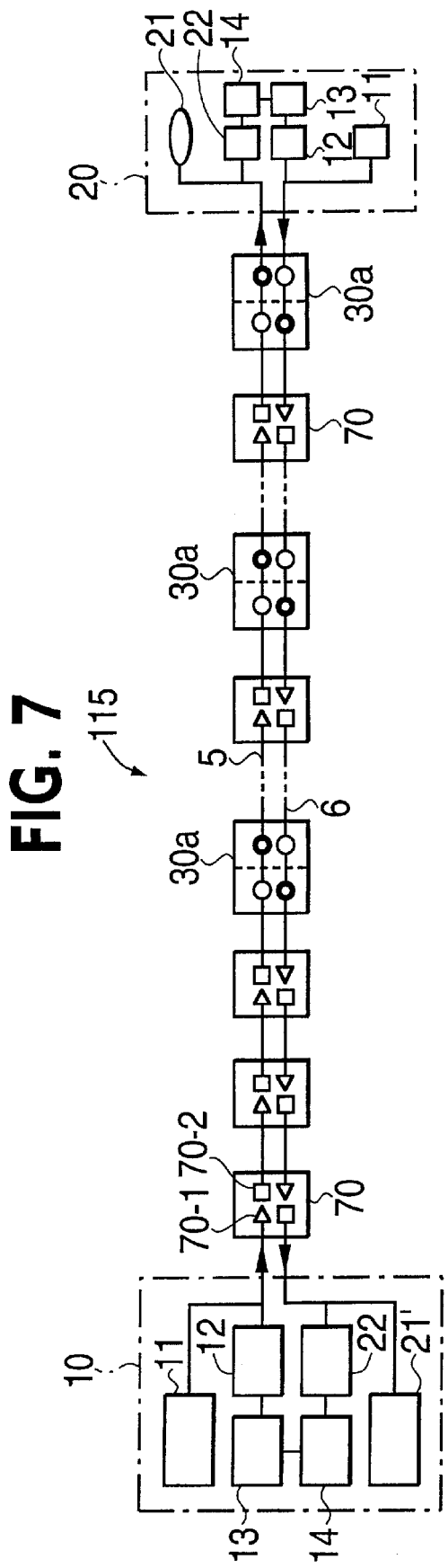
FIG. 7 is a block diagram that illustrates a WDM transmission system using a remote control device of an AOTF relating to a second modified example of the first embodiment of the present invention.

FIG. 7 is a block diagram that illustrates a WDM transmission system using a remote control device of an AOTF relating to a second modified example of the first embodiment. In a WDM transmission system 115 shown in FIG. 7, the terminal 10 is connected to the terminal 20 through upward and downward optical fibers 5, 6, in which a plurality of repeaters 70 and a plurality of active equalizers 30a are interpolated.

The same numeral symbols as those used in the aforementioned first embodiment and the first modified example of the first embodiment represent that the components of the same symbols have the same functions, and the description of those will be omitted.

The repeater 70 is to compensate the attenuation of a light signal propagating through the upward line 5 and the downward line 6. In order to achieve the foregoing, the repeater 70 is provided with an optical amplifier 70-1 and a passive gain equalizer 70-2 in each of the upward line 5 and the downward line 6.

The passive gain equalizer 70-2 is to equalize the dependence of gain upon wavelength of the optical amplifier 70-1. In the passive gain equalizer 70-2 used here, the frequency band of a wavelength loss is determined in advance. That is, the frequency band of the wavelength loss of the passive gain equalizer 70-2 depends upon the design of the device by the maintenance technicians and/or the design engineers of the WDM transmission system, and the like.

Accordingly, the passive gain equalizer 70-2 passes light signals within the frequency band predetermined in the WDM signal transmitted from the optical amplifier 70-1.

Figure 8:
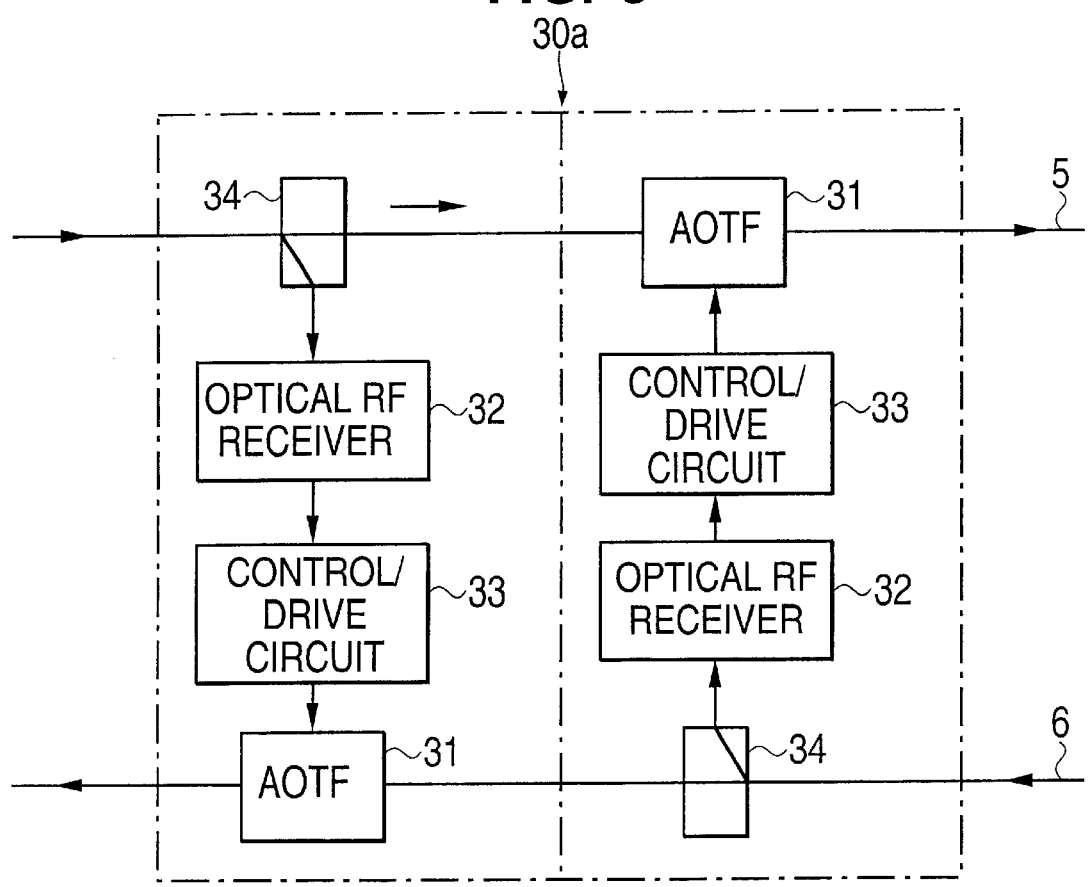
FIG. 8 is a block diagram that illustrates an active equalizer relating to the second modified example of the first embodiment of the present invention.

FIG. 8 is a block diagram to illustrate the active gain equalizer 30a. The active gain equalizer 30a shown here controls the transmittance characteristic such as the transmitted quantity/stopped quantity of a light signal propagating through the upward line 5 and the downward line 6. In order to control each of the light signals propagating through the upward line 5 and the downward line 6, the active gain equalizer 30a is provided with a pair of the optical splitters 34, the optical RF receivers 32, the control/drive circuits 33, and the ATOFs 31 between the upward line 5 and the downward line 6.

The RF light signal containing an information of the RF signal for controlling the AOTFs 31 interpolated in the upward line 5 is multiplexed with the main light signal to be transmitted to the downward line 6 from the terminal 20; and thereafter, the RF light signal is received by the optical RF receiver 32 through the optical splitter 34. To achieve the foregoing, the terminal 20 shown in FIG. 7 is configured with the optical spectrum monitor 22, control circuit 14, the RF signal source 13, the optical RF transmitter 12, and the optical main signal transmitter 11.

Similarly, the RF light signal containing an information of the RF signal for controlling the AOTFs 31 interpolated in the downward line 6 is multiplexed with the main light signal to be transmitted to the upward line 5 from the terminal 10; and thereafter, the RF light signal is received by the optical RF receiver 32 through the optical splitter 34. To achieve the foregoing, the terminal 10 shown in FIG. 7 is configured with the optical spectrum monitor 22, control circuit 14, the RF signal source 13, the optical RF transmitter 12, and the optical main signal transmitter 11.

In the WDM transmission system 115 using the remote control device of the AOTF 31 with the foregoing construction, relating to the second modified example of the first embodiment of the present invention, the RF signal source 13 installed in the terminal 20 remotely located from the AOTFs 31 interpolated in the upward line 5 outputs an RF signal for driving the AOTF 31 to perform a desired operation, when controlling the AOTFs 31 interpolated in the upward line 5.

The control of the AOTFs 31 interpolated in the upward line 5 will hereunder be described; however, the same operation is obtained in the control of the AOTFs 31 interpolated in the downward line 6 by the RF signal outputted from the terminal 10.

The optical RF transmitter 12 transmits an RF light signal on the basis of the RF signal from the RF signal source 13. Concretely, the LD 12-1 as the optical RF transmitter 12 transmits a desired light signal on the basis of the RF signal generated by the VCO 13-1, inputted through the capacitor 13-2 and the like.

The RF light signal transmitted by the optical RF transmitter 12 is multiplexed with a main light signal from the optical main signal transmitter 11 in the wavelength multiplexer (not illustrated) as the wavelength division multiplexing means, and the multiplexed light signal is transmitted into the downward line 6 toward the active gain equalizer 30a.

On the other hand, the optical receiver 32 of the active gain equalizer 30a receives, through the optical splitter 34, a WDM signal that propagates through the downward line 6 from the terminal 20 toward the terminal 10.

The optical wavelength selecting filter 32-1 selectively receives the RF light signal out of the WDM signal transmitted through the downward line 6, into which the RF light signal is multiplexed with a light signal transmitted by the optical main signal transmitter 11.

The photoelectric convertor 32-2 converts the RF light signal selected by the optical wavelength selecting filter 32-1 into an electric signal. In other words, the photoelectric convertor 32-2 converts the RF light signal passed through the optical wavelength selecting filter 32-1 into the electric signal.

The control/drive circuit 33 supplies an RF signal converted by the optical RF receiver 32 to the control port 31-7 of the AOTF 31. Concretely, the control/drive circuit 33 shown in FIG. 5 supplies to the control port 31-7 the RF signal suitable for controlling the AOTF 31 by means of the resistor 33-01 and the amplifier 33-02.

The AOTF 31 controls the transmittance characteristic such as the transmitted quantity/stopped quantity of a light signal inputted through the input port (PI), outputted by the optical main signal transmitter 11 of the terminal 10, by receiving an RF signal through the control port 31-7.

Concretely, the AOTF 31 generates a SAW in the transducer, corresponding to the RF signal inputted through the control port 31-7, and compensates, by the acousto-optic effect, the difference in the attenuations depending on frequencies and the difference in the transmission delays of the light signals inputted through the input port (PI).

The optical spectrum monitor 22 analyzes the frequency characteristic of a light signal outputted from the AOTF 31, and then transmits the analyzed information of the light signal to the control circuit 14.

And, the control circuit 14 varies the frequency and power of an RF signal from the RF signal source 13 on the basis of the information analyzed in spectrum by the optical spectrum monitor 22.

Therefore, the RF signal source 13 remotely located from the AOTF 31 outputs a suitable RF signal and remotely controls the AOTF 31 under the control of the control circuit 14, through the optical RF transmitter 12, optical RF receiver 32, and control/drive circuit 33.

Thus, according to the WDM transmission system 115 using the remote control device of the AOTF 31 relating to the second modified example of the first embodiment of the present invention, the RF signal source 13 is installed at a remote place from the AOTF 31, and after receiving an RF light signal through the upward line 5/downward line 6 as the remote transmission means, the optical RF receiver 32 and the control/drive circuit 33 as the control unit supply an RF signal to the control port 31-7 of the AOTF 31. That is, the RF signal source 13 and the AOTF 31 are not disposed at the same place, which makes it possible to reduce the scale of the device and to suppress the increase of the power consumption, and to prevent the generation of crosstalks based on electronic circuit disturbances in the control/drive circuit 33.

Further, according to the WDM transmission system 115 using the remote control device of the AOTF 31 relating to the second modified example of the first embodiment of the present invention, the system is configured with the optical RF transmitter 12, the optical RF receiver 32, and the control/drive circuit 33; and therefore, a high speed control of the AOTF 31 can be performed by the optical communication between the optical RF transmitter 12 and the optical RF receiver 32.

On the other hand, according to the WDM transmission system 115 using the remote control device of the AOTF 31 relating to the second modified example of the first embodiment of the present invention, the system is configured with the wavelength multiplexer as the wavelength multiplexing means, the optical wavelength selecting filter 32-1, and the photoelectric convertor 32-2. Therefore, the optical fiber to transmit the RF light signal and the one to transmit the main light signal can be shared by each other, which simplifies the construction of the device.

Further, according to the WDM transmission system 115 using the remote control device of the AOTF 31 relating to the second modified example of the first embodiment of the present invention, the system is constructed such that the optical spectrum monitor 22 as the monitor unit and the control circuit 14 as the control unit for a SAW control signal are installed in the same place as the RF signal source 13. Therefore, it is possible to simplify the construction of the device. Since the RF signal source 13 outputs a desired RF signal toward the AOTF 31 on the basis of the frequency characteristic information of light signals received by the optical receive terminal 20, it is also possible to cope immediately with a situation such that the AOTF 31 does not output a desired light signal, and also possible to achieve an optical power equalizer using the AOTF 31, which in consequence maintains the transmission characteristic of the WDM signal in a good condition.

And, according to the WDM transmission system 115 using the remote control device of the AOTF 31 relating to the second modified example of the first embodiment of the present invention, the system operates to compensate the equalization function by the passive gain equalizer 70-2. That is, if the loss wavelength characteristic of the passive gain equalizer 70-2 deviates from a required characteristic, or the gain wavelength characteristic of the optical amplifier 70-1 deviates from a required characteristic, it will bring a transmission error on the system. Based on the transmission error, the active equalizer 30a that operates to receive an RF signal outputted from a remote place prevents the transmission characteristic of a certain channel from being extremely deteriorated; and thus, the system is able to control the loss wavelength characteristic and compensate the transmission error. It is also possible to make up a WDM transmission system to allocate the active equalizer 30a every several repeaters, thus reducing the cost to build the system.

And in addition, according to the WDM transmission system 115 using the remote control device of the AOTF 31 relating to the second modified example of the first embodiment of the present invention, the terminal 20 contains the RF signal source 13 for controlling a plurality of the AOTFs 31 interpolated in the upward line 5, and the terminal 10 contains the RF signal source 13 for controlling a plurality of the AOTFs 31 interpolated in the downward line 6. In other words, the system does not need to install the RF signal source 13 in the active equalizers 30a, which reduces the circuit scale of the active equalizer 30a and simplifies the construction of the WDM transmission system.

(a3) Description of a Third Modified Example of the First Embodiment

Figure 9:
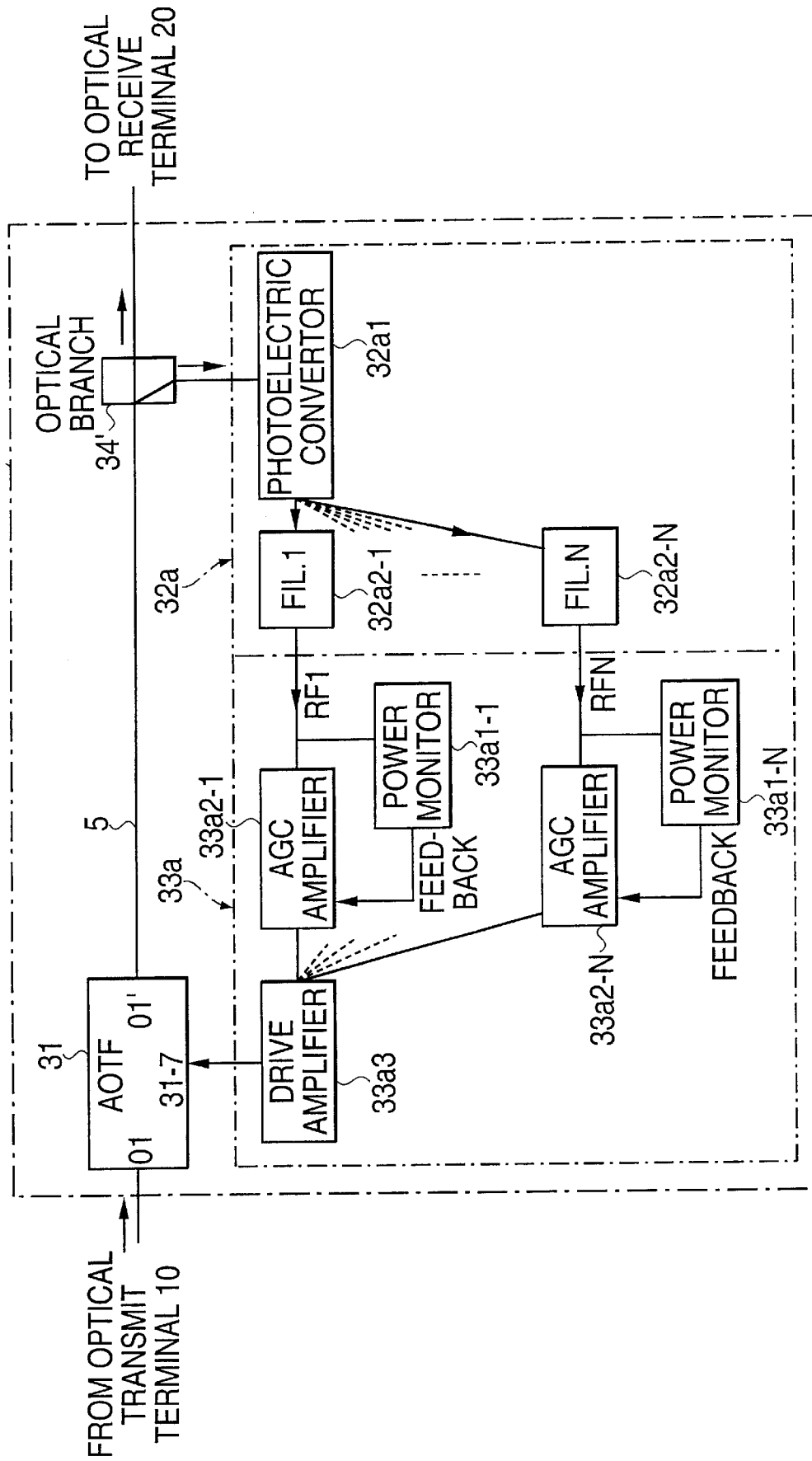
FIG. 9 is a block diagram that illustrates an active equalizer relating to a third modified example of the first embodiment of the present invention.

FIG. 9 is a block diagram to illustrate an active equalizer relating to a third modified example of the first embodiment of the present invention. The active equalizer 30-1 shown in FIG. 9 is similar to the active equalizer 30 in the WDM transmission system 100 relating to the first embodiment shown in FIG. 1 in that both the equalizers are interpolated in the upward line 5 of the optical fibers 5, 6 as the transmission line to connect the optical transmit terminal 10 to the optical receive terminal 20. However, the active equalizer 30-1 differs from the active equalizer 30 relating to the foregoing first embodiment in that the active equalizer 30-1 executes therein a feedback processing as to the information from the RF signal source (not illustrated in FIG. 9).

In order to achieve the foregoing, the active equalizer 30-1 is configured with the AOTF 31, an optical RF receiver 32a, a control/drive circuit 33a, an optical splitter 341. Further, the optical RF receiver 32a contains a photoelectric convertor 32a-1 and filters 32a 2-1~32a 2-N (N: natural number), and the control/drive circuit 33a contains power monitors 33a 1-1~33a 1-N, AGC (automatic gain control, hereunder, referred to as AGC) amplifiers 33a 2-1~33a 2-N, and a drive amplifier 33a 3.

The terminal (not illustrated) located on the input of the active equalizer 30-1 is configured with the optical RF transmitter 12 and the RF signal source 13 which are provided with the optical transmit terminal 10 relating to the foregoing first embodiment. On the other hand, the terminal (not illustrated) located on the output of the active equalizer 30-1 is configured with the optical main signal receiver 21 provided with the optical receive terminal 20 relating to the foregoing first embodiment.

The same numeral symbols as those used in the aforementioned first embodiment represent that the components of the same symbols have the same functions, and the description of those will be omitted.

The terminal 10 (not illustrated in FIG. 9) outputs to the active equalizer 30-1 a light signal which is superposedly modulated by a main signal and an RF signal.

Figure 10A:
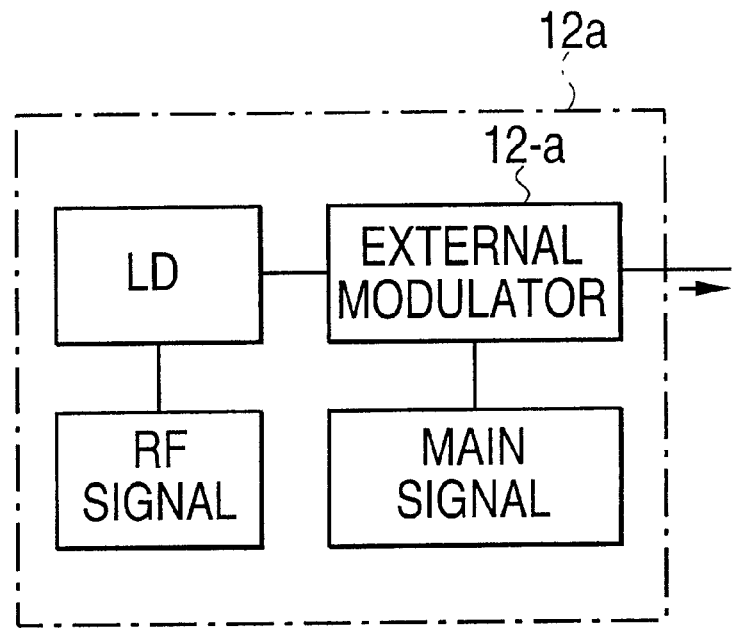
FIGS. 10(a), (b) are block diagrams, each of which illustrates an optical RF transmitter relating to the third modified example of the first embodiment of the present invention.

FIG. 10(a) is a block diagram to illustrate an optical RF transmitter relating to the third modified example of the first embodiment of the present invention. An optical RF transmitter 12a shown in FIG. 10(a) is configured with the LD 12-1 and an external modulator 12-a.

The external modulator 12-a as convolutional modulation means superposedly modulates RF light signals and light signals, and supplies the modulated light signals to the optical fiber 5. Concretely, the external modulator 12-a superposedly modulates the RF light signal superposed by the LD 12-1 on the basis of the RF signal from the RF signal source 13 by the main signal.

In the WDM transmission system, the number of the wavelengths of the main light signal is plural. Accordingly, when superposedly modulating the main light signals of all the wavelengths by the RF light signal, a plurality of the optical RF transmitters 12a as configured in FIG. 10(a) are installed in the optical transmit terminal 10.

Further, when a plurality of the optical RF transmitters 12a are installed in the optical transmit terminal 10, the light signals which are superposedly modulated by the main signals and the RF signals from the optical RF transmitters 12a are multiplexed by a wavelength multiplexer or the like and the multiplexed light signals are transmitted to the active equalizer 30-1.

In the description hereunder, it is premised that the WDM signal consists of light signals ($\lambda 1 \sim \lambda N$, N: natural number) of which wavelengths are different each other, and the light signals ($\lambda 1 \sim \lambda N$) are superposedly modulated by the RF signals and the main signals in the optical transmit terminal 10.

Therefore, the optical transmit terminal 10 transmits to the active equalizer 30-1 the WDM signal in which a plurality of the light signals ($\lambda 1 \sim \lambda N$) superposedly modulated by the RF signals and the main signals are multiplexed.

On the other hand, the photoelectric convertor 32a-1 as a photoelectric transducing unit converts the RF light signal from the optical RF transmitter 12a into an electric signal on the output of the AOTF 31.

Concretely, the photoelectric convertor 32a-1 converts the light signals split by the optical splitter 34' into the electric signals, that is, the photoelectric convertor 32a-1 collectively converts a plurality of the light signals of which wavelengths are different each other into the electric signals. To this photoelectric convertor 32a-1 is applied a device that is able to convert a light signal of a band to cover the whole foregoing wavelengths ($\lambda 1 \sim \lambda N$) into an electric signal.

The electronic filters 32a 2-1~32a 2-N each extract RF signals from the electric signals converted by the photoelectric convertor 32a-1. In other words, after the photoelectric convertor 32a-1 converts the light signals which are superposedly modulated by the RF signals and the main signals by each wavelength into the electric signals, the electronic filters 32a 2-1~32a 2-N extract the RF signals from the electric signals converted by the photoelectric convertor 32a-1.

As the electronic filter 32a 2-1, a bandpass filter, for example, is used which can pass only an RF signal that has superposedly modulated the light signal $\lambda 1$ before the photoelectric convertor 32a-1.

That is, the optical RF receiver 32a receives the RF light signals from the optical RF transmitters 12a on the output of the AOTF 31, and converts them into the RF signals by using the photoelectric convertor 32a-1.

On the other hand, the power monitors 33a 1-1 ~33a 1-N each monitor the RF signals extracted by the electronic filters 32a 2-1~32a 2-N. The power monitor 33a 1-1, for example, applies a detection processing to the RF signal extracted by the electronic filter 32a 2-1, and monitors the RF signal, and in addition the frequency characteristic of the RF signal and the like.

The AGC amplifiers 33a 2-1~33a 2-N each regulate the powers of the RF signals to drive the AOTF 31 on the basis of the information of the RF signals monitored by the power monitors 33a 1-1 ~33a 1-N. The AGC amplifier 33a 2-1, for example, regulates the power of the RF signal to drive the AOTF 31 on the basis of the information of the RF signal monitored by the power monitor 33a 1-1, and supplies the result to the drive amplifier 33a 3.

Thus, the active equalizer 30-1 contains the power monitors 33a 1-1~33a 1-N and the AGC amplifiers 33a 2-1~33a 2-N, and thereby, these power monitors 33a 1-1~33a 1-N and the AGC amplifiers 33a 2-1~33a 2-N display a function as a power regulating unit, and regulate the powers of the RF signals from the electronic filters 32a 2-1~32 2-N.

The drive amplifier 33a 3 as a drive amplifying unit supplies one RF signal into which the power monitors 33a 1-1~33a 1-N and the AGC amplifiers 33a 2-1~33a 2-N regulate the powers of the RF signals from the electronic filters 32a 2-1~32 2-N to the control port 31-7 of the AOTF 31. That is, the drive amplifier 33a 3 synthesizes the RF signals from the AGC amplifiers 33a 2-1~33a 2-N into the one RF signal to thereby control the AOTF 31.

That is, the control/drive circuit 33a is constructed such that the powers of the RF signals received by the optical RF receiver 32a are regulated and synthesized into one, and then the regulated power is supplied to the control port 31-7 of the AOTF 31.

The AOTF 31 is given the RF signal thus regulated to the control port 31-7 from the drive amplifier 33a 3, so that the AOTF 31 is able to transmit a desired WDM signal from the output port (PO) 01' toward the optical receive terminal 20.

In the remote control device of the AOTF 31 having the foregoing construction, relating to the third modified example of the first embodiment of the present invention, the RF signal source 13' remotely located from the AOTF 31 of the active equalizer 30-1 outputs an RF signal to make the AOTF 31 perform a desired operation.

The optical RF transmitter 12a outputs a light signal which is superposedly modulated by a main signal and an RF signal from the RF signal source 13. Concretely, in the optical RF transmitter 12a shown in FIG. 10(a), the external modulator 12-a superposedly modulates by the main signal the RF light signal converted by the LD 12-1 on the basis of the RF signal from the RF signal source 13, and outputs the modulated light signal to the wavelength multiplexer.

And, the light signals ($\lambda 1$~$\lambda N$) from the RF optical transmitters 12a, which are superposedly modulated by the main signals and RF signals, are multiplexed by the wavelength multiplexer or the like, and the multiplexed light signal is transmitted to the active equalizer 30-1 through the optical fiber 5.

On the other hand, in the active equalizer 30-1, the optical RF receiver 32a receives the WDM signal ($\lambda 1$~$\lambda N$) split by the optical splitter 34'. In this optical RF receiver 32a, the photoelectric convertor 32a-1 converts the light signals ($\lambda 1$~$\lambda N$) which are superposedly modulated by the main signals and RF signals into electric signals. Thereafter, each of the electronic filters 32a 2-1~32a 2-N extracts the RF electric signal by each channel.

In the control/drive circuit 33a, the AGC amplifiers 33a 2-1~33a 2-N regulate the powers of the RF signals, and then the drive amplifier 33a 3 synthesizes the RF signals and supplies the synthesized signal to the control port 31-7 of the AOTF 31.

When the AOTF 31 receives the RF signal from the drive amplifier 33a 3 at the control port 31-7, the transducer 30'-1 generates a SAW, and the AOTF 31 regulates the transmission quantity and the like of the main light signal by the acousto-optic effect caused by the SAW and the main light signal; and thereafter, the AOTF 31 outputs the result into the optical fiber 5 toward the optical receive terminal 20 from the output port (PO) 01'.

Further, in the active equalizer 30-1, the optical RF receiver 32a receives through the optical splitter 34' the light signals that the AOTF 31 outputs on the basis of the RF signal whose power is regulated by the control/drive circuit 33a; and thus, a feedback control to make the RF signal in each channel into a constant level is further increased.

The power of the RF signal in each channel is proportional to the power of the light signal, and the power of the RF signal in each channel is kept constant accordingly.

Thus, the active equalizer 30-1 is able to transmit a desired light signal to the optical receive terminal 20.

In this manner, according to the remote control device of the AOTF 31 relating to the third modified example of the first embodiment of the present invention, the RF signal source 13 is installed at a remote place from the AOTF 31, and after receiving an RF light signal through the optical fiber 5 as the remote transmission means, the optical RF receiver 32a and the control/drive circuit 33a as the control unit supply an RF signal to the control port 31-7 of the AOTF 31. That is, the RF signal source 13 and the AOTF 31 are not disposed at the same place, which makes it possible to reduce the scale of the device and to suppress the increase of the power consumption, and to prevent the generation of crosstalks based on electronic circuit disturbances in the control/drive circuit 33a.

Further, according to the remote control device of the AOTF 31 relating to the third modified example of the first embodiment of the present invention, the device is configured with the optical RF transmitter 12a, the optical RF receiver 32a, and the control/drive circuit 33a; and therefore, a high speed control of the AOTF 31 can be performed by the optical communication between the optical RF transmitter 12a and the optical RF receiver 32a.

On the other hand, according to the remote control device of the AOTF 31 relating to the third modified example of the first embodiment of the present invention, the optical RF transmitter 12a contains the external modulator 12-a that outputs to modulate the light signal by the RF signal and the main signal; and therefore, the system does not need the wavelength used only for the RF light signal, and acquires flexibility to select wavelengths.

Further, according to the remote control device of the AOTF 31 relating to the third modified example of the first embodiment of the present invention, the AOTF 31 can be used as a power equalizer. Consequently, the system is able to maintain the transmission characteristic of a WDM signal in a good condition.

Further, according to the remote control device of the AOTF 31 relating to the third modified example of the first embodiment of the present invention, the system is able, by utilizing the property that the power of the RF signal in each channel is proportional to the power of the light signal, to perform a feedback control of the RF signal generated by the remotely located RF signal source 13 so as to regulate the power of the RF signal into a desired value, and to maintain the power of the RF signal in each channel at a constant level.

Figure 11:
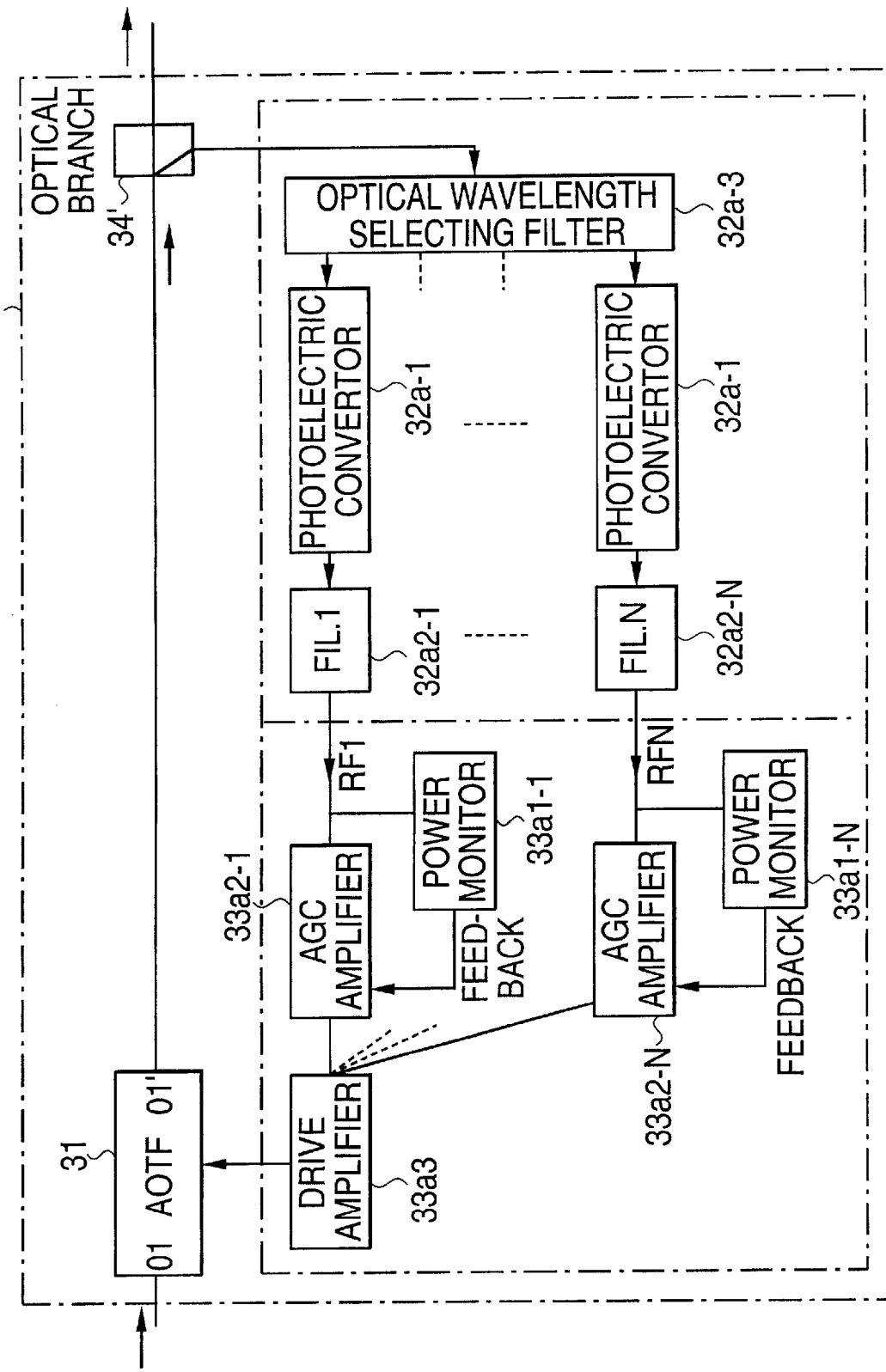
FIG. 11 is a block diagram that illustrates an active equalizer relating to the third modified example of the first embodiment of the present invention.

Incidentally, in the active equalizer 30-1 relating to the third modified example of the foregoing first embodiment, the photoelectric convertor 32a-1 collectively converts a WDM signal containing a plurality of light signals of which wavelengths are different each other into electric signals. Thereafter, the RF signals superposed on the wavelengths are made to be extracted from the electric signals. However, an active equalizer 30-2 shown in FIG. 11 differs from the foregoing equalizer 30-1 in the following points. That is, in the active equalizer 30-2, the optical RF transmitter 32a contains an optical wavelength selecting filter 32a-3 that splits the multiplexed light signal into a plurality of light signals of which wavelengths are different each other, and a plurality of photoelectric convertors 32a1 that convert the light signals split by the foregoing optical wavelength selecting filter 32a-3 each into electric signals.

Concretely, the optical wavelength selecting filter 32a-3 selectively outputs a plurality of the RF light signals of which wavelengths are different each other out of the RF light signals from the optical transmitter 12a on the output of the AOTF 31.

The same numeral symbols as those used in the aforementioned third modified example of the first embodiment represent that the components of the same symbols have the same functions, and the description of those will be omitted.

Also in the remote control device of the AOTF 31 using the foregoing active equalizer 30-2, the system is able to maintain the power of the light signal outputted from the AOTF 31 to a constant level in the same manner as the foregoing example, by performing the photoelectric transducing processing as to the light signal by each wavelength and the similar feedback control.

Figure 10B:
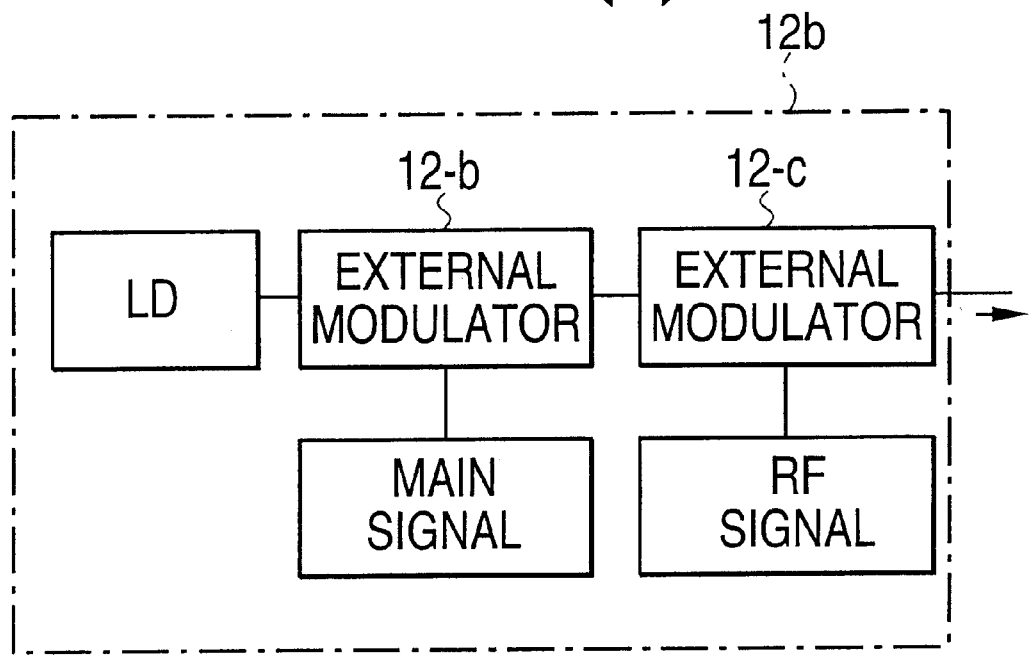

Further, in the remote control device of the AOTF 31 relating to the third modified example of the first embodiment of the present invention, except for the optical RF transmitter 12a as shown in FIG. 10(a) that directly modulates the RF signal, an optical RF transmitter 12b as shown in FIG. 10(b) can be applied, which is configured with an external modulator 12-b to modulate the LD light by the main signal and an external modulator 12-c to modulate the main light signal modulated by the external modulator 12-b by an RF electric signal. To use the optical RF transmitter 12b will achieve a preferable remote control device of the foregoing AOTF 31.

(b) Description of a Second Embodiment

Figure 12:
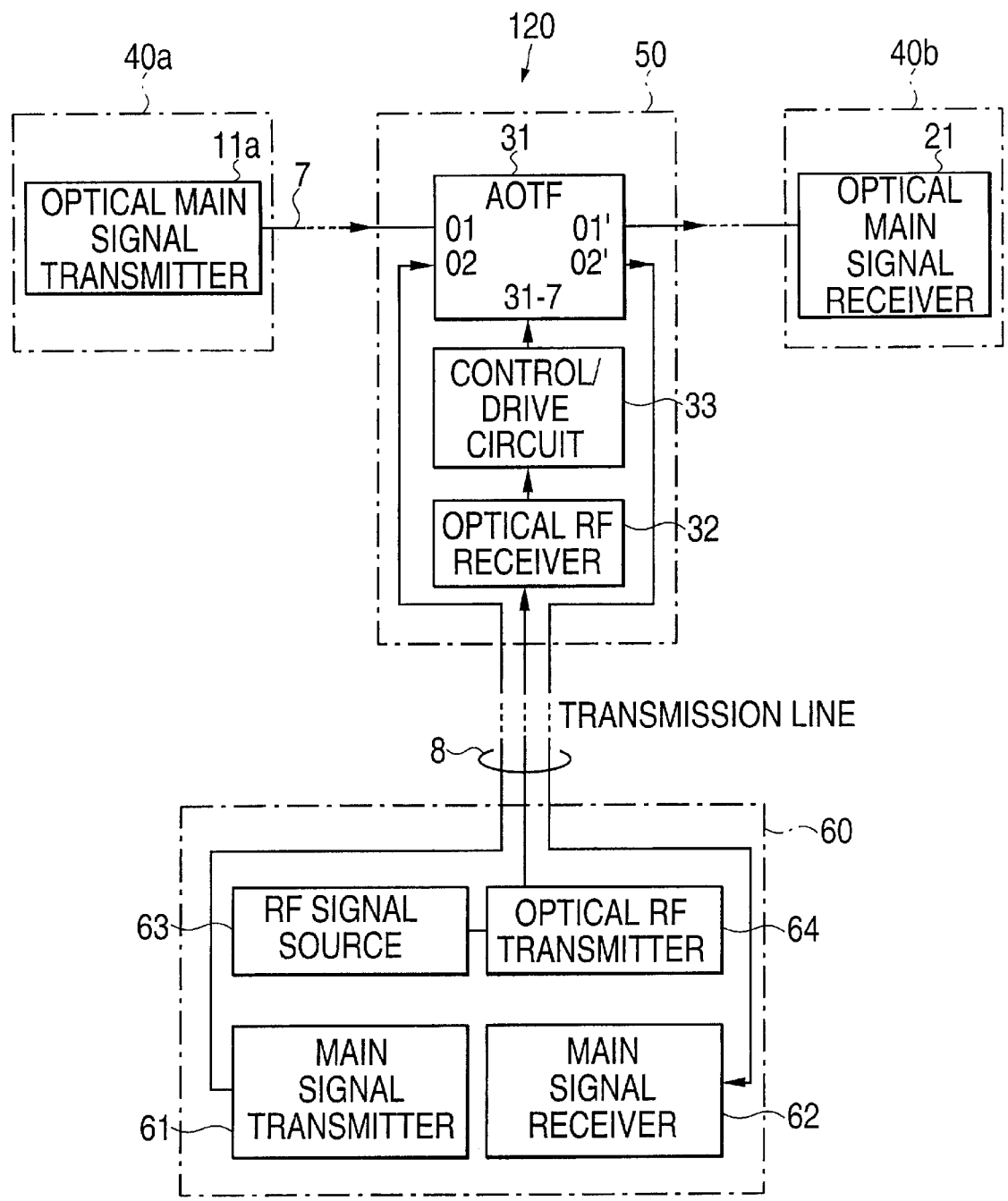
FIG. 12 is a block diagram to illustrate a WDM transmission network in which a remote control device of an AOTF relating to a second embodiment of the present invention is applied.

FIG. 12 is a block diagram that illustrates a WDM transmission network applying a remote control device of an AOTF relating to the second embodiment of the present invention. In a WDM transmission network 120 shown in FIG. 12, a main terminal 40a is connected to a main terminal 40b through an optical fiber 7 as a trunk transmission line, a wavelength multiplexing demultiplexing device 50 is interpolated between the terminal 40a and the terminal 40b, and in addition, a branch terminal 60 is connected to the wavelength multiplexing demultiplexing device 50 through an optical fiber 8 as a transmission line.

An optical main signal transmitter 11a of the main terminal 40a transmits a WDM signal containing light signals of which wavelengths are different each other into the optical fiber 7 toward the wavelength multiplexing demultiplexing device 50.

Receiving the WDM signal from the main terminal 40a through the optical fiber 7, the wavelength multiplexing demultiplexing device 50 is able to split a light signal of a specific wavelength contained in the WDM signal into the branch terminal 60 through the optical fiber 8. Further, receiving a light signal from the branch terminal 60 through the optical fiber 8, the wavelength multiplexing demultiplexing device 50 is able to add the received light signal on the WDM signal propagating through the optical fiber 7 as an add light, and to output it to the main terminal 40b through the optical fiber 7.

Further, the wavelength multiplexing demultiplexing device 50 is able to split a light signal of a specific wavelength from the WDM signal propagating through the optical fiber 7 on the basis of the RF light signal out of the add light and the RF light signal which are contained in the WDM signal transmitted from the branch terminal 60, and is able to add a light signal of a specific wavelength on the WDM signal propagating through the optical fiber 7.

In order to achieve the foregoing, the wavelength multiplexing demultiplexing device 50 is configured with the AOTF 31, control/drive circuit 33 as a control unit, optical RF receiver 32, and wavelength demultiplexer (not illustrated) that splits a WDM signal propagating through the optical fiber 8 into the optical RF receiver 32.

Concretely, the AOTF 31 shown in FIG. 12 is provided with two input ports (PI) 01, 02 and two output ports (PO) 01', 02'; and one input port (PI) 01 of the AOTF 31 is served as an input light signal input port (PI), the other input port (PI) 02 is served as an add light signal input port, and one output port (PO) 01' of the AOTF 31 is served as an output light signal output port, the other output port (PO) 02' is served as a split light signal output port.

The same numeral symbols as those used in the aforementioned first embodiment represent that the components of the same symbols have the same functions, and the description of those will be omitted.

The AOTF 31 receives an RF signal from the control/drive circuit 33 through the control port 31-7 as an add/drop (drop) control port, and controls so as to output a desired light signal not from the output port (PO) 01', but from the output port (PO) 02'.

In other words, the AOTF 31 is able to select the wavelengths of light signals outgoing from the output ports (PO) 01', 02' by varying the frequency of the RF signal, on the basis that the wavelength of the light signal corresponds in one-to-one with the frequency of the RF signal, namely, the frequency of the SAW generated by the transducer under a constant temperature, owing to the acousto-optic effect.

Receiving an RF signal through the control port 31-7, for example, the AOTF 31 outputs a light signal of a desired wavelength, as a split light signal, out of a WDM signal transmitted from the main terminal 40a to the branch terminal 60. That is, the AOTF 31 receives the WDM signal transmitted from the main terminal 40a through the input port (PI) 01, and outputs a specific light signal through the output port (PO) 02', as a split light signal.

Further, receiving an RF signal through the control port 31-7, the AOTF 31 adds a light signal of a specific wavelength on a WDM signal propagating through the trunk optical fiber 7. In other words, receiving the light signal transmitted from the branch terminal 60 through the input port (PI) 02, the AOTF 31 adds the light signal on the WDM signal propagating through the trunk optical fiber 7, and outputs the multiplexed signal through the output port (PO) 01'.

In other words, when there is not an RF signal received through the control port 31-7, the AOTF 31 outputs a light signal inputted through the input port (PI) 01 from the output port (PO) 01', and outputs a light signal inputted through the input port (PI) 02 from the output port (PO) 02'.

Further, as to the RF signal inputted to the control port 31-7 as the add/drop control port, the optical RF receiver 32 converts an RF light signal transmitted from the branch terminal 60 through the optical fiber 8 into an electric signal, and thereafter, the control/drive circuit 33 inputs a desired RF signal to the control port 31-7.

On the other hand, the branch terminal 60 is provided with an optical main signal transmitter 61, an optical main signal receiver 62, an RF signal source 63, optical RF signal transmitter 64 as an optical SAW signal transmitting unit, and a wavelength multiplexer (not illustrated) that multiplexes an add light signal with an RF light signal.

The optical main signal transmitter 61 transmits an add light signal to be added on the WDM signal that the wavelength multiplexing demultiplexing device 50 transmits through the trunk optical fiber 7. On the other hand, the optical main signal receiver 62 receives a split light signal that the wavelength multiplexing demultiplexing device 50 splits from the WDM signal propagating through the trunk optical fiber 7.

The RF signal source 63 generates an RF signal to control and drive the AOTF 31, and the optical RF transmitter 64 converts the RF signal from the RF signal source 63 into an RF light signal to transmit to the optical RF receiver 32. Further, the optical RF transmitter 64 transmits the RF light signal of which frequency is different from that of the light signal transmitted by the optical main signal transmitter 61. Further, the RF light signal transmitted by the optical RF transmitter 64 and the add light signal transmitted by the optical main signal transmitter 61 are multiplexed by the wavelength multiplexer (not illustrated), which is transmitted to the optical receiver 32.

In the remote control device of the AOTF thus constructed, relating to the second embodiment of the present invention, the RF signal source 63 remotely located from the AOTF 31 of the wavelength multiplexing demultiplexing device 50 outputs an RF signal to make the AOTF 31 perform a desired operation. The RF signal is converted into the RF light signal by the optical RF transmitter 64, which is transmitted to the optical RF receiver 32 through the optical fiber 8.

On the other hand, in the wavelength multiplexing demultiplexing device 50, the optical RF receiver 32 extracts the RF light signal from the wavelength multiplexed signal received through the optical fiber 8 and the optical splitter (not illustrated), and converts the RF light signal extracted into an RF electric signal. Thereafter, the control/drive circuit 33 supplies the RF electric signal to the control port 31-7.

Concretely, in the optical RF receiver 32, the optical wavelength selecting filter 32-1 shown in FIG. 4 extracts the RF light signal, and then the photoelectric convertor 32-2 converts the RF light signal into the RF signal.

When the AOTF 31 receives the RF signal from the control/drive circuit 33 through the control port 31-7, the transducer generates a SAW, and thereby the AOTF 31 splits a light signal of a wavelength corresponding to the frequency of the RF signal from the WDM signal propagating through the optical fiber 7, and outputs the split light signal from the output port (PO) 02'. The split light signal from the wavelength multiplexing demultiplexing device 50 is received by the optical main signal receiver 62 of the branch terminal 60 through the optical fiber 8.

On the other hand, when the AOTF 31 receives the RF signal from the control/drive circuit 33 through the control port 31-7, the transducer generates a SAW, and thereby the AOTF 31 adds a light signal from the optical main signal transmitter 61 of the branch terminal 60 and a light signal (add light) of a wavelength corresponding to the frequency of the RF signal on the WDM signal propagating through the trunk optical fiber 7, and outputs the WDM signal from the output port (PO) 01'. The WDM signal outputted from the output port (PO) 01' is received by the optical main signal receiver 21 of the main terminal 40b that is separated by the optical fiber 7.

On the other hand, when there is not an RF signal received through the control port 31-7, the AOTF 31 outputs a light signal inputted through the input port (PI) 01 from the output port (PO) 01', and outputs a light signal inputted through the input port (PI) 02 from the output port (PO) 02'.

Thus, according to the remote control device of the AOTF relating to the second embodiment of the present invention, the RF signal source 63 is installed in the branch terminal 60 remotely located from the AOTF 31 of the wavelength multiplexing demultiplexing device 50, and after receiving an RF light signal through the optical fiber 8 as the remote transmission means, the optical RF receiver 32 and the control/drive circuit 33 as the control unit supply the RF signal to the control port 31-7 of the AOTF 31. That is, the RF signal source 63 and the AOTF 31 are not disposed at the same place, which makes it possible to reduce the scale of the device and to suppress the increase of the power consumption, and to prevent the generation of crosstalks based on electronic circuit disturbances in the control/drive circuit 33.

Further, according to the remote control device of the AOTF relating to the second embodiment of the present invention, the device is configured with the optical RF transmitter 64, the optical RF receiver 32, and the control/drive circuit 33; and therefore, a high speed control of the AOTF 31 can be performed by the optical communication between the optical RF transmitter 64 and the optical RF receiver 32.

Further, to vary the frequency of the RF signal from the RF signal source 63 installed in the branch terminal 60 will select a wavelength of an add light signal to be added on or a split light signal to be split from the AOTF 31 of the wavelength multiplexing demultiplexing device 50.

Incidentally, even though the RF signal source 63 and the optical RF transmitter 64 are installed not in the branch terminal 60, but in the main terminal 40a that is remotely located from the wavelength multiplexing demultiplexing device 50, the device is able to achieve the same effect and function.

Figure 13:
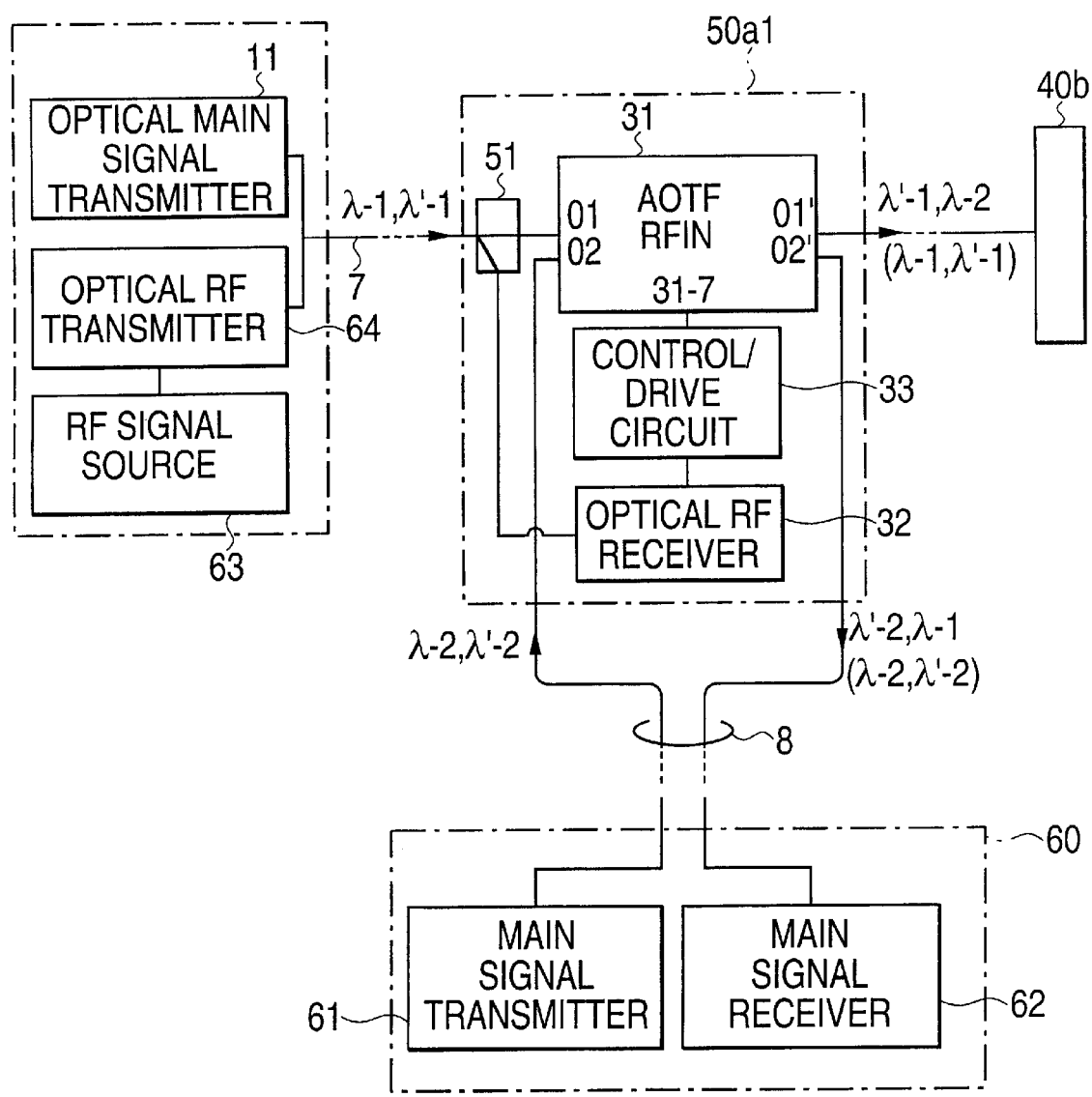
FIG. 13 is a block diagram to illustrate a wavelength multiplexing demultiplexing device relating to the second embodiment of the present invention.

FIG. 13 illustrates a wavelength multiplexing demultiplexing device 50a1 in which the RF signal source 63 and the optical RF transmitter 64 are installed in the main terminal 40a. The wavelength multiplexing demultiplexing device 50a1 shown in FIG. 13 is characterized in that the device 50a1 is designed to receive the RF light signal transmitted through the optical fiber 7, as compared to the wavelength multiplexing demultiplexing device 50 shown in FIG. 12.

As shown in FIG. 13, the RF signal source 63, the optical RF transmitter 64, and the wavelength multiplexer are installed not in the branch terminal 60, but in the main terminal 40a, and thus the WDM transmission system is constructed. The main terminal 40a transmits into the optical fiber 7 a WDM signal in which light signals (indicated as $\lambda$-1, $\lambda$'-1 in FIG. 13) from the optical main signal transmitter 11 and an RF light signal from the optical RF signal transmitter 64 are multiplexed by the wavelength multiplexer.

Each of the light signals $\lambda$1, $\lambda$'-1 in the drawing does not signify a light signal of only one frequency, but can signify a light signal of a plurality of frequencies. This is the same with the other light signals $\lambda$-2, $\lambda$'-2, $\lambda$a-1, $\lambda$a'-1, etc., in the drawing.

And, the wavelength multiplexing demultiplexing device 50a1 is provided with an optical splitter 51, which is interpolated in the optical fiber 7 in front of the input port (PI) 01 of the AOTF 31, so that the WDM signal can be received by the optical RF receiver 32 through the optical splitter 51. Thus, the AOTF 31 is able to split and add a desired light signal in the same manner as the foregoing wavelength multiplexing demultiplexing device 50.

Concretely, when receiving an RF signal through the control port 31-7, the AOTF 31 inputs light signals $\lambda$-1, $\lambda$'-1 from the main terminal 40a through the input port (PI) 01, and outputs the light signal $\lambda$-1 through the output port (PO) 02' and the light signal $\lambda$'-1 through the output port (P/0) 01'.

And, when the AOTF 31 does not receive the RF signal through the control port 31-7, the AOTF 31 inputs the light signals $\lambda$-1, $\lambda$'-1 from the main terminal 40a through the input port (PI) 01, and outputs the light signals λ-1, λ'-1 through the output port (PO) 01'.

Here, the light signals indicated in the parentheses in FIG. 13 denote that the light signals indicated therein go out through the output port (PO) 01', 02' when the RF signal is not supplied to the control port 31-7 of the AOTF 31. This is the same in the other drawings.

In this manner, when the main terminal 40a is provided with the RF signal source 63, optical RF transmitter 64, and the wavelength multiplexer, in the same manner as the foregoing, the RF signal source 63 is installed at a remote place from the AOTF 31 of the wavelength multiplexing demultiplexing device 50a1, and after receiving an RF light signal through the optical fiber 7 as the remote transmission means, the optical RF receiver 32 and the control/drive circuit 33 as the control unit supply an RF signal to the control port 31-7 of the AOTF 31. That is, the RF signal source 63 and the AOTF 31 are not disposed at the same place, which makes it possible to reduce the scale of the device and to suppress the increase of the power consumption, and to prevent the generation of crosstalks based on electronic circuit disturbances in the control/drive circuit 33.

And, the main terminal 40a is provided with the optical RF transmitter 64, and the wavelength multiplexing demultiplexing device 50a1 is provided with the optical RF receiver 32 and the control/drive circuit 33; and thereby, a high speed control of the AOTF 31 can be performed by the optical communication between the optical RF transmitter 64 and the optical RF receiver 32.

(b1) Description of a First Modified Example of the Second Embodiment

Figure 14:
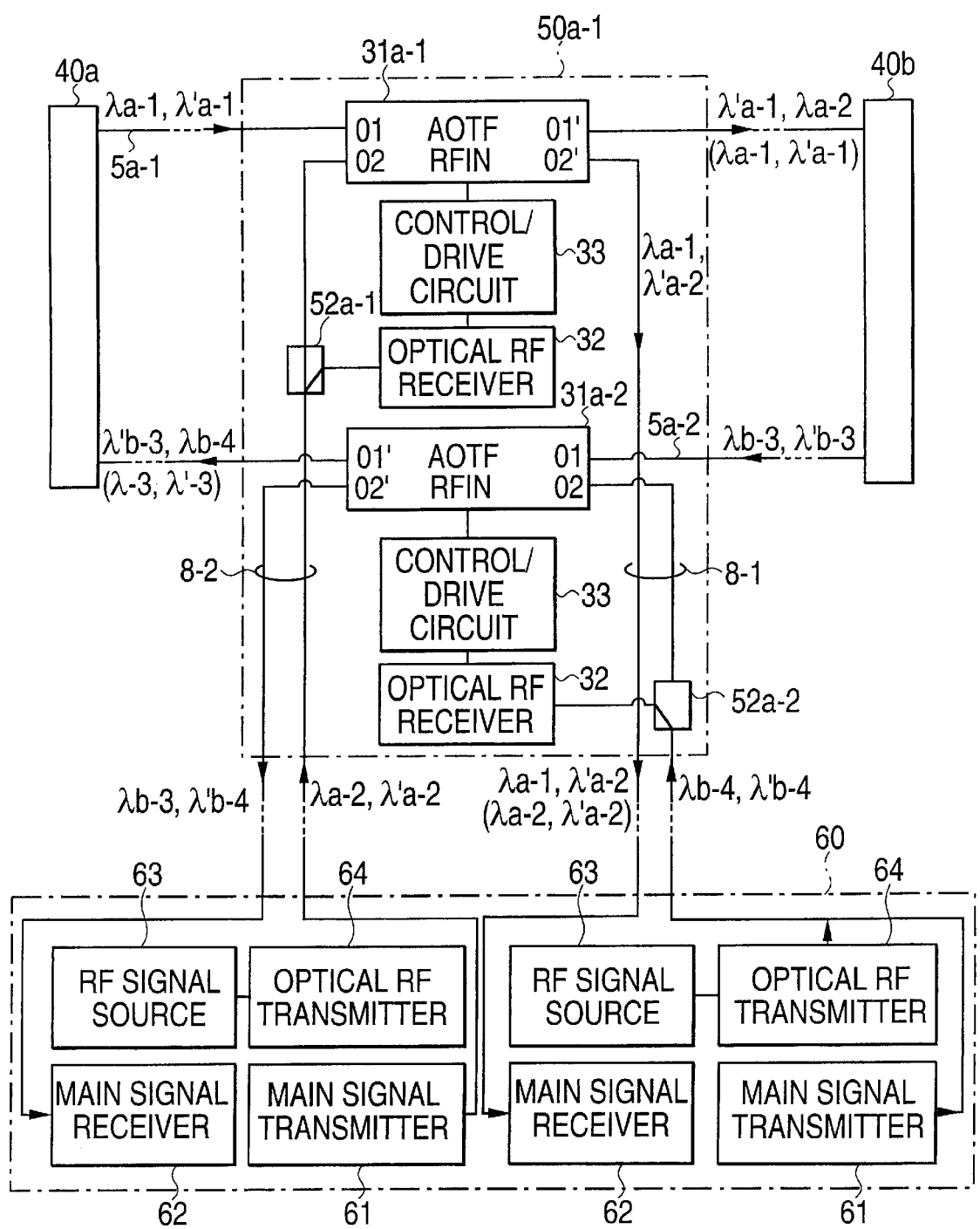
FIG. 14 is a block diagram to illustrate a wavelength multiplexing demultiplexing device relating to a first modified example of the second embodiment of the present invention.

FIG. 14 is a block diagram to illustrate a wavelength multiplexing demultiplexing device relating to a first modified example of the second embodiment of the present invention. A wavelength multiplexing demultiplexing device 50a-1 shown in FIG. 14 is interpolated in an optical fiber 5a-1 as the upward transmission line and an optical fiber 5a-2 as the downward transmission line, which connect two main terminals 40a, 40b. Further, the wavelength multiplexing demultiplexing device 50a-1 is connected to the branch terminal 60 through an optical fiber pair 8-1, 8-2.

And, the wavelength multiplexing demultiplexing device 50a-1 is provided with an AOTF 31a-1 as a first acousto-optic tunable filter, an AOTF 31a-2 as a second acousto-optic tunable filter, two optical RF receivers 32, two control/drive circuits 33, two optical splitters 52a-1, 52a-2.

In other words, the wavelength multiplexing demultiplexing device 50a-1 is provided, as to each of the upward optical fiber 5a-1 and the downward optical fiber 5a-2, with the AOTF 31, the optical RF transmitter 32, and the control/drive circuit 33 which are installed in the wavelength multiplexing demultiplexing device 50 relating to the foregoing second embodiment.

The same numeral symbols as those used in the aforementioned first and second embodiment represent that the components of the same symbols have the same functions, and the description of those will be omitted.

Here, in the same manner as the foregoing remote control device of the AOTF 31 relating to the second embodiment shown in FIG. 12, the branch terminal 60 is configured with the optical RF transmitters 64, the RF signal sources 63, and the like in connection with each of the AOTF 31a-1 and 31a-2 of the wavelength multiplexing demultiplexing device 50a-1.

In other words, the AOTFs 31a-1, 31a-2 each are individually controlled.

And, the output port (PO) 02' of the AOTF 31a-1 and the input port (PI) 02 of the AOTF 31a-2 are connected to the branch terminal 60 by the optical fiber pair 8-1. On the other hand, the input port (PI) 02 of the AOTF 31a-1 and the output port (PO) 02' of the AOTF 31a-2 are connected to the branch terminal 60 by the optical fiber pair 8-2.

Hereunder, the description will be made on the assumption that the branch terminal 60 is provided with the optical RF transmitter 64 and the like.

Further, an optical fiber pair can also be used for the optical fiber 5a-1 as the upward transmission line and the optical fiber 5a-2 as the downward transmission line. When using an fiber pair, the one optical fiber 5a-1 of the fiber pair is connected to the input/output port (PI) 01/(PO) 01' of the AOTF 31a-1, and the other optical fiber 5a-2 of the fiber pair is connected to the input/output port (PI) 01/(PO) 01' of the AOTF 31a-2.

The optical RF transmitters 64 each transmit RF light signals into the optical fibers 8-1, 8-2 through which the WDM signals from the optical main signal transmitters 61 propagate.

The optical receivers 32 receive light signals propagating through the optical fibers 8-1, 8-2 through the optical splitters 52a-1, 52a-2.

In the remote control device of the AOTF thus constructed, relating to the first modified example of the second embodiment of the present invention, the optical RF transmitters 64 provided individually for the AOTF 31a-1 and 31a-2 each convert the RF signals generated by the RF signal sources 63 into light signals, and output the converted light signals into the optical fibers 8-1, 8-2.

The optical receivers 32 each receive the light signals through the optical splitters 52a-1, 52a-2, and convert them into electric signals.

The control/drive circuits 33 each supply the RF signals generated by the remotely located RF signal sources 63 to the control ports 31-7 of the AOTF 31a-1 and 31a-2.

When the AOTFs 31a-1, 31a-2 each receive RF signals as the first SAW control signal/the second SAW control signal through the control ports 31-7, the AOTF 31a-1 and 31a-2 each cause the transducers to generate the SAWs, and output the light signals of desired wavelengths as split light signals to the branch terminal 60 through the output ports (PO) 02', out of the WDM signals inputted through the input ports (PI) 01 through the optical fibers 5a-1, 5a-2.

Concretely, when the AOTF 31a-1 receives an RF signal through the control port 31-7, the AOTF 31a-1 splits the light signal λa-1 corresponding to the RF signal, out of the WDM signals λa-1, λ'-1, and outputs the light signal λa-1 through the output port (PO) 02' as a split light signal.

And, when the AOTF 31a-1 and 31a-2 receive RF signals through the control ports 31-7, the transducers generate SAWs, and the AOTFs 31a-1, 31a-2 input the light signals λa-2, λa'-2: λb-4, λb'-4 to the input ports (PI) 02 through the optical fibers 8-2: 8-1, and output desired light signals λa-2: λb-4 to the optical fibers 5a-1: 5a-2 through the output ports (PO) 01', as add light signals.

Thus, according to the remote control device of the AOTF relating to the first modified example of the second embodiment of the present invention, the RF signal sources 63 are installed in the branch terminal 60 which is remotely located from the AOTFs 31a-1, 31a-2, and after receiving RF light signals through the optical fibers 8-1, 8-2 as the remote transmission means, the optical RF receivers 32 and the control/drive circuits 33 as the control units supply RF signals to the control ports 31-7 of the AOTFs 31a-1, 31a-2. That is, the RF signal sources 63 and the AOTFs 31a-1, 31a-2 are not disposed at the same place, which makes it possible to reduce the scale of the device and to suppress the increase of the power consumption, and to prevent the generation of crosstalks based on electronic circuit disturbances in the control/drive circuits 33.

And, in the remote control device of the AOTF relating to the first modified example of the second embodiment of the present invention, the AOTFs 31a-1, 31a-2 are able to perform the function as the wavelength multiplexer and demultiplexer.

Further, according to the remote control device of the AOTF relating to the first modified example of the second embodiment of the present invention, the device is configured with the optical RF transmitters 64 as SAW transmitting units, the optical RF receivers 32, and the control/drive circuits 33; and therefore, a high speed control of the AOTFs 31a-1, 31a-2 can be performed by the optical communication between the optical RF transmitters 64 and the optical RF receivers 32.

Further, the main terminal 40a may be provided with the optical RF transmitters 64 and the RF signal sources 63.

Figure 15:
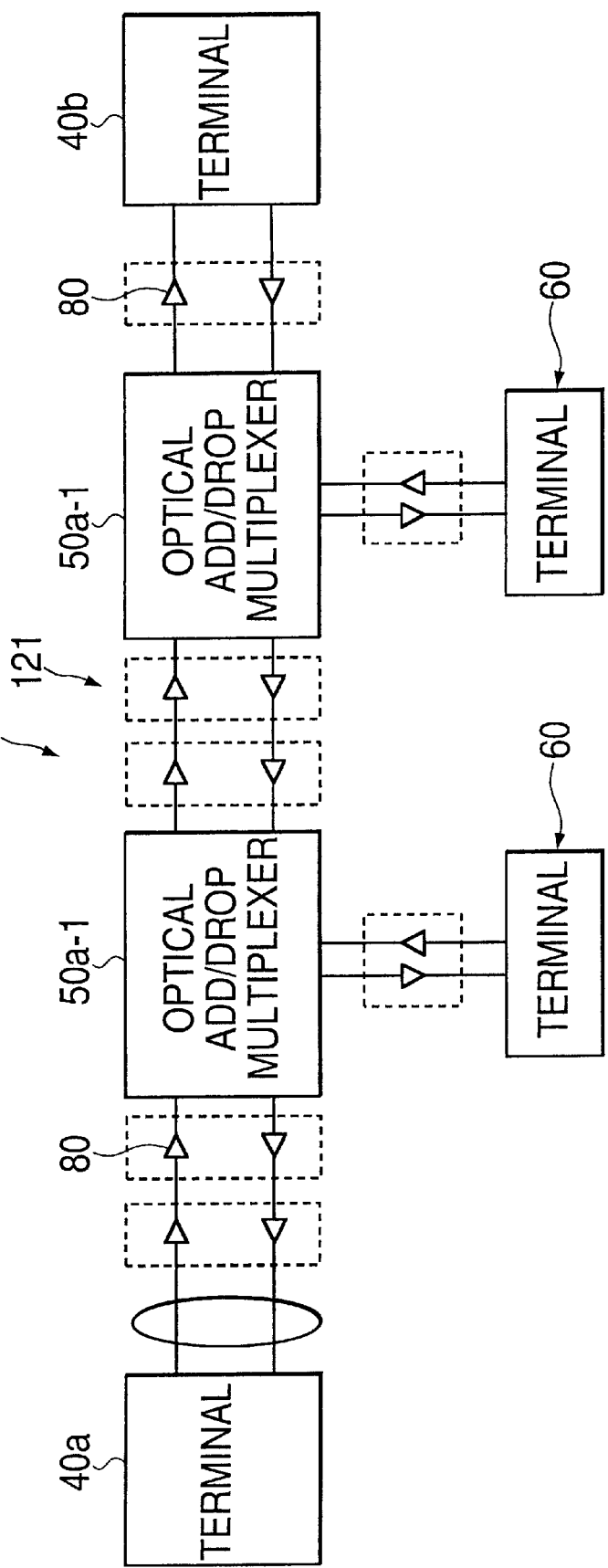
FIG. 15 is a block diagram that illustrates a WDM transmission system using a remote control device of an AOTF relating to the first modified example of the second embodiment of the present invention.

Incidentally, FIG. 15 is a block diagram to illustrate a WDM transmission system 121 that contains a plurality of the foregoing wavelength multiplexing demultiplexing devices 50a-1. A plurality of the wavelength multiplexing demultiplexing devices 50a-1 each receive RF light signals from the branch terminals 60 to select wavelengths for add and split light signals.

Thus, also in the WDM transmission system 121 relating to the first modified example of the second embodiment, the RF signal sources 63 are installed in the branch terminals 60 remotely located from the AOTFs 31 of the wavelength multiplexing demultiplexing devices 50a-1. And, the control/drive circuits 33 as the control units supply the RF signals received by the optical RF receivers 32 to the control ports 31-7 of the AOTFs 31. That is, the RF signal sources 63 and the AOTFs 31 are not disposed at the same place, which makes it possible to reduce the scale of the device and to suppress the increase of the power consumption, and to prevent the generation of crosstalks based on electronic circuit disturbances in the control/drive circuits 33. Further, to use the AOTF 31 will achieve a universal OADM-branching unit. The consequence leads to a possibility to construct a WDM transmission network system having a higher flexibility.

And, when dummy lights to equalize the gains of the amplifiers 80 in the WDM transmission system 121 shown in FIG. 15 are used for the RF light signals, the same effect as the foregoing transmission system 121 can be obtained. That is, since the RF signal sources 63 and the AOTFs 31 are not disposed at the same place, it becomes possible to reduce the scale of the device and suppress the increase of the power consumption, and to prevent the generation of crosstalks based on electronic circuit disturbances in the control/drive circuits 33. Here, the dummy light is a light signal to be supplied to the amplifier 80 in order to supplement insufficiency of a light signal when the light signal inputted to the amplifier 80 is insufficient.

Further, the SV light signal used for monitoring a light signal propagating through the optical fiber 7 as the trunk transmission line can be used as the RF light signal.

(b2) Description of a Second Modified Example of the Second Embodiment

Figure 16:
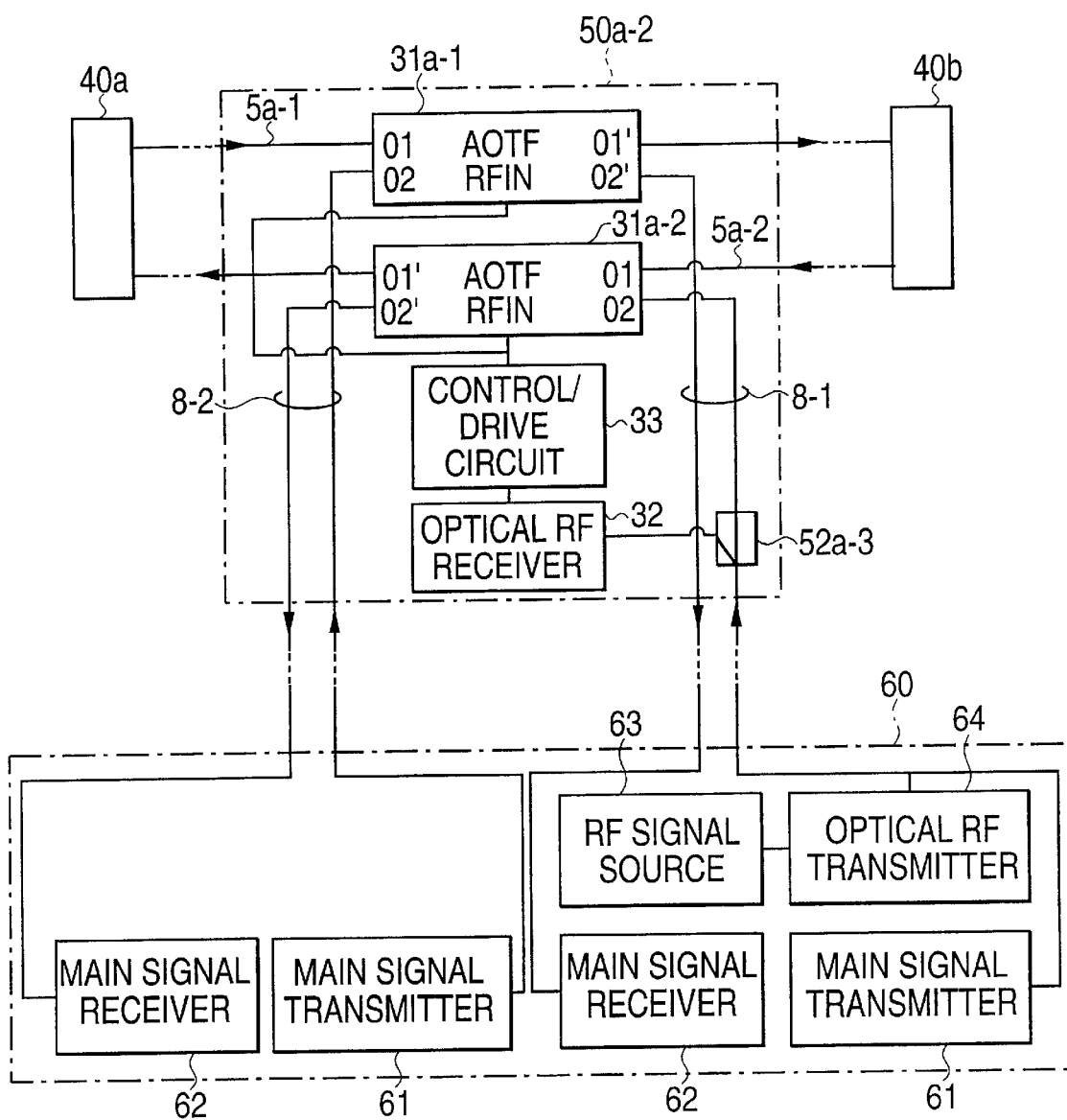
FIG. 16 is a block diagram to illustrate a wavelength multiplexing demultiplexing device relating to a second modified example of the second embodiment of the present invention.

FIG. 16 is a block diagram to illustrate a wavelength multiplexing demultiplexing device relating to a second modified example of the second embodiment of the present invention. A wavelength multiplexing demultiplexing device 50a-2 shown in FIG. 16 is characterized in that the device 50a-2 is designed to cause the foregoing two AOTFs 31a-1, 31a-2 relating to the first modified example of the second embodiment to perform the same operation.

To achieve the foregoing, the wavelength multiplexing demultiplexing device 50a-2 is configured such that the optical RF receiver 32 and the control/drive circuit 33 are not provided individually to the AOTF 31a-1 and the AOTF 31a-2, and one optical RF receiver 32 and one control/drive circuit 33 are shared by the AOTF 31a-1 and the AOTF 31a-2.

The same numeral symbols as those used in the aforementioned first embodiment, the second embodiment, and the first-modified example of the second embodiment represent that the components of the same symbols have the same functions, and the description of those will be omitted.

The optical RF receiver 32 receives an RF light signal from the optical RF transmitter 64 of the branch terminal 60 through the optical splitter 52a-3, and converts it into an RF electric signal. And, the control/drive circuit 33 supplies the RF signal as a common SAW control signal to the control port 31-7 of the AOTF 31a-1 and 31a-2.

Further, the RF light signal modulated by the RF signal to drive the AOTF 31a-1 and 31a-2 is multiplexed with an add light signal, and the multiplexed signal is transmitted through the optical fiber pair 8-1. Here, the RF light signal is received by the optical RF receiver 32 through the optical splitter 52a-3.

In the remote control device of the AOTF thus constructed, relating to the second modified example of the second embodiment of the present invention, the optical RF transmitter 64 provided commonly to the AOTF 31a-1 and 31a-2 converts the RF signal generated by the RF signal source 63 into the light signal, and outputs the RF light signal into the optical fiber 8-1.

The optical receiver 32 receives the RF light signal through the optical splitter 52a-3, and converts it into an RF electric signal.

The control/drive circuits 33 supplies the RF signal generated by the remotely located RF signal source 63 to the control ports 31-7 of the AOTF 31a-1 and 31a-2.

When the AOTFs 31a-1, 31a-2 each receive the RF signal as the common SAW control signal through the control ports 31-7, the AOTF 31a-1 and 31a-2 each cause the transducers to generate the SAWs, and output light signals of desired wavelengths out of the WDM signals inputted to the input ports (PI) 01 through the optical fibers 5a-1, 5a-2, to the branch terminal 60 through the output ports (PO) 02' as split light signals.

And, when the AOTF 31a-1 and 31a-2 each receive the RF signal through the control ports 31-7, the transducers generate SAWs, and the AOTFs 31a-1, 31a-2 input the light signals to the input ports (PI) 02 through the optical fibers 8-1, 8-2 and output desired light signals to the optical fibers 5a-1, 5a-2 from the output ports (PO) 01', as add light signals.

Thus, according to the remote control device of the AOTF relating to the second modified example of the second embodiment of the present invention, the RF signal source 63 is installed in the branch terminal 60 which is remotely located from the AOTFs 31a-1, 31a-2, and the optical RF receiver 32 and the control/drive circuit 33 supply the RF signal as the common SAW control signal to the control ports 31-7 of the AOTFs 31a-1, 31a-2, which makes it possible to reduce the scale of the device.

Figure 27:
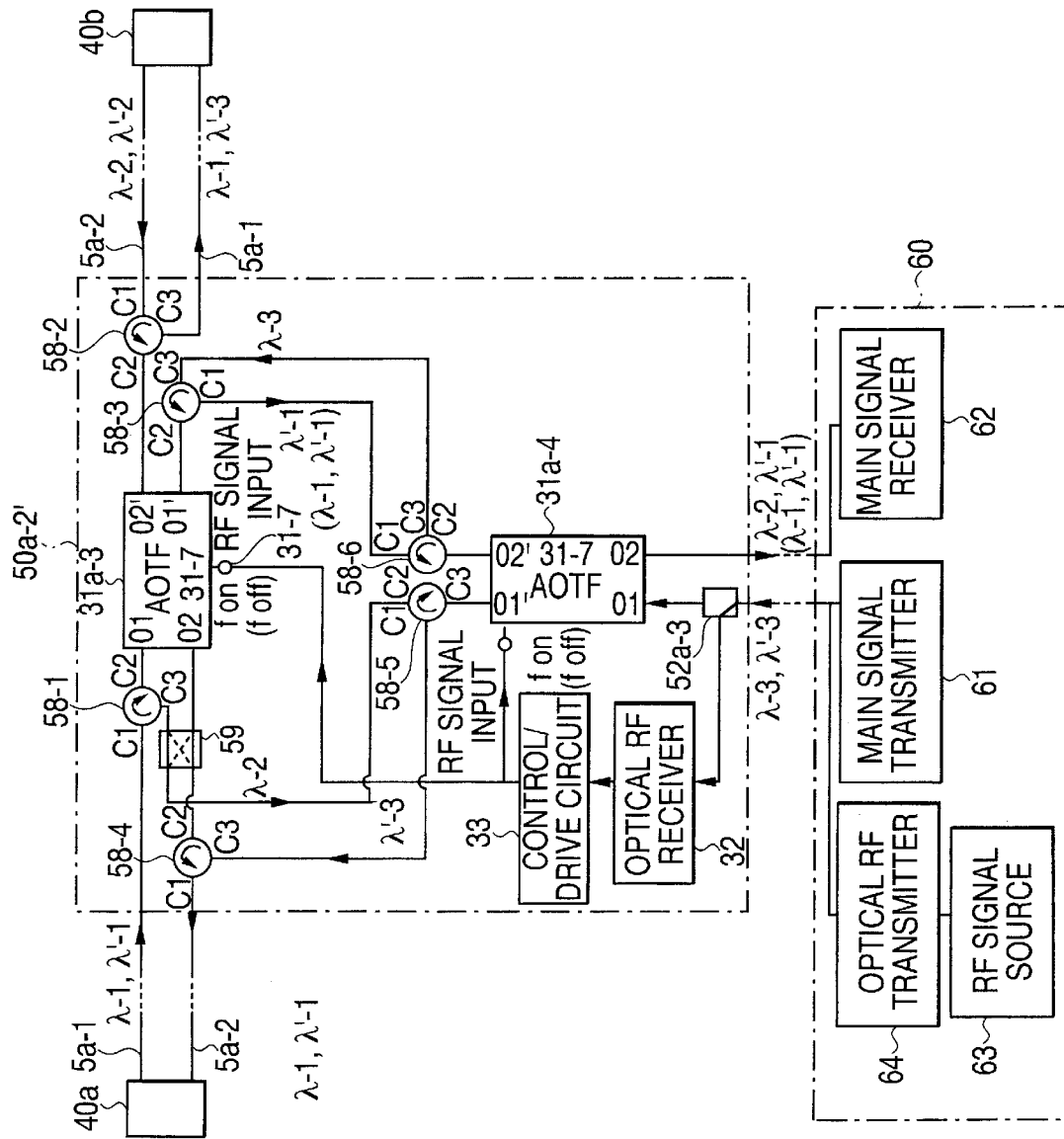
FIG. 27 is a block diagram to illustrate a wavelength multiplexing demultiplexing device relating to an applied example of the second modified example of the second embodiment of the present invention.

Incidentally, FIG. 27 is a block diagram to illustrate a wavelength multiplexing demultiplexing device relating to an applied example of the second modified example of the second embodiment of the present invention. A wavelength multiplexing demultiplexing device 50*a*-2' in FIG. 27 is able to perform the same operation as the foregoing wavelength multiplexing demultiplexing device 50*a*-2. As compared to the foregoing wavelength multiplexing demultiplexing device 50*a*-2 in view of the construction, the wavelength multiplexing demultiplexing device 50*a*-2' is not provided with the AOTF 31*a*-1 and 31*a*-2 each for the optical fiber (upward line) 5*a*-1 and the optical fiber (downward line) 5*a*-2, but provided with an AOTF 31*a*-3 to add and split light signals propagating through the optical fiber (upward line) 5*a*-1 and the optical fiber (downward line) 5*a*-2. Thus, the AOTF 31*a*-3 adds and splits light signals on the upward and downward lines on the basis of the RF signal as the common SAW control signal.

In order to achieve the foregoing function, the wavelength multiplexing demultiplexing device 50*a*-2' is configured with the AOTF 31*a*-3, an AOTF 31*a*-4, three-terminal optical circulators 58-1, 58-2, 58-3, 58-4, 58-5, 58-6, an optical switch 59, the optical RF receiver 32, and the control/drive circuit 33.

The AOTF 31*a*-3 and 31*a*-4 are equivalent to the foregoing AOTF 30', and are further able to input and output light signals through the ports.

The three-terminal circulator (58-1, 58-2, 58-3, 58-4, 58-5, 58-6) is an optical device comprising three terminals (C1, C2, C3). When a light signal comes in through the terminal C1 of the optical circulator 58-1, for example, the circulator 58-1 guides the light signal in the direction indicated by the arrow in FIG. 27, and outputs the light signal through the terminal C2 that the light signal first reaches. For example, light signals 1-1, 1'-1 propagating through the optical fiber 5*a*-1 are forwarded to the AOTF 31*a*-3 through the terminal C2 by the optical circulator 58-1. And, light signals 1-1, 1'-3 outputted through the output port 02' of the AOTF 31*a*-3 are forwarded to the optical fiber 5*a*-1 through the terminal C3 by the optical circulator 58-2.

The optical switch 59 is to switch the transmission path of a light signal. FIGS. 28(*a*), (*b*) are block diagrams, each of which explains the operation of the optical switch relating to the applied example of the second modified example of the second embodiment of the present invention. The optical switch 59 shown in FIG. 28(*a*) illustrates the transmission path when the RF signal is not inputted to the AOTF 31*a*-3 and 31*a*-4, and the optical switch 59 shown in FIG. 28(*b*) illustrates the transmission path when the RF signal is inputted to the AOTF 31*a*-3 and 31*a*-4.

When the RF signal is not inputted to the AOTF 31*a*-3 and 31*a*-4, the light signal from the terminal C3 of the optical circulator 58-1 is transmitted to the optical circulator 58-4 through the optical switch 59. And, when the RF signal is inputted to the AOTF 31*a*-3 and 31*a*-4, the light signal from the terminal C3 of the optical circulator 58-1 is transmitted to the optical circulator 58-5 through the optical switch 59.

In the foregoing construction, the optical RF receiver 32 receives an RF light signal from the branch terminal 60 remotely located from the AOTF 31*a*-3 and 31*a*-4, and the control/drive circuit 33 supplies a desired RF signal to the control ports 31-7 of the AOTF 31*a*-3 and 31*a*-4, thus performing the remote control of the AOTF 31*a*-3 and 31*a*-4.

(b3) Description of a Third Modified Example of the Second Embodiment

Figure 17:
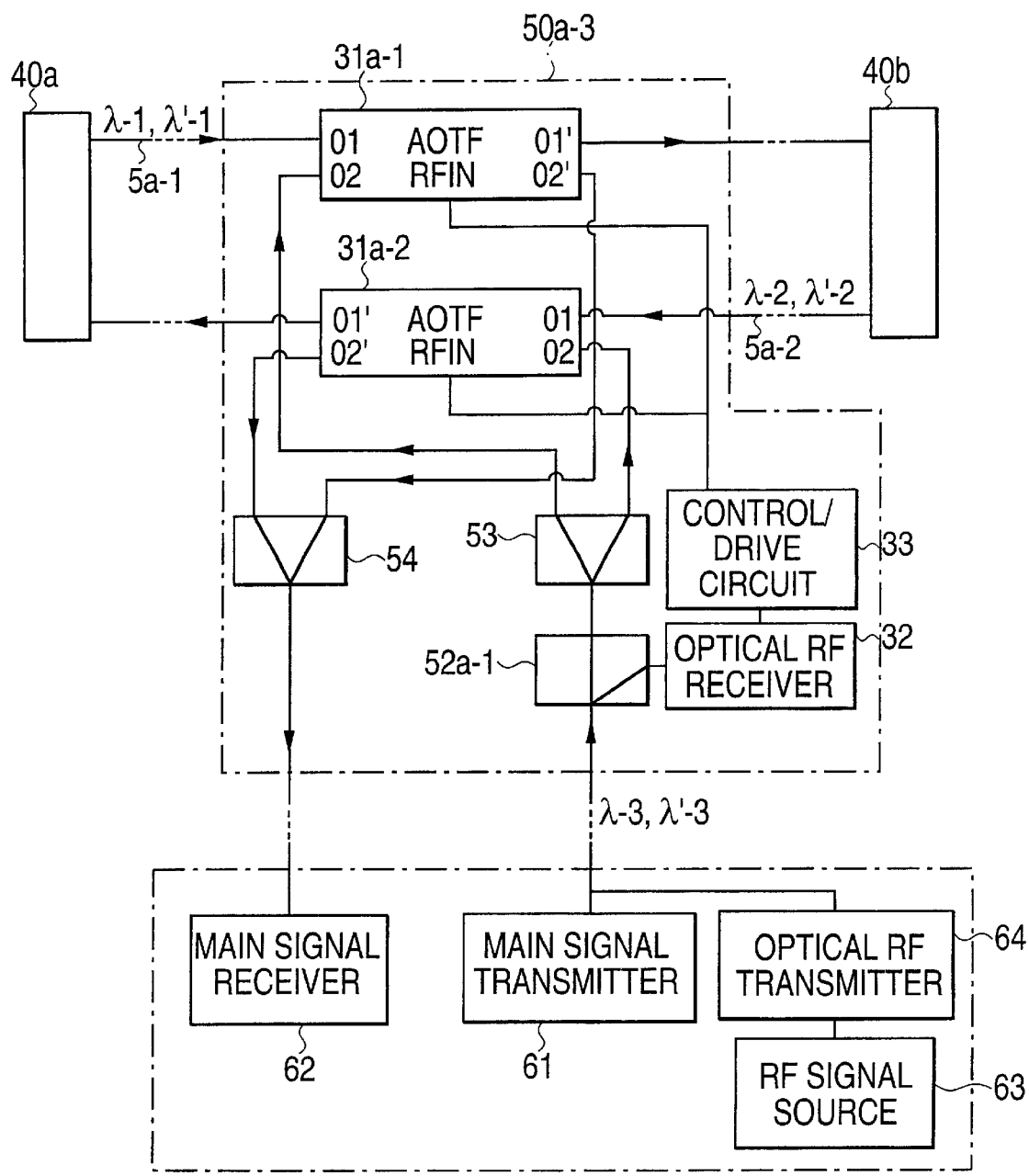
FIG. 17 is a block diagram to illustrate a wavelength multiplexing demultiplexing device relating to a third modified example of the second embodiment of the present invention.

FIG. 17 is a block diagram to illustrate a wavelength multiplexing demultiplexing device relating to a third modified example of the second embodiment of the present invention. A wavelength multiplexing demultiplexing device 50*a*-3 shown in FIG. 17 is characterized in that the transmission lines of split light signals from the AOTF 31*a*-1 and the AOTF 31*a*-2 are combined into one transmission line, and the transmission lines of add light signals toward the AOTF 31*a*-1 and the AOTF 31*a*-2 are combined into one transmission line.

To achieve the foregoing, the wavelength multiplexing demultiplexing device 50*a*-3 is configured with a wavelength demultiplexer (or optical splitter, etc.) 53, a wavelength multiplexer 54, the AOTF 31*a*-1, 31*a*-2, the optical splitter 52*a*-1, the optical RF receiver 32 and the control/drive circuit 33.

The same numeral symbols as those used in the aforementioned first embodiment, the second embodiment, and the second modified example of the second embodiment represent that the components of the same symbols have the same functions, and the description of those will be omitted.

The wavelength multiplexer 54 adds a split light signal outputted from the output port (PO) 02' as a first split light signal output port of the AOTF 31*a*-1 and a split light signal outputted from the output port (PO) 02' as a second split light signal output port of the AOTF 31*a*-2, and the added light signal is transmitted to the branch terminal 60. On the other hand, the wavelength demultiplexer 53 splits add light signals as first and second add light signals into the input ports (PI) 02 of the AOTF 31*a*-1 and 31*a*-2.

The first add light signal is transmitted to the input port (PI) 02 of the AOTF 31*a*-1 from the wavelength demultiplexer 53, and the second add light signal is transmitted to the input port (PI) 02 of the AOTF 31*a*-2 from the wavelength demultiplexer 53.

Further, when combining the two transmission lines between the wavelength multiplexing demultiplexing device 50*a*-3 and the branch terminal 60 into one transmission line, it is necessary to determine the allocation of wavelengths so that the wavelengths of the light signals do not overlap.

On the other hand, the wavelength multiplexing demultiplexing device 50*a*-3 and the branch terminal 60 are connected by the optical fiber pair 8-3. Concretely, the output of the wavelength multiplexer 54 is connected to one optical fiber of the fiber pair 8-3, and the input of the optical splitter 52*a*-1 is connected to the other optical fiber of the fiber pair 8-3.

In the remote control device of the AOTF thus constructed, relating to the third modified example of the second embodiment of the present invention, the optical RF transmitter 64 converts the RF signal as the common SAW control signal generated by the RF signal source 63 remotely located from the AOTF 31*a*-1 and 31*a*-2 into an RF light signal, and transmits the RF light signal into the optical fiber pair 8-3.

The RF optical receiver 32 receives the RF light signal through the optical splitter 52*a*-1, and converts it into an RF electric signal.

The control/drive circuit 33 supplies the RF signal generated by the remotely located RF signal source 63 to the control ports 31-7 of the AOTF 31*a*-1 and 31*a*-2.

When the AOTFs 31*a*-1, 31*a*-2 each receive the RF signal as the common SAW control signal through the control ports 31-7, the AOTF 31*a*-1 and 31*a*-2 each cause the transducers to generate the SAWs, and output light signals of desired wavelengths of the WDM signals inputted to the input ports (PI) 01 through the optical fibers 5*a*-1, 5*a*-2, to the branch terminal 60 through the output ports (PO) 02' as split light signals.

And, when the AOTF 31*a*-1 and 31*a*-2 receive the RF signal through the control ports 31-7, the transducers generate SAWs, and the AOTF 31*a*-1, 31*a*-2 receive the light signals through the input ports (PI) 02 through the optical fiber pair 8-3, and output desired light signals as add light signals to the optical fibers 5*a*-1, 5*a*-2 through the output ports (PO) 01'.

Thus, according to the remote control device of the AOTF relating to the third modified example of the second embodiment of the present invention, in addition to the effect described in the foregoing (b), the device comprises the wavelength demultiplexer (or optical splitter) 53 and the wavelength multiplexer 54, which makes it possible to connect the wavelength multiplexing demultiplexing device 50*a*-3 to the branch terminal 60 with fewer transmission lines, thereby lowering the cost to construct the device.

Further, according to the remote control device of the AOTF relating to the third modified example of the second embodiment of the present invention, the RF signal source 63, the optical RF transmitter 64 as the SAW control signal transmitting unit, the optical splitter 52*a*-1, the optical RF receiver 32, and the control/drive circuit 33 are designed to supply the RF signal to the control ports 31-7 as the first and second control ports of the AOTFs 31*a*-1, 31*a*-2, thereby reducing the scale of the device.

(b4) Description of a Fourth Modified Example of the Second Embodiment

Figure 18:
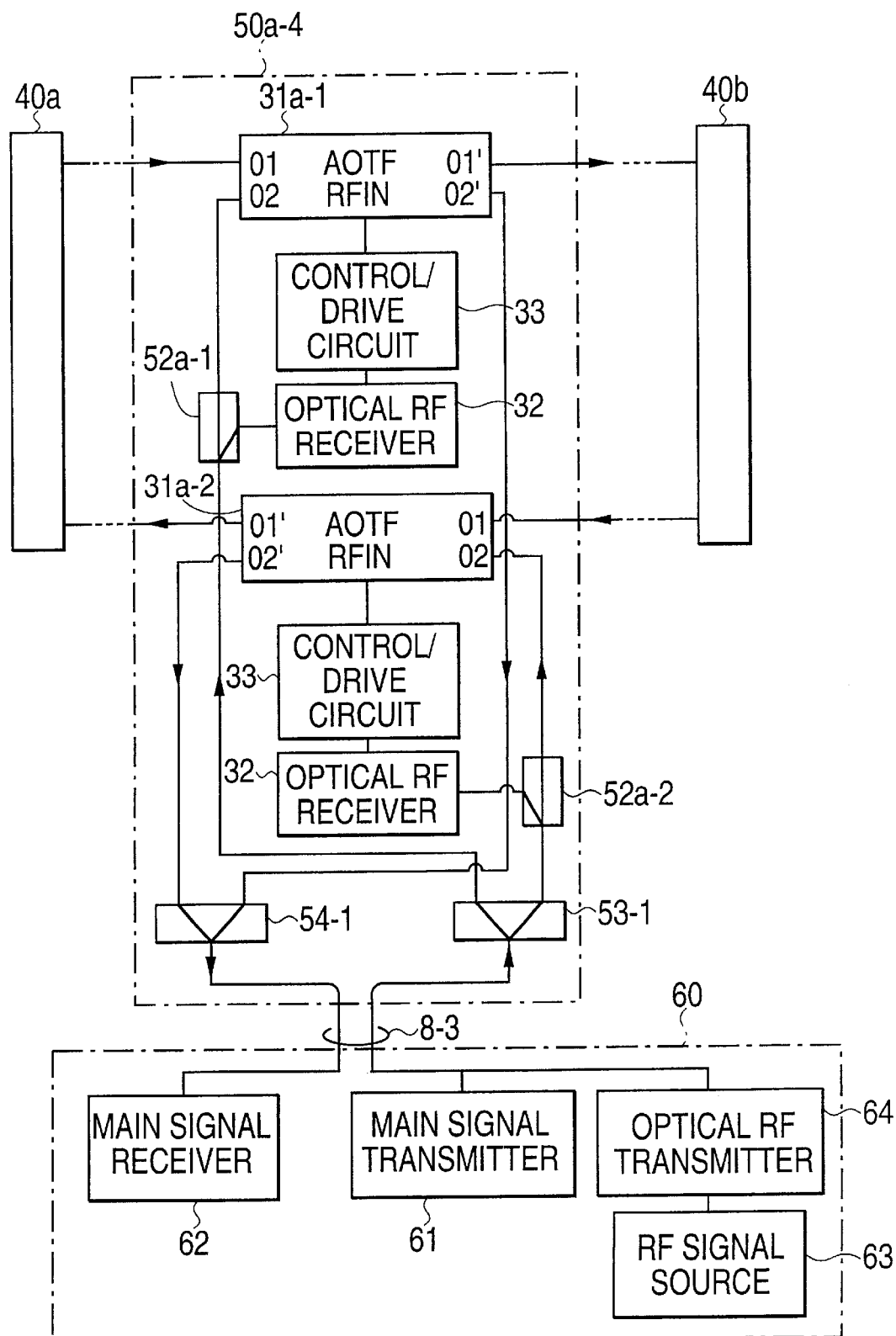
FIG. 18 is a block diagram to illustrate a wavelength multiplexing demultiplexing device relating to a fourth modified example of the second embodiment of the present invention.

FIG. 18 is a block diagram to illustrate a wavelength multiplexing demultiplexing device relating to a fourth modified example of the second embodiment of the present invention. A wavelength multiplexing demultiplexing device 50*a*-4 shown in FIG. 18 is characterized in that the AOTF 31*a*-1 and the AOTF 31*a*-2 are individually controlled, the transmission lines of split light signals from the AOTF 31*a*-1 and the AOTF 31*a*-2 are combined into one transmission line, and the transmission lines of add light signals toward the AOTF 31*a*-1 and the AOTF 31*a*-2 are combined into one transmission line.

The same numeral symbols as those used in the aforementioned first embodiment, the second embodiment, and the second modified example of the second embodiment represent that the components of the same symbols have the same functions, and the description of those will be omitted.

The wavelength multiplexing demultiplexing device 50*a*-4 is comprised of two of the control/drive circuits 33, two of the optical RF receivers 32*a*, the optical splitters 52*a*-1, 52*a*-2, a wavelength multilexer 54-1, and a wavelength demultiplexer (or optical splitter) 53-1.

In other words, the wavelength multiplexing demultiplexing device 50*a*-4 contains the AOTF 31, the optical RF receiver 32, the control/drive circuit 33, and the optical splitter which are installed in the wavelength multiplexing demultiplexing device 50 relating to the second embodiment, each for the upward optical fiber 5*a*-1 and the downward optical fiber 5*a*-2. Thereby, the AOTF 31*a*-1 and 31*a*-2 can individually be controlled.

In the remote control device of the AOTF thus constructed, relating to the fourth modified example of the second embodiment of the present invention, the optical RF transmitter 64 converts the RF signal generated by the RF signal source 63 remotely located from the AOTF 31*a*-1 and 31*a*-2 into an RF light signal, and transmits the RF light signal into the optical fiber pair 8-3.

The optical receivers 32 each receive RF light signals through the optical splitters 52*a*-1, 52*a*-2, and convert them into RF electric signals.

The control/drive circuits 33 each supply the RF signals produced from the RF signal generated by the remotely located RF signal source 63 to the control ports 31-7 of the AOTF 31*a*-1 and 31*a*-2.

When the AOTFs 31*a*-1, 31*a*-2 each receive the RF signals through the control ports 31-7, the AOTF 31*a*-1 and 31*a*-2 each cause the transducers to generate the SAWs, and output light signals of desired wavelengths out of the WDM signals inputted to the input ports (PI) 01 through the optical fibers 5*a*-1, 5*a*-2, to the branch terminal 60, as split light signals, through the output ports (PO) 02'.

The split light signals from the AOTFs 31*a*-1, 31*a*-2 are multiplexed by the wavelength multiplexer 54-1 to be transmitted to the branch terminal 60.

And, when the AOTF 31*a*-1 and 31*a*-2 each receive the RF signals through the control ports 31-7, the transducers generate SAWs, and the AOTFs 31*a*-1, 31*a*-2 receive the light signals through the input ports (PI) 02 through the optical fiber pair 8-3, and output desired light signals to the optical fibers 5*a*-1, 5*a*-2, as add light signals, through the output ports (PO) 01'.

The add light signals to the AOTF 31*a*-1 and the AOTF 31*a*-2 from the branch terminal 60 each are forwarded by the wavelength demultiplexer 53-1 to the input ports (PI) 02 of the AOTF 31*a*-1 and the AOTF 31*a*-1.

Thus, according to the remote control device of the AOTF relating to the fourth modified example of the second embodiment of the present invention, the RF signal source 63 is installed in the branch terminal 60 which is remotely located from the AOTFs 31*a*-1, 31*a*-2, and after receiving RF light signals through the optical fiber pair 8-3 as the remote transmission means, the optical RF receivers 32 and the control/drive circuits 33 as the control units supply RF signals to the control ports 31-7 of the AOTFs 31*a*-1, 31*a*-2. That is, the RF signal source 63 and the AOTFs 31*a*-1, 31*a*-2 are not disposed at the same place, which makes it possible to reduce the scale of the device and to suppress the increase of the power consumption, and to prevent the generation of crosstalks based on electronic circuit disturbances in the control/drive circuits 33.

And, according to the remote control device of the AOTF relating to the fourth modified example of the second embodiment of the present invention, the device comprises the wavelength demultiplexer 53-1 and the wavelength multiplexer 54-1, which makes it possible to connect the wavelength multiplexing demultiplexing device 50*a*-4 to the branch terminal 60 with fewer transmission lines, thereby lowering the cost to construct the device.

(c) Description of a Third Embodiment

Figure 19:
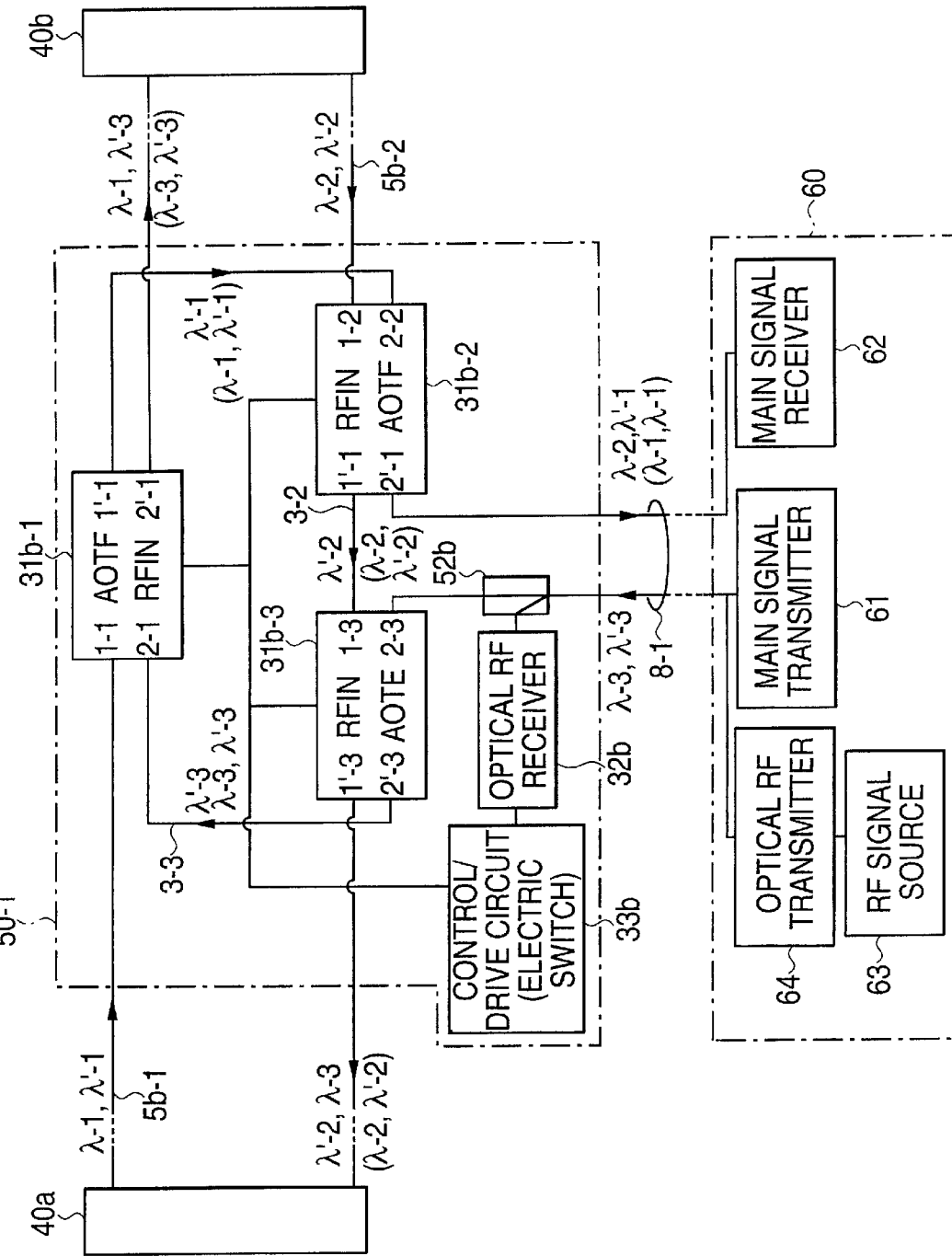
FIG. 19 is a block diagram to illustrate a wavelength multiplexing demultiplexing device relating to a third embodiment of the present invention.

FIG. 19 is a block diagram to illustrate a wavelength multiplexing demultiplexing device 50-1 relating to a third embodiment of the present invention. The wavelength multiplexing demultiplexing device 50-1 shown in FIG. 19 is provided with three AOTFs 31*b*-1, 31*b*-2, 31*b*-3, a control/drive circuit 33*b*, an optical RF receiver 32*b*, and an optical splitter 52*b*. The AOTF 31*b*-1 as a first acousto-optic tunable filter is interpolated in an optical fiber 5*b*-1 of the upward line, and the AOTF 31*b*-2 as a second acousto-optic tunable filter and the AOTF 31*b*-3 as a third acousto-optic tunable filter are interpolated in an optical fiber 5*b*-2 of the downward line.

The same numeral symbols as those used in the aforementioned first embodiment and the second embodiment, etc., represent that the components of the same symbols have the same functions, and the description of those will be omitted.

Here, one input port (PI) 1-1 of the AOTF 31*b*-1 is connected to the main terminal 40*a* through the trunk optical fiber 5*b*-1, and the other input port (PI) 2-1 of the AOTF 31b-1 is connected to an output port (PO) 2'-3 of the AOTF 31b-3 through an optical fiber 3-3. On the other hand, one output port (PO) 1'-1 of the AOTF 31b-1 is connected to an input port (PI) 2-2 of the AOTF 31b-2 through an optical fiber 3-1, and the other output port (PO) 2'-1 of the AOTF 31b-1 is connected to the main terminal 40b through the trunk optical fiber 5b-1.

Further, the other input port (PI) 1-2 of the AOTF 31b-2 receives a WDM signal from the main terminal 40b through the optical fiber 5b-2. And, one output port (PO) 1'-2 of the AOTF 31b-2 is connected to an input port (PI) 1-3 of the optical fiber 31b-3 through the optical fiber 3-2, and the other output port (PO) 2'-2 of the AOTF 31b-2 is connected to the branch terminal 60 through the optical fiber 8-1, through which a split light signal propagates.

Further, the other input port (PI) 2-3 of the AOTF 31b-3 is connected to the branch terminal 60 through the optical fiber 8-1, and receives a light signal from the branch terminal 60. And, the other output port (PO) 1'-3 of the AOTF 31b-3 is connected to the main terminal 40a through the optical fiber 5b-2, and outputs a WDM signal thereto.

The optical RF receiver 32b and the control/drive circuit 33b are designed to be shared by the AOTFs 31b-1, 31b-2, 31b-3, and the AOTFs 31b-1, 31b-2, 31b-3 each receive an RF signal from the control/drive circuit 33b.

In the remote control device of the AOTFs 31b-1, 31b-2, 31b-3 thus constructed, relating to the third embodiment of the present invention, the RF signal source 63 remotely located from the AOTFs 31b-1, 31b-2, 31b-3 generates the RF light signal.

The optical receiver 32b receives an RF light signal split by the optical splitter 52-b to convert it into an RF electric signal, and transmits the RF electric signal to the control/drive circuit 33b.

The control/drive circuit 33b inputs a desired RF signal produced from the RF signal generated by the remotely located RF signal source 63 to the control ports of the AOTFs 31b-1, 31b-2, 31b-3.

Each of the AOTFs 31b-1, 31b-2, 31b-3 receives the desired RF signal from the remotely located RF signal source 63 through each of the control ports, and thereby adds a desired add light signal on the light signals propagating through the trunk optical fiber 5b-1 or 5b-2, or splits a desired split light signal from the light signals.

Concretely, when the AOTFs 31b-1, 31b-2, 31b-3 do not receive the RF signal through the control ports, the AOTFs 31b-1, 31b-2, 31b-3 each receive light signals λ1-1~λ'-1, etc., through the input ports (PI) 1-1~1-3, and output the input light signals as they are through the output ports (PO) 1'-1~1'-3. Similarly, input light signals λ-3~λ'-3, etc., inputted through the input ports (PI) 2-1~2-3 are outputted as they are through the output ports (PO) 2'-1~2'-3.

And, when receiving the RF signal through the control ports, the AOTFs 31b-1, 31b-2, 31b-3 each input light signals λ-1~λ'-1, etc., through the input ports (PI) 1-1~1-3, and output λ-1, etc., through the output ports (PO) 2'-1~2'-3. Similarly, the light signal λ-3, etc., of the input light signals λ-3~λ'-3, etc., inputted through the input ports (PI) 2-1~2-3 are outputted through the output ports (PO) 1'-1~1'-3.

On the other hand, when the RF signal is inputted to the control ports of the AOTFs, the input light signals λ'-1, λ'-2, λ'-3 which are not influenced by the acousto-optic effect by the SAW are outputted from the AOTFs in the same manner as the case that the foregoing RF signal is not inputted to the control ports of the AOTFs.

As shown in FIG. 19, the AOTF 31b-1, for example, outputs the light signal λ'-1 out of λ-1, λ'-1 propagating through the optical fiber 5b-1 to the AOTF 31b-2 through the output port (PO) 1'-1, as a split light signal.

And, when not receiving the RF signal through the control port, the AOTF 31b-2 outputs the light signals λ-2, λ'-2 propagating through the optical fiber 5b-2 from the output port (PO) 1'-2 (the light signals indicated in the parentheses shown in FIG. 19 denote the transmission paths of the light signals indicated therein when the RF signal is not inputted).

And, the AOTFs 31b-1, 31b-2, 31b-3 output the light signals corresponding to the RF signal from the specific output ports (PO) 1'-1~1'-3, 2'-1~2'-3, on the basis of the RF signal transmitted by the RF signal source 63 which is separated from the AOTFs 31b-1, 31b-2, 31b-3 by the optical fiber 8-1 and the like. To interlock the three AOTFs 31b-1, 31b-2, 31b-3 splits a specific light signal as a split light signal, and adds a specific light signal as an add light signal.

Thus, according to the remote control device of the AOTF relating to the third embodiment of the present invention, the RF signal source 63 is installed in the branch terminal 60 which is remotely located from the AOTFs 31b-1, 31b-2, 31b-3, and after receiving RF light signal through the optical fiber pair 8-1 as the remote transmission means, the optical RF receiver 32b and the control/drive circuit 33b as the control unit supply the RF signal to the control ports 31-7 of the AOTFs 31b-1, 31b-2, 31b-3. That is, the RF signal source 63 and the AOTFs 31b-1, 31b-2, 31b-3 are not disposed at the same place, which makes it possible to reduce the scale of the device and to suppress the increase of the power consumption, and to prevent the generation of crosstalks based on electronic circuit disturbances in the control/drive circuits 33b.

Further, the RF signal source 63 and the RF optical transmitter 64 can be placed, in stead of the branch terminal 60, in either the main terminal 40a or the main terminal 40b which is dislocated by the trunk optical fiber 5a-1 or 5a-2.

If the RF signal source 63 is placed in the main terminal 40a, it is necessary to install an optical splitter (not illustrated) in front of the input port (PI) 1-1 of the AOTF 31b-1 in such a manner that the splitter is interpolated in the trunk optical fiber 5b-1. Similarly, if the RF signal source 63 is placed in the main terminal 40b, it is necessary to install an optical splitter (not illustrated) in front of the input port (PI) 1-2 of the AOTF 31b-2 in such a manner that the splitter is interpolated in the trunk optical fiber 5b-2; in this manner can be made up the wavelength division multiplexing demultiplexing device 50-1.

Incidentally, FIG. 29 is a block diagram to illustrate a wavelength multiplexing demultiplexing device relating to an applied example of the third embodiment of the present invention. The wavelength multiplexing demultiplexing device 50-1' shown in FIG. 29 is able to perform the same operation as the foregoing wavelength multiplexing demultiplexing device 50-1. As compared with the foregoing wavelength multiplexing demultiplexing device 50-1, the wavelength multiplexing demultiplexing device 50-1' is characterized by comprising only one AOTF.

Thus, the wavelength multiplexing demultiplexing device 50-1' is comprised of an AOTF 31b', three-terminal circulators 58-7, 58-8, 58-9, 58-10, a control/drive circuit 33b-1, and the optical RF receiver 32b.

The AOTF 30b' is equivalent to the foregoing AOTF 30', and is further able to input and output light signals through the ports.

The three-terminal circulator (58-7, 58-8, 58-9, 58-10) is an optical device comprising three terminals (C1, C2, C3). When a light signal comes in through the terminal C1 of the optical circulator 58-1, for example, the circulator 58-1 guides the light signal in the direction indicated by the arrow in FIG. 29, and outputs the light signal through the terminal C2 that the light signal first reaches. For example, light signals λ-1, λ'-1 propagating through the optical fiber 5b-1 are forwarded to the AOTF 31b' by the optical circulator 58-7. And, light signals λ-2, λ'-2 transmitted from the main terminal 40b are forwarded to the AOTF 31b' by the optical circulator 58-9.

With such a construction, in the same manner as the foregoing remote control device of the AOTF relating to the third embodiment, the optical RF receiver 32b receives an RF light signal transmitted from the branch terminal 60 remotely located from the AOTF 31b', and the control/drive circuit 33b-1 supplies a desired RF signal to the control port 31-7 of the AOTF 31b', thus performing the remote control of the AOTF 31b'. This arrangement will reduce, in the same manner as the foregoing, the scale of the device and suppress the increase of the power consumption, and further reduce the number of AOTFs, which lowers the system cost.

(c1) Description of a First Modified Example of the Third Embodiment

Figure 20:
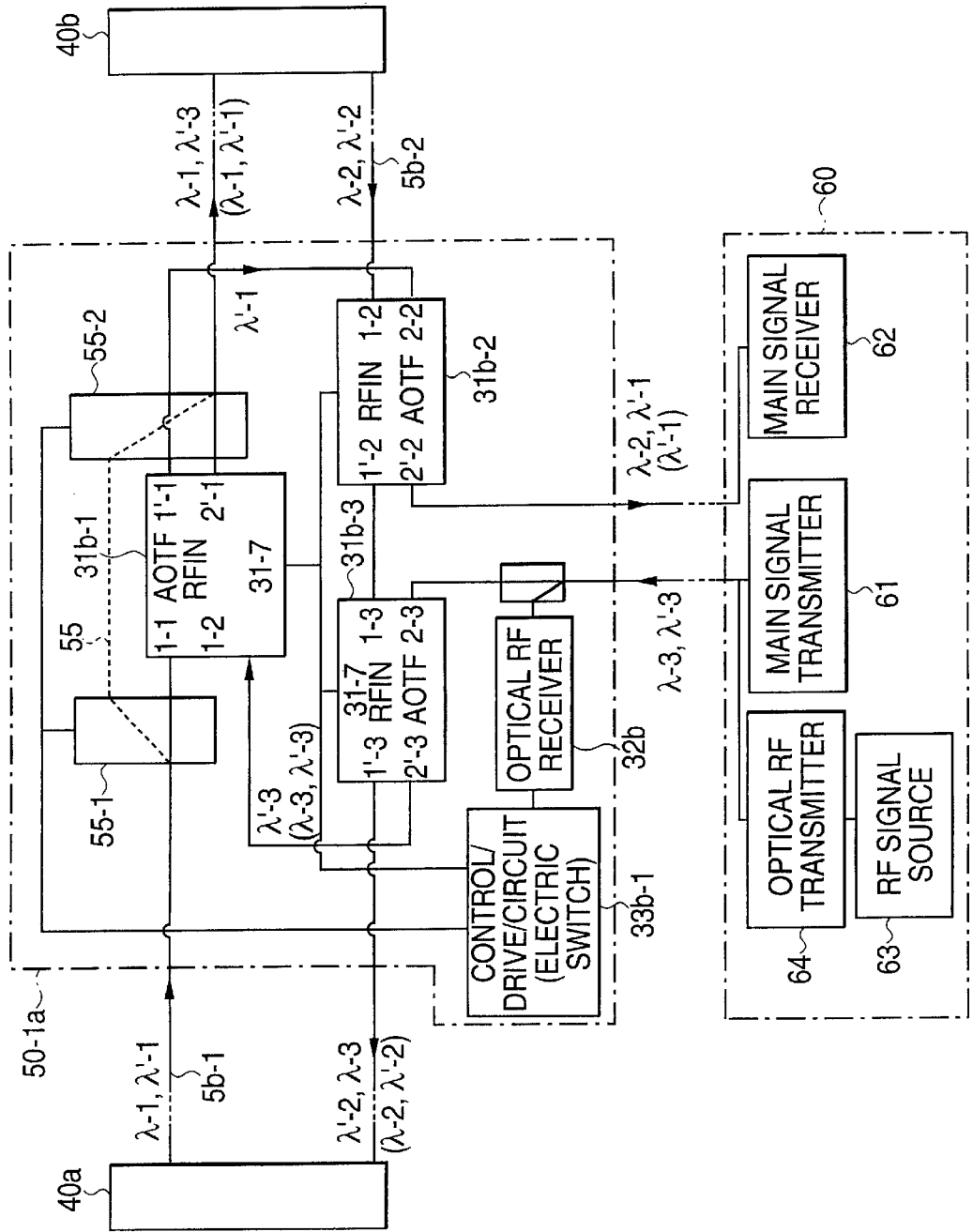
FIG. 20 is a block diagram to illustrate a wavelength multiplexing demultiplexing device relating to a first modified example of the third embodiment of the present invention.

FIG. 20 is a block diagram to illustrate a wavelength multiplexing demultiplexing device 50-1a relating to a first modified example of the third embodiment of the present invention. The wavelength multiplexing demultiplexing device 50-1a shown in FIG. 20 is further comprised of a bypass transmission path 55 and optical switches 55-1, 55-2.

The bypass transmission path 55 is a transmission path whereby the light signals λ-1, λ'-1 detour the AOTF 31b-1, when the control/drive circuit 33b-1 does not detect the RF signal from the branch terminal 60.

The optical switches 55-1, 55-2 as the switching means switch the transmission path of the light signals into either the bypass transmission path 55 or the AOTF 31b-1, and the control/drive circuit 33b-1 controls the optical switches 55-1, 55-2 to perform the switching.

Figure 21:
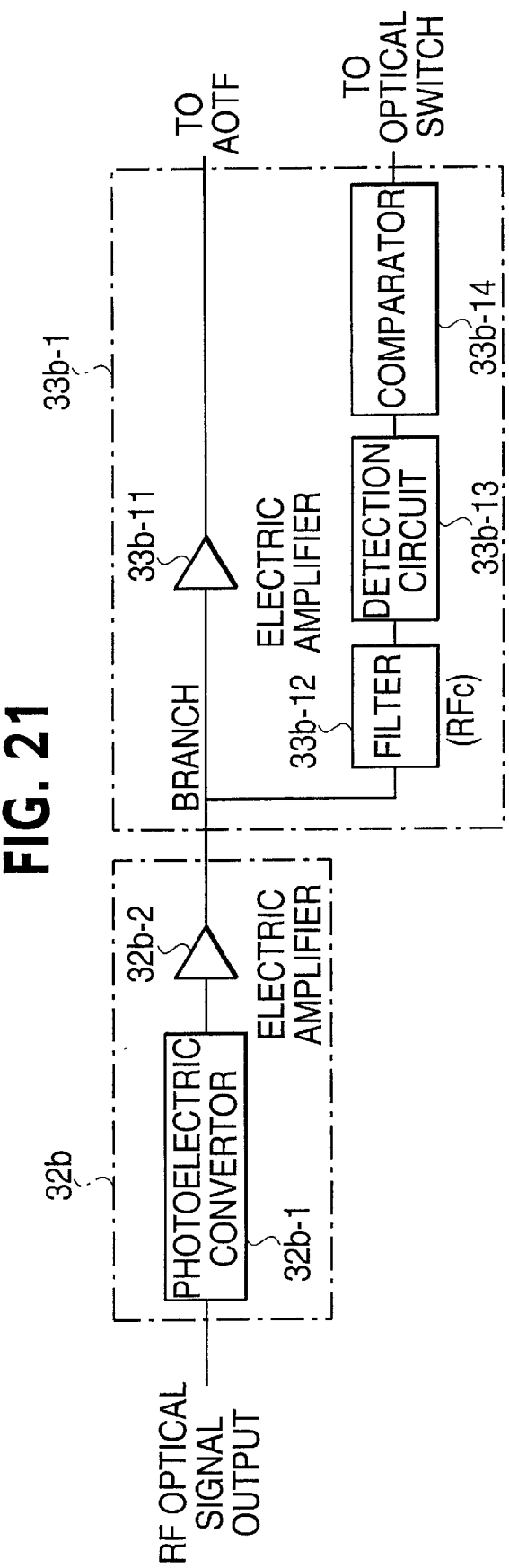
FIG. 21 is a block diagram to illustrate an optical RF receiver and a control/drive circuit relating to the first modified example of the third embodiment of the present invention.

FIG. 21 is a block diagram to illustrate the optical RF receiver 32b and the control/drive circuit 33b-1. The optical RF receiver 32b is comprised of a photoelectric convertor 32b-1 and an electric amplifier 32b-2; and an RF signal converted by the photoelectric convertor 32b-1 is amplified by the electric amplifier 32b-2, which is transmitted to the control/drive circuit 33b-1.

Incidentally, a photodiode (PD) can be used as the photoelectric convertor 32b-1.

And, the control/drive circuit 33b-1 is comprised of an electric amplifier 33b-11, and an optical switch control circuit consisting of a filter 33b-12, a detection circuit 33b-13, and comparator 33b-14.

When an RF signal comes into the control/drive circuit 33b-1 from the optical RF receiver 32b, the RF signal is divided into two. The one divided RF signal is transmitted to the amplifier 33b-11 to be amplified, and the other divided RF signal is transmitted to the filter 33b-12.

That is, the amplifier 33b-11 amplifies, in one branch, the RF signal to a level suitable for driving the AOTFs 31b-1, 31b-2, 31b-3.

In the other branch, the detection circuit 33b-13 detects the RF signal (RFc) that has passed through the filter 33b-12 and converts it into a dc signal, whereby the comparator 33b-14 judges the presence of the RF signal.

The comparator 33b-14 is designed to generate a binary signal as the output in correspondence with the presence of the RF signal on its output. The control/drive circuit 33b-1 control to switch the optical switches 55-1, 55-2 by using this binary signal.

Further, the control/drive circuit 33b-1 shown in FIG. 21 uses one RF signal (RFc) of a plurality of RF signals, for controlling to switch the optical switches 55-1, 55-2. To achieve this, the electric bandpass filter 33b-12 is placed in front of the detection circuit 33b-13. The center frequency of the electric bandpass filter 33b-12 is set to be equal to the frequency of the RF signal for controlling to switch the optical switches 55-1, 55-2.

Concretely, if the RF signal from the RF signal source is not present, the control/drive circuit 33b-1 as a switching control unit controls the optical switches 55-1, 55-2 to turn off, and the light signals λ-1, λ'-1 from the main terminal 40a are transmitted through the bypass transmission path 55.

With such a construction, the AOTFs 31b-1, 31b-2, 31b-3 are controlled by the RF signal from the remotely located RF signal source 63, which makes it possible to reduce the power consumption in the same manner as the foregoing. And, this construction makes it possible to control to or not to bypass the light signals λ-1, λ'-1 into the bypass transmission path 55.

Figure 22:
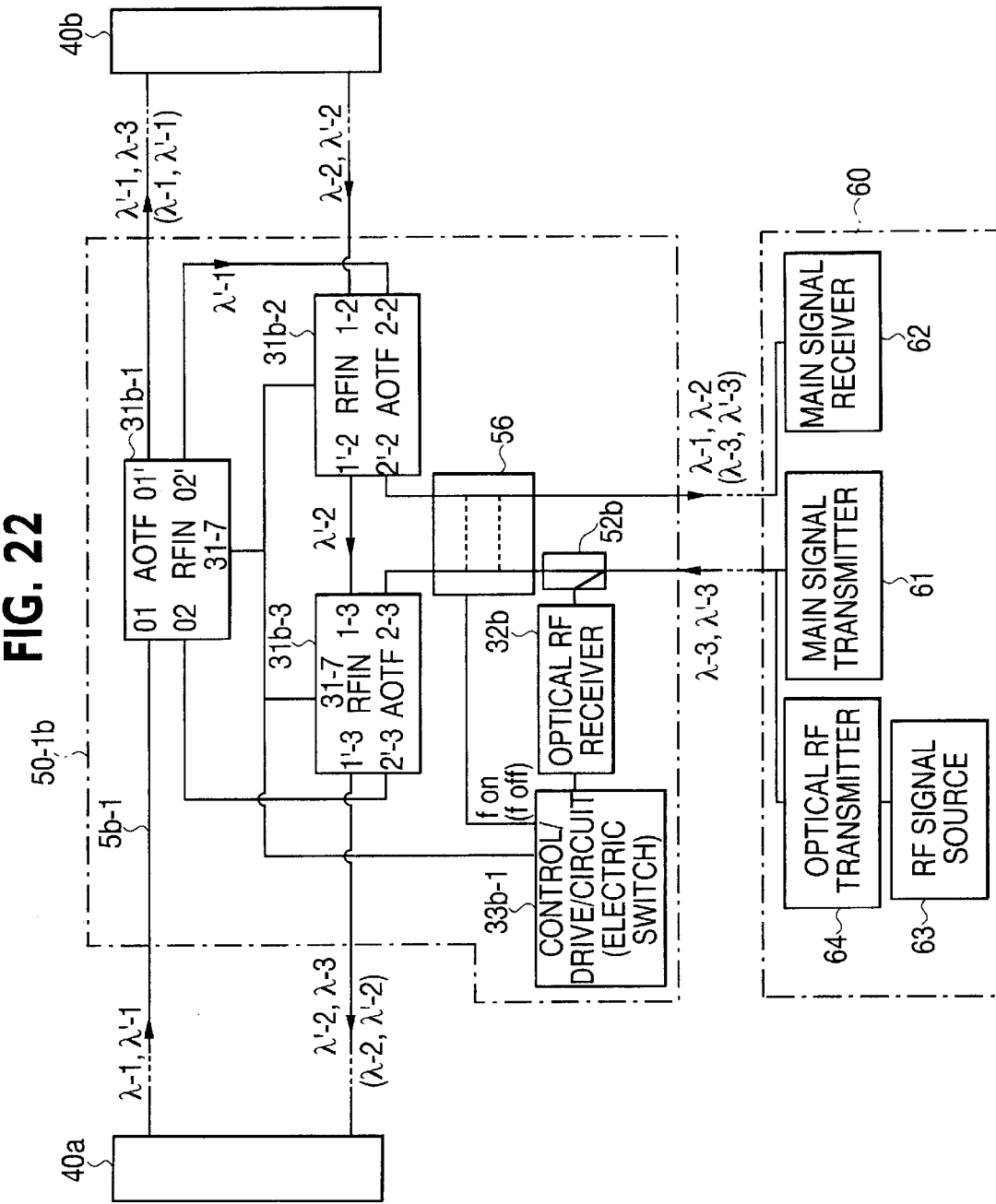
FIG. 22 is a block diagram to illustrate another wavelength multiplexing demultiplexing device relating to the first modified example of the third embodiment of the present invention.

Further, the device can be made up with an optical switch 56 as a wavelength multiplexing demultiplexing device 50-1b shown in FIG. 22. The control/drive circuit 33b-1 as the switch control unit transmits the RF signal to the AOTFs 31b-1, 31b-2, 31b-3, and performs the switching control of the transmission path of the optical switch 56. Concretely, the output from the comparator 33b-14 is supplied to the optical switch 56.

And, when detecting an RF signal, the control/drive circuit 33b-1 performs the switching control of the transmission path such that the output port (PO) 2'-2 of the AOTF 31b-2 is directly connected to the input port (PI) 2-3 of the AOTF 31b-3. On the other hand, the optical switch 56 connects the split light signal output port (PO) 2'-2 from the AOTF 31b-2 to the add light signal input port (PI) 2-3 of the AOTF 31b-3.

That is, the optical switch 56 switches the transmission path under the control of the control/drive circuit 33b-1, so that the split light signal from the AOTF 31b-2 is transmitted into the optical fiber 8-1 connecting to the branch terminal 60. And, the optical switch 56 switches the transmission path so that the add light signal from the branch terminal 60 is transmitted to the input port (PI) 2-3 of the AOTF 31b-3.

And, the optical switch 56 switches the transmission path under the control of the control/drive circuit 33b-1, so that the light signal from the output port (PO) 2'-2 of the AOTF 31b-2 is transmitted to the input port (PI) 2-3 of the AOTF 31b-3. And, at this moment, the optical switch 56 switches the transmission path so that the light signal from the branch terminal 60 is transmitted to the branch terminal 60.

In other words, if the RF signal from the RF signal source 63 is not present, the control/drive circuit 33b-1 controls the optical switch 56 to connect the output port (PO) 2'-2 of the AOTF 31b-2 directly to the input port (PI) 2-3 of the AOTF 31b-3. And, if the RF signal from the RF signal source 63 is present, the control/drive circuit 33b-1 controls the optical switch 56 to connect the output port (PO) 2'-2 of the AOTF 31b-2 to the optical fiber 8-1 leading to the branch terminal 60 and to connect the input port (PI) 2-3 of the AOTF 31b-3 to the optical fiber 8-1 leading to the branch terminal 60.

According to the remote control device of the AOTFs 31b-1, 31b-2, 31b-3 with the foregoing construction, relating to the first modified example of the third embodiment of the present invention, the AOTFs 31b-1, 31b-2, 31b-3 are controlled by the RF signal from the remotely located RF signal source 63, in the same manner as the foregoing third embodiment, which makes it possible to reduce the power consumption, and in addition to control the optical switch.

(d) Description of Another Embodiment

Figure 23:
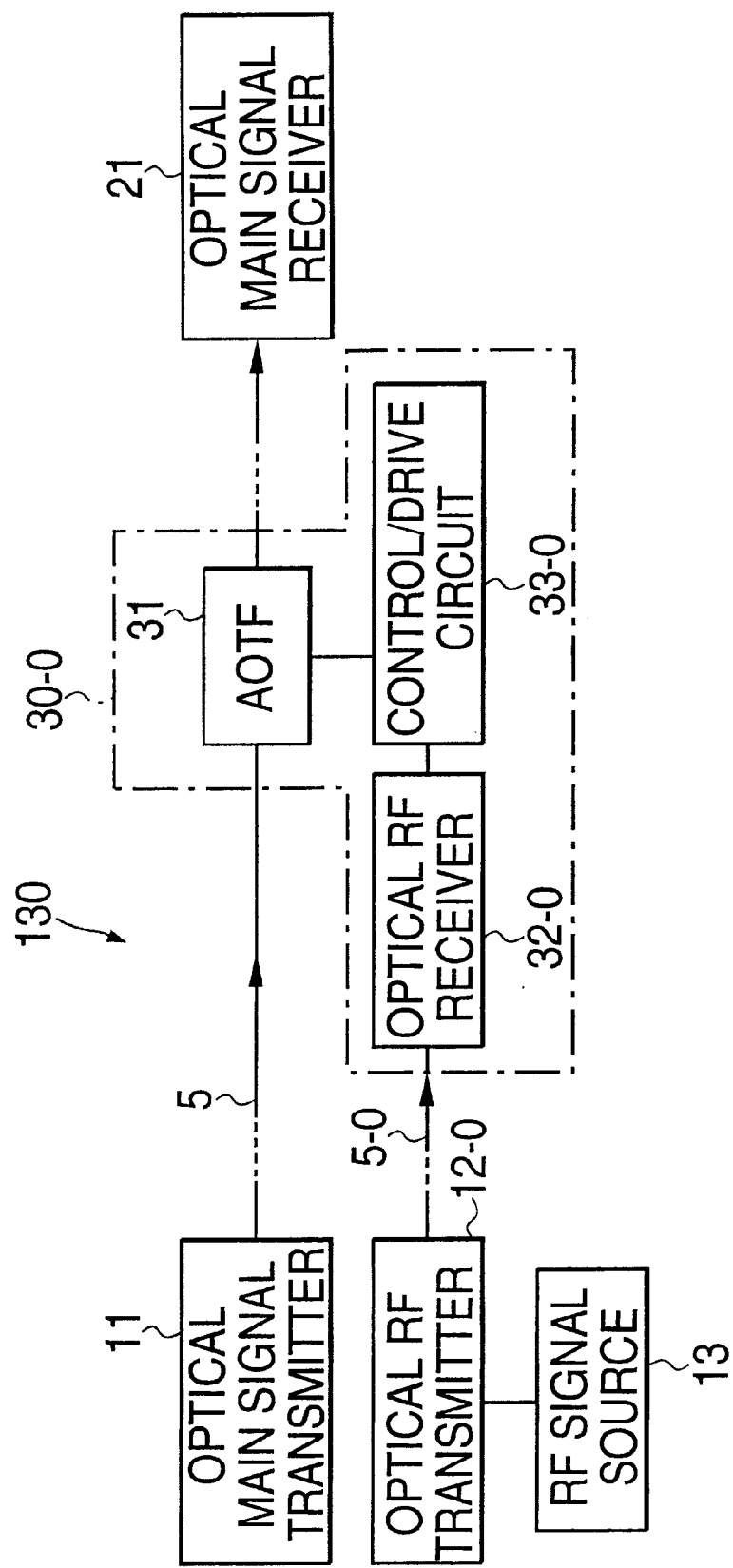
FIG. 23 is a block diagram that illustrates a WDM transmission system relating to another embodiment of the present invention.

FIG. 23 is a block diagram that illustrates a WDM transmission system using a remote control device of an AOTF relating to another embodiment of the present invention. A WDM transmission system 130 is comprised of the optical main signal transmitter 11, an optical RF transmitter 12-0, the RF signal source 13, a device 30-0, and the optical main signal receiver 21.

The same numeral symbols as those used in the aforementioned first embodiment and the second embodiment, etc., represent that the components of the same symbols have the same functions, and the description of those will be omitted.

The device 30-0 is comprised of the AOTF 31, an optical RF receiver 32-0, and a control/drive circuit 33-0, which is equivalent to the wavelength multiplexing demultiplexing device 50, the active equalizer 30, or the like. In other words, the AOTF 31 can be applied as a gain equalizer, power equalizer, or a wavelength multiplexing demultiplexing device.

The RF signal source 13 to generate the RF electric signal and the AOTF 31 are disposed in different places. As shown in FIG. 23, the RF signal source 13 is placed apart from the AOTF 31.

Incidentally, the frequency of the RF signal covers from several MHz to several hundred MHz, which is comparable to the frequency band used for the CATV. Therefore, utilizing the technique developed in the optical CATV field will achieve this technique easily.

According to the remote control device of the AOTF 31 having the foregoing construction, relating to the another embodiment of the present invention, the optical RF transmitter 12-0 modulates a light signal on the basis of the RF electric signal, and transmits the modulated light signal to the transmission line.

Next, in the device 30-0 containing the AOTF 31, the optical RF receiver 32-0 receives the light signal (RF light signal) modulated by the optical RF transmitter 12-0, and demodulates it into the RF electric signal. That is, the RF electric signal is once converted into a light signal, and the converted RF light signal is transmitted to the device 30-0 containing the AOTF 31. The transmission line 5-0 used for transmitting the RF light signal and the transmission line 5 used for the main light signal may be the same one, or different.

The AOTF 31 performs a desired operation by receiving an RF signal through the control port, in which the amplification to a suitable level or other processings are applied in the control/drive circuit 33-0.

For example, if the device 30-0 containing the AOTF 31 is used for an active equalizer, the AOTF 31 is able to output a desired light signal by receiving a suitable RF signal.

Thus, according to the remote control device of the AOTF 31 of the another embodiment of the present invention, the AOTF 31 can be controlled by the RF signal source 13 remotely located from the AOTF 31, and therefore, the scale of the AOTF peripheral circuits disposed in the transmission line 5 or the power consumption thereof can be reduced. Further, by varying the frequency of the RF signal and the power from the RF signal source, the transmission characteristic of the AOTF 31 can be controlled remotely from the terminal, which is advantageous. Further, the control/drive circuit 33-0 is electrically isolated from the RF signal source 13, which reduces the crosstalks that disturb the operations of the electronic circuits.

Further, FIG. 23 illustrates only one AOTF 31. However, it is possible to make a plurality of AOTFs 31 to perform the same operation in the same construction as the foregoing. In this case, the whole system can be made to share only one RF signal source.

Figure 24:
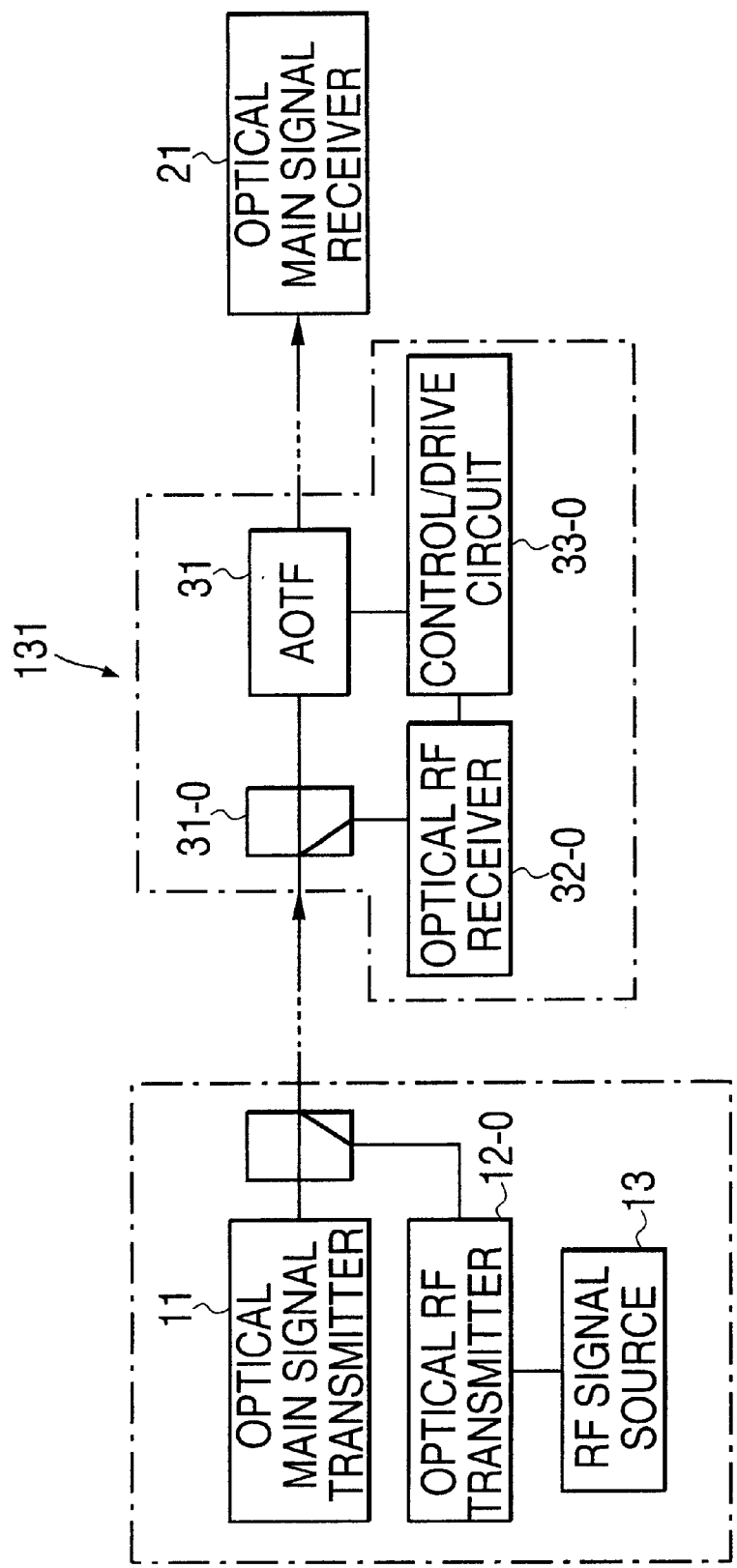
FIG. 24 is a block diagram that illustrates a WDM transmission system relating to another embodiment of the present invention.

Incidentally, FIG. 24 is a block diagram that illustrates a WDM transmission system using the remote control device of the AOTF 31 relating to the another embodiment of the present invention. A WDM transmission system 131 shown in FIG. 24 further comprises a wavelength multiplexer 11-0 and a wavelength demultiplexer 31-0, as compared with the foregoing transmission system 130, which is the difference in both the systems.

In this transmission system 131, an RF light signal modulated by an RF signal and a light signal modulated by a main data signal are modulated into a WDM signal, and the WDM signal is transmitted from the optical transmission terminal 10.

In the remote control device of the AOTF 31 with the foregoing construction, relating to the another embodiment of the present invention, the wavelength multiplexer 11-0 adds the RF light signal and the light signal, and the wavelength demultiplexer 31-0 splits the RF light signal from the transmission line 5 and the optical RF receiver 32-0 demodulates the RF light signal into the RF signal.

The AOTF 31 performs a desired operation by receiving an RF signal through the control port, in which the amplification to a suitable level or other processings are applied in the control/drive circuit 33-0.

Thus, according to the remote control device of the AOTF 31 of the another embodiment of the present invention, the AOTF 31 can be controlled by the RF signal source 13 remotely located from the AOTF 31, and therefore, the scale of the AOTF peripheral circuits disposed in the transmission line 5 or the power consumption thereof can be reduced. Further, by varying the frequency of the RF signal and the power from the RF signal source, the transmission characteristic of the AOTF 31 can be controlled remotely from the terminal, which is advantageous. Further, the control/drive circuit 33-0 is electrically isolated from the RF signal source 13, which reduces the crosstalks that disturb the operations of the electronic circuits.

The invention being thus described, it will be obvious that the same maybe varied in many ways. Such variations are not to be regarded as a departure from the spirit and scope of the invention, and all such modifications as would be obvious to one skilled in the art are intended to be included within the scope of the following claims.

What is claimed is:

1. A remote control device of an acousto-optic tunable filter, comprising:

a first acousto-optic tunable filter interpolated in an upward optical transmission line, capable of controlling an output state of an upward input light signal by being supplied with a first surface acoustic wave control signal through a first control port;

a second acousto-optic tunable filter interpolated in a downward optical transmission line, capable of controlling an output state of a downward input light signal by being supplied with a second surface acoustic wave control signal through a second control port;

surface acoustic wave control signal sources to generate the first and second surface acoustic wave control signals, which are provided at a remote place from the first and second acousto-optic tunable filters; and control units that receive information of the first and second surface acoustic wave control signals from the surface acoustic wave control signal sources through remote transmission means, and supply the first and the second surface acoustic wave control signal to the first and the second control port, respectively, of the first and second acousto-optic tunable filters.

2. A remote control device of an acousto-optic tunable filter, as claimed in claim 1, wherein:

the remote control device further comprises surface acoustic wave light control signal transmitting units that output to convert the first and the second surface acoustic wave control signal from the surface acoustic wave control signal sources into a first and a second surface acoustic wave light control signal;

the control units contain receiving units that receive the first and the second surface acoustic wave light control signal from the surface acoustic wave light control signal transmitting units and convert the surface acoustic wave light control signals into the first and the second surface acoustic wave control signal, and driving units that supply the first and the second surface acoustic wave control signal received by the receiving units to the first and the second control port, respectively, of the first and second acousto-optic tunable filters.

3. A remote control device of an acousto-optic tunable filter, as claimed in claim 2, wherein:

the first and second surface acoustic wave control signals are combined into a common surface acoustic wave control signal to be shared by the first and second acousto-optic tunable filters;

the remote control device further comprises a surface acoustic wave light control signal transmitting unit that outputs to convert the common surface acoustic wave control signal from the surface acoustic wave control signal source into a surface acoustic wave light control signal;

the control unit contains a receiving unit that receives the surface acoustic wave light control signal from the surface acoustic wave light control signal transmitting unit and converts the surface acoustic wave light control signal into the common surface acoustic wave control signal, and a driving unit that supplies the common surface acoustic wave control signal received by the receiving unit to the first and second control ports of the first and second acousto-optic tunable filters.

4. A remote control device of an acousto-optic tunable filter, as claimed in claim 1, wherein, in order to make the first and second acousto-optic tunable filters function as a optical add/drop multiplexer:

one input ports of two pairs of two input ports of the first and second acousto-optic tunable filters are served as first and second input light signal input ports, the other input ports are served as first and second add light signal input ports, one output ports of two pairs of two output ports of the first and second acousto-optic tunable filters are served as first and second output light signal output ports, and the other output ports are served as first and second split light signal output ports, and the first and the second acousto-optic tunable filter receive light signals from a first and a second light signal transmit receive terminal, respectively, through the first and the second input light signal input port thereof and output light signals to the first and the second light signal transmit receive terminal, respectively, through the first and the second output light signal output port thereof, and the first and the second acousto-optic tunable filter receive light signals from a branch terminal, respectively, through the first and the second add light signal input port thereof and output light signals to the branch terminal, respectively, through the first and the second split light signal output port thereof;

and the remote control device further comprises surface acoustic wave light control signal transmitting units that output to convert the first and second surface acoustic wave control signals for adding/dropping a light signal from the surface acoustic wave control signal sources into first and second surface acoustic wave light control signals for adding/dropping a light signal, and the surface acoustic wave control signal sources and the surface acoustic wave light control signal transmitting units are disposed in either one of the first and second light signal transmit receive terminals and the branch terminal;

and the control units contain receiving units that receive the first and second surface acoustic wave light control signals for adding/dropping a light signal from the surface acoustic wave light control signal transmitting units and convert the surface acoustic wave light control signals into the first and second surface acoustic wave control signals for adding/dropping a light signal, and driving units that supply the first and second surface acoustic wave control signals for adding/dropping a light signal received by the receiving units to the first and second add/drop control ports of the acousto-optic tunable filters.

5. A remote control device of an acousto-optic tunable filter, as claimed in claim 1, wherein;

a wavelength demultiplexer to split first and second add light signals transmitted through a common optical transmission line is connected to the first and second add light signal input ports of the first and second acousto-optic tunable filters; and a wavelength multiplexer to combine first and second split light signals from first and second split light signal output ports of the first and second acousto-optic tunable filters and transmit the combined light signal into the common optical transmission line is connected to the first and second split light signal output ports of the first and second acousto-optic tunable filters.

6. A remote control device of an acousto-optic tunable filter, as claimed in claim 5, wherein:

the first and second surface acoustic wave control signals are combined into a common surface acoustic wave control signal to be shared by the first and second acousto-optic tunable filters;

the remote control device further comprises a surface acoustic wave light control signal transmitting unit that outputs to convert the common surface acoustic wave control signal from the surface acoustic wave control signal source into a surface acoustic wave light control signal;

the control unit contains a receiving unit that receives the surface acoustic wave light control signal from the surface acoustic wave light control signal transmitting unit and converts the surface acoustic wave light control signal into the surface acoustic wave control signal, and a driving unit that supplies the surface acoustic wave control signal received by the receiving unit to the first and second control ports of the first and second acousto-optic tunable filters;

the receiving unit of the control unit receives the surface acoustic wave light control signal from the surface acoustic wave light control signal transmitting unit at the common optical transmission line in front of the demultiplexer, and converts the surface acoustic wave light control signal into the common surface acoustic wave control signal; and the driving unit of the control unit supplies the common surface acoustic wave control signal received by the receiving unit to each of the first and second control ports of the first and second acousto-optic tunable filters.

7. A remote control device of an acousto-optic tunable filter, comprising:

a first acousto-optic tunable filter interpolated in an upward optical transmission line, capable of controlling an output state of an upward input light signal by being supplied with a surface acoustic wave control signal through a first control port;

a second acousto-optic tunable filter interpolated in a downward optical transmission line, capable of controlling an output state of a downward input light signal by being supplied with the surface acoustic wave control signal through a second control port;

a third acousto-optic tunable filter interpolated in the downstream of the second acousto-optic tunable filter in the downward optical transmission line, capable of controlling an output state of the downward input light signal outputted from the second acousto-optic tunable filter by being supplied with the surface acoustic wave control signal through a third control port;

a surface acoustic wave control signal source to generate the surface acoustic wave control signal, which is provided at a remote place from the first, second, and third acousto-optic tunable filters; and a control unit that receives an information of the surface acoustic wave control signal from the surface acoustic wave control signal source through remote transmission means, and supplies the surface acoustic wave control signal to the first, second, and third control ports of the first, second, and third acousto-optic tunable filters.

8. A remote control device of an acousto-optic tunable filter, as claimed in claim 7, wherein the remote control device further comprises:

a bypass to bypass the first acousto-optic tunable filter;

switching means to switch the transmission path of the upward input light signal into the first acousto-optic tunable filter or the bypass; and a switching control unit to control a switching state of the switching means.

9. A remote control device of an acousto-optic tunable filter, as claimed in claim 7, wherein the remote control device further comprises:

a switching unit to connect the split light signal output port of the second acousto-optic tunable filter to the add light signal input port of the third acousto-optic tunable filter; and a switching control unit to control a connection state of the split light signal output port and the add light signal input port.

10. An optical transmission system containing equalizers using acousto-optic tunable filters, wherein:

plurality of equalizers are cascaded in the optical transmission line installed between a light signal transmit terminal and a light signal receive terminal, and the equalizers are comprised of the acousto-optic tunable filters capable of controlling output states of input light signals by being supplied with surface acoustic wave control signals through control ports;

the optical transmission system contains, at remote places from the acousto-optic tunable filters, surface acoustic wave control signal sources to generate the surface acoustic wave control signals and surface acoustic wave light control signal transmitting units that output to convert the surface acoustic wave control signals from the surface acoustic wave control signal sources into surface acoustic wave light control signals; and each of the equalizers is provided with a control unit including a receiving unit that receives the surface acoustic wave light control signal from the surface acoustic wave light control signal transmitting unit through the optical transmission line and converts the surface acoustic wave light control signal into the surface acoustic wave control signal, and a driving unit that supplies the surface acoustic wave control signal received by the receiving unit to the control port of the acousto-optic tunable filter.

11. An optical transmission system containing equalizers using acousto-optic tunable filters, as claimed in claim 10, wherein the surface acoustic wave control signal source is installed in the light signal transmit terminal.

12. An optical transmission system containing a optical add/drop multiplexer using an acousto-optic tunable filter, wherein:

the optical add/drop multiplexer is connected through optical transmission lines between a light signal transmit terminal, a light signal receive terminal, and a branch terminal, and is comprised of the acousto-optic tunable filter capable of controlling an output state of an input light signal by being supplied with a surface acoustic wave control signal through a control port;

the optical transmission system contains, at a remote place from the acousto-optic tunable filter, a surface acoustic wave control signal source to generate the surface acoustic wave control signal and a surface acoustic wave light control signal transmitting unit that outputs to convert the surface acoustic wave control signal from the surface acoustic wave control signal source into a surface acoustic wave light control signal; and the optical add/drop multiplexer is provided with a control unit including a receiving unit that receives the surface acoustic wave light control signal from the surface acoustic wave light control signal transmitting unit through the optical transmission line and converts the surface acoustic wave light control signal into the surface acoustic wave control signal, and a driving unit that supplies the surface acoustic wave control signal received by the receiving unit to the control port of the acousto-optic tunable filter.

13. An optical transmission system containing a optical add/drop multiplexer using an acousto-optic tunable filter, as claimed in claim 12, wherein the surface acoustic wave control signal source is installed in either one of the light signal transmit terminal and the branch terminal.

14. A terminal for transmitting a light signal, comprising:

a surface acoustic wave control signal source to generate a surface acoustic wave control signal used to control an acousto-optic tunable filter, which in turn controls an output state of a light signal;

a surface acoustic wave light control signal transmitting unit to converts the surface acoustic wave control signal, which has been created by said surface acoustic wave control signal source, to a surface acoustic wave light control signal; and a wavelength multiplexer to multiplex the surface acoustic wave light control signal, which has been converted in said surface acoustic wave light control signal transmitting unit, and a light signal transmitted through a optical transmission line on which the acousto-optic tunable filter is interposed so as to produce a wavelength division multiplexed signal, which is output on the optical transmission line.

* * * * *